Nov. 28, 1950  G. F. DALY  2,531,873
RECORD CONTROLLED MACHINE
Filed Nov. 26, 1947  31 Sheets-Sheet 1
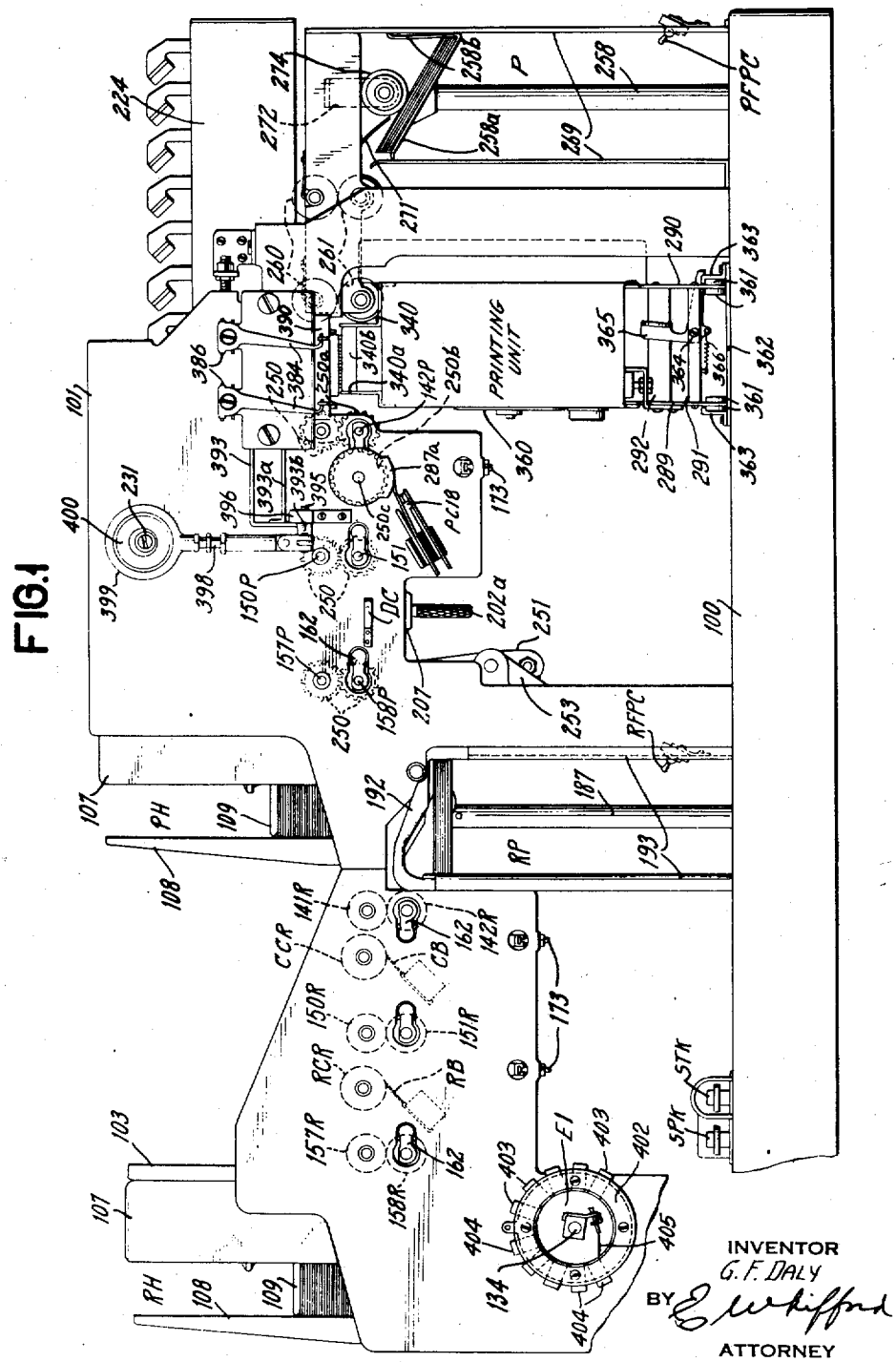
INVENTOR
G. F. DALY
BY
ATTORNEY

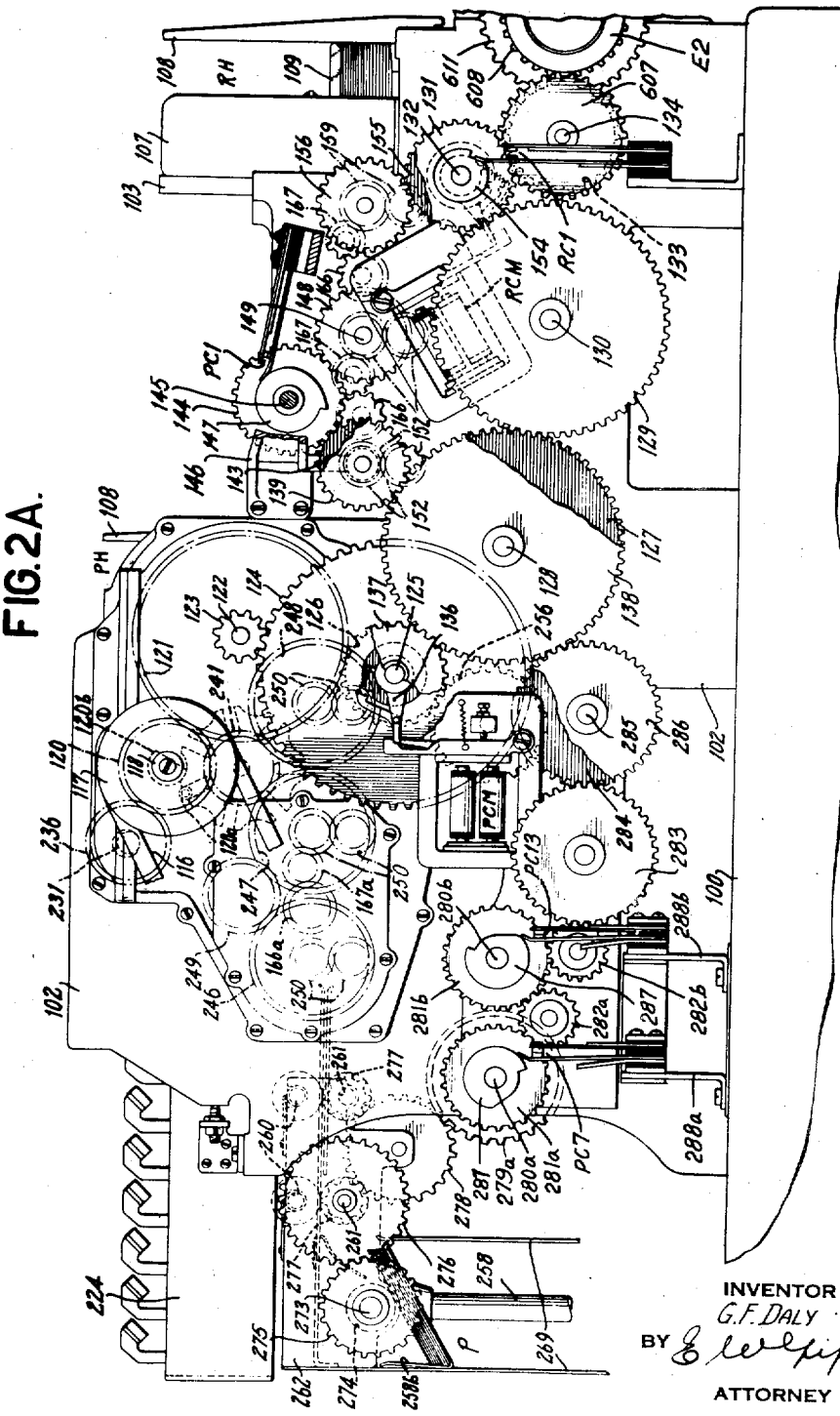

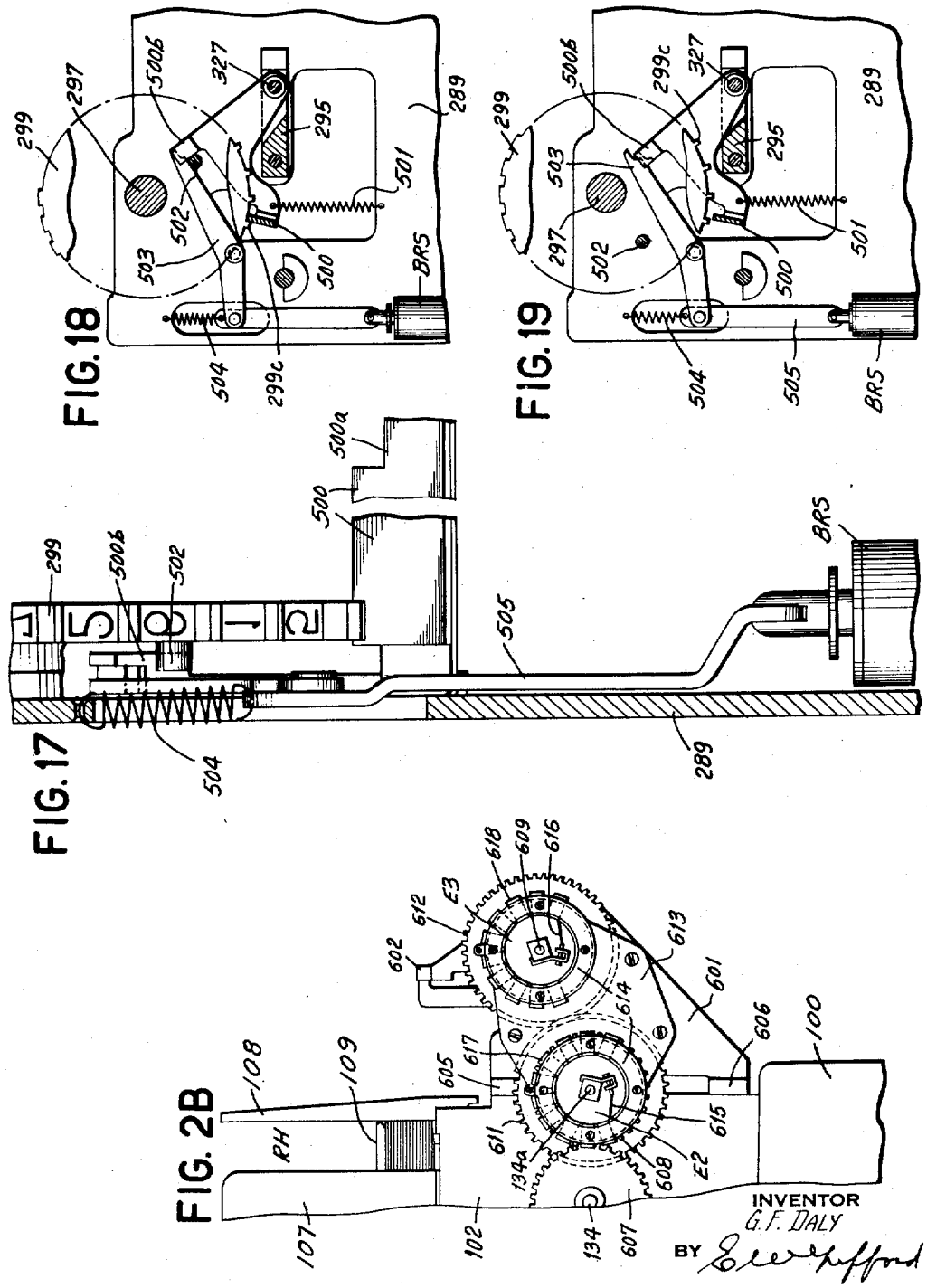

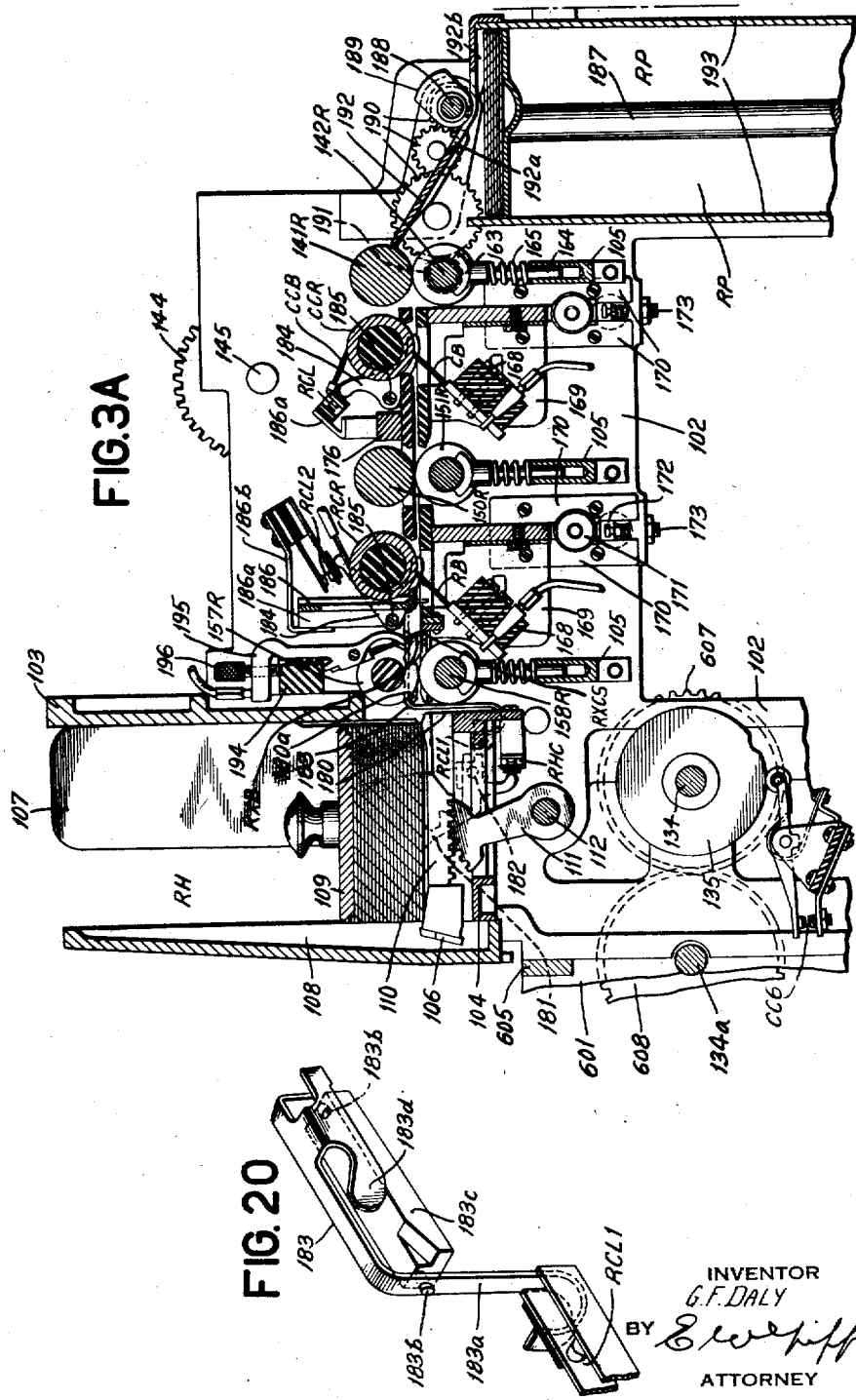

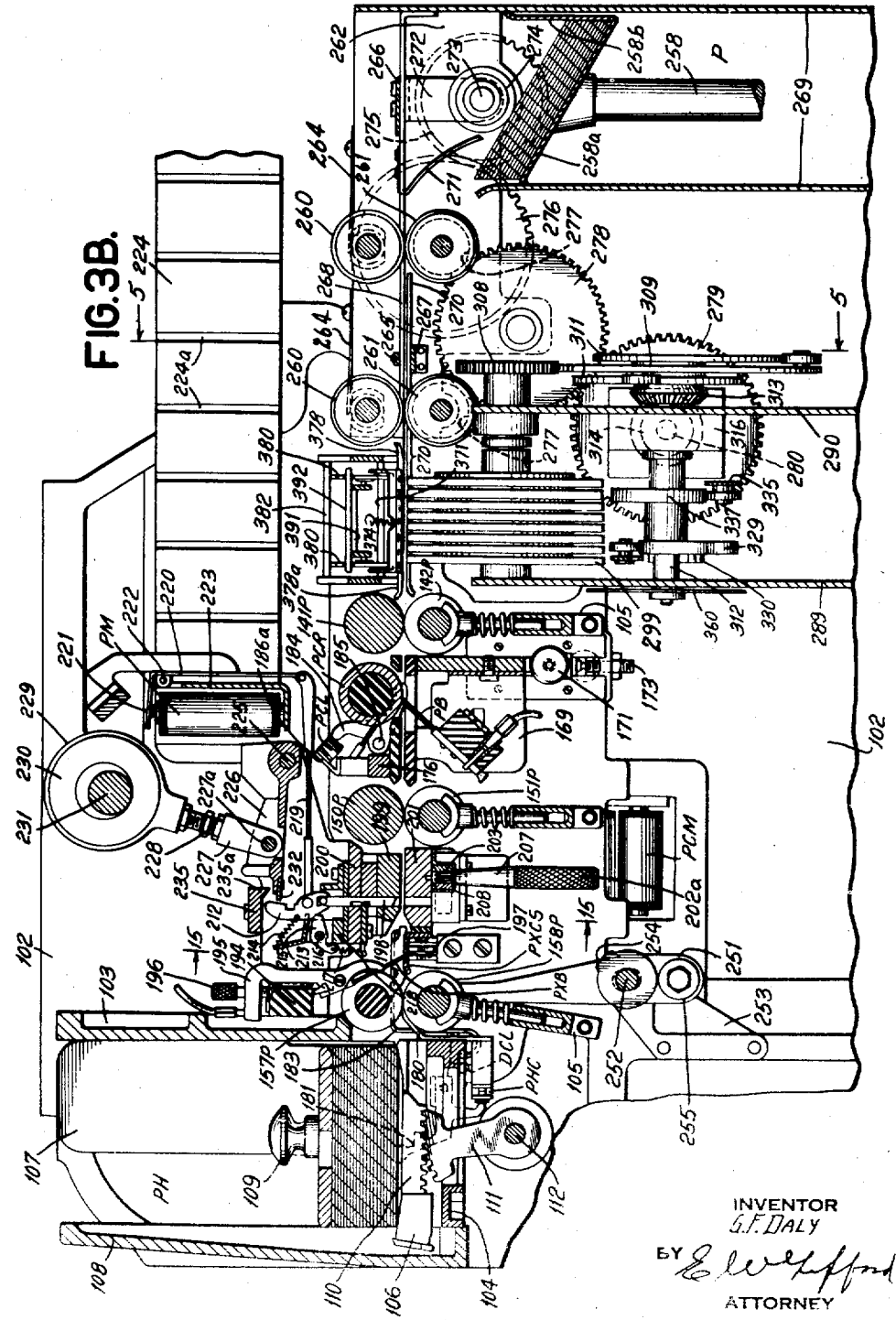

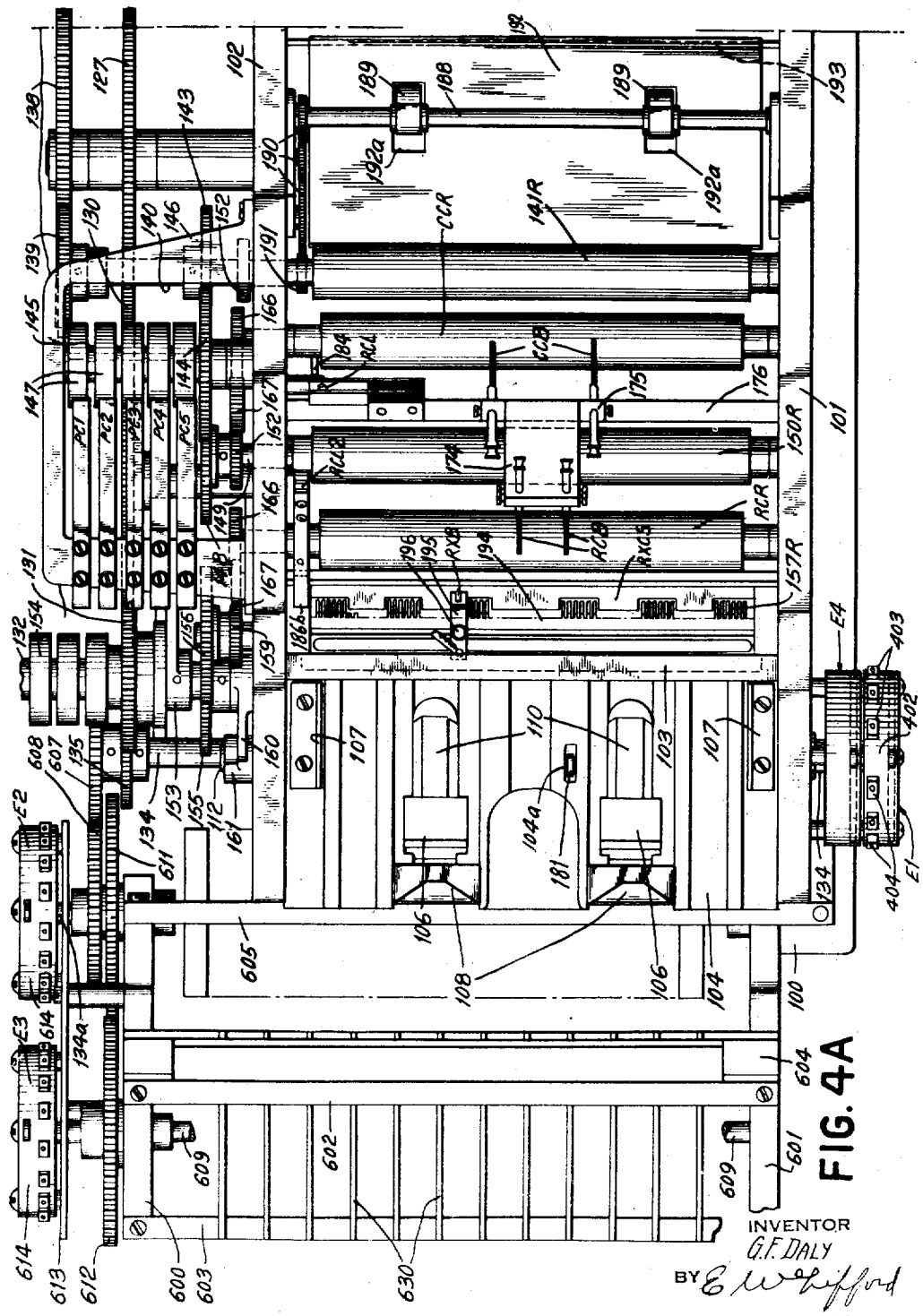

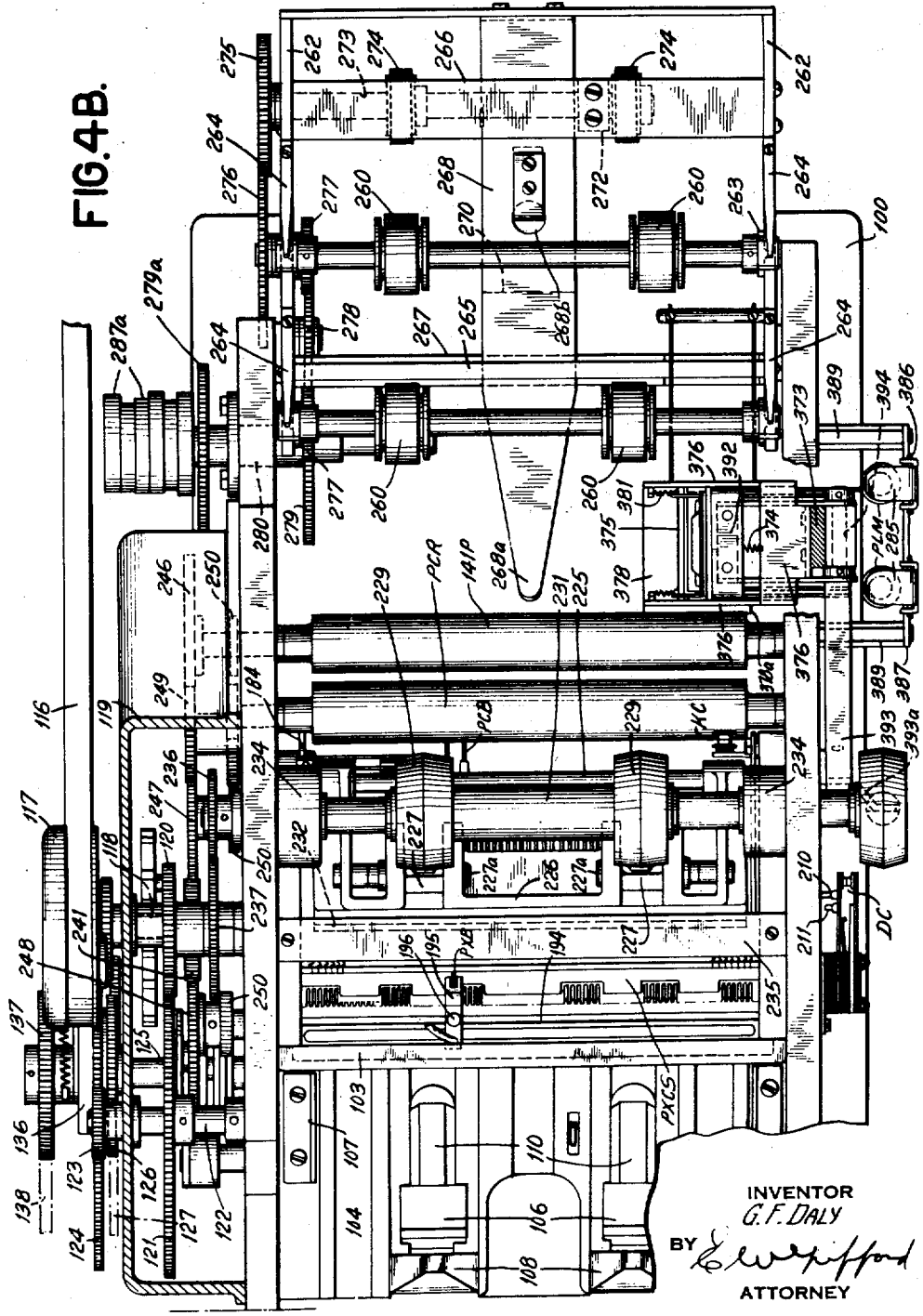

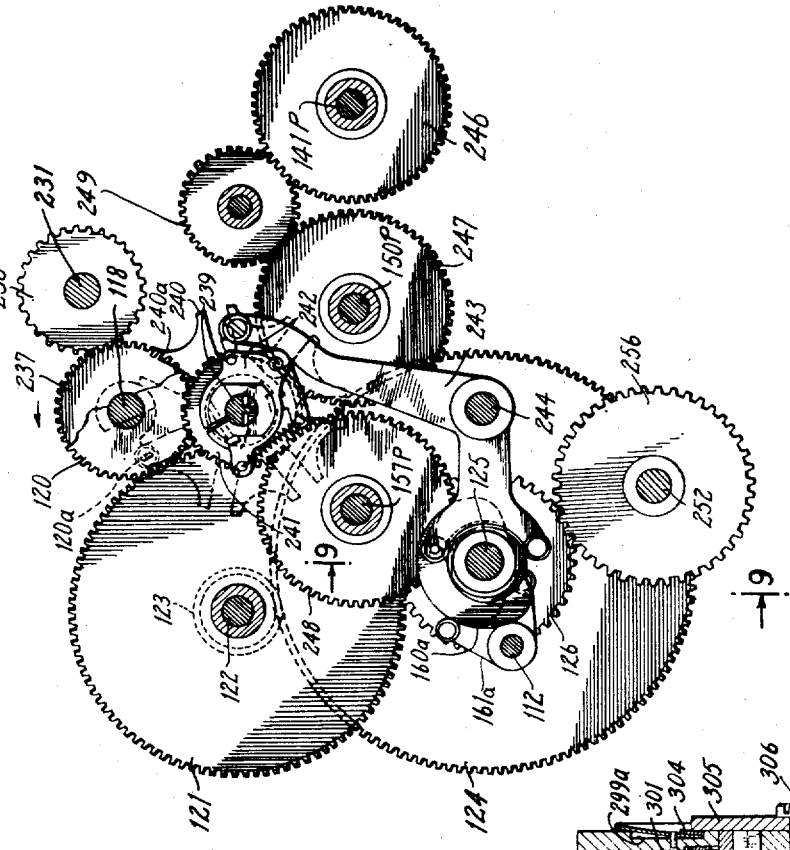

Nov. 28, 1950  G. F. DALY  2,531,873
RECORD CONTROLLED MACHINE
Filed Nov. 26, 1947  31 Sheets-Sheet 10

INVENTOR
G. F. DALY
BY
ATTORNEY

Nov. 28, 1950  G. F. DALY  2,531,873
RECORD CONTROLLED MACHINE
Filed Nov. 26, 1947  31 Sheets-Sheet 11
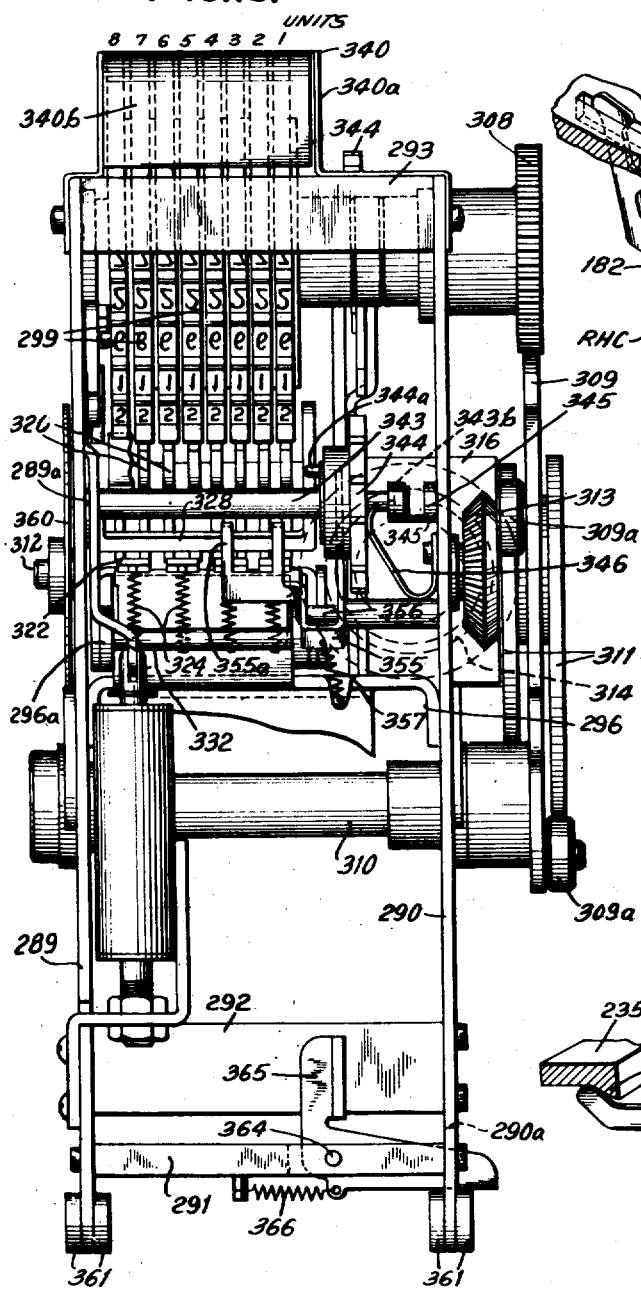
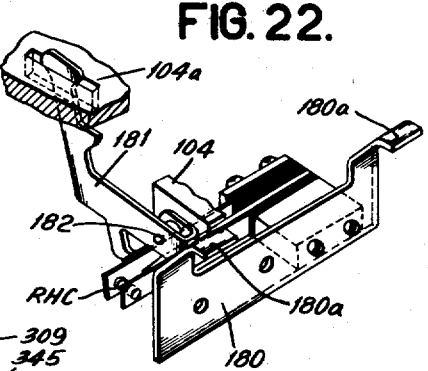
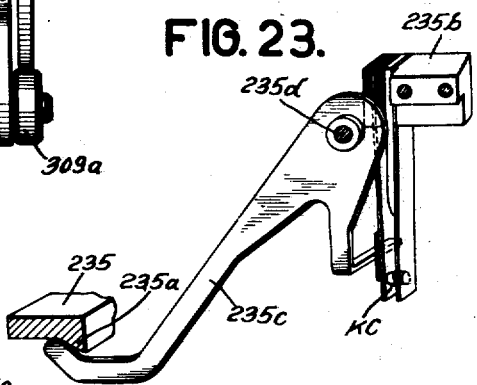
INVENTOR
G. F. DALY
BY
ATTORNEY

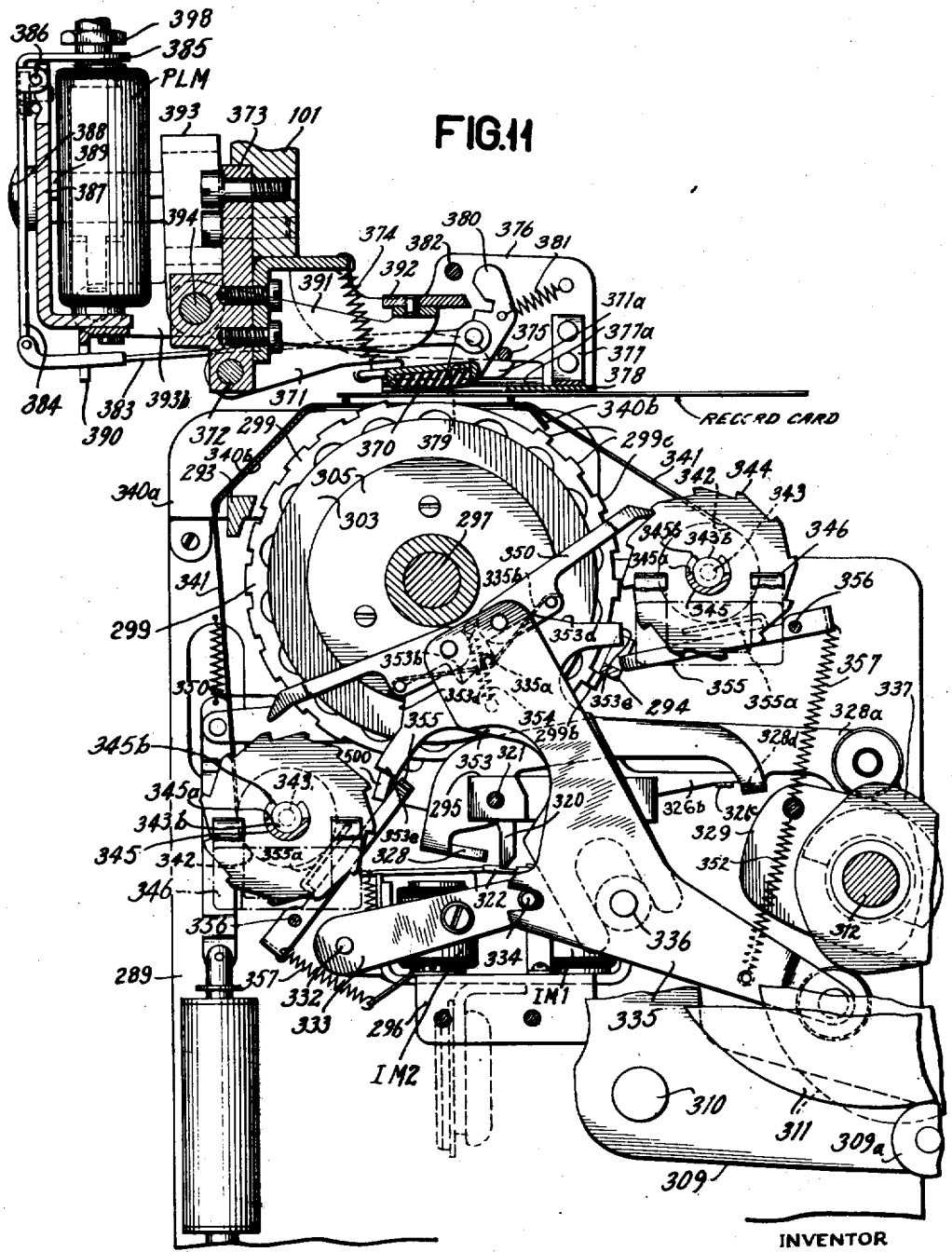

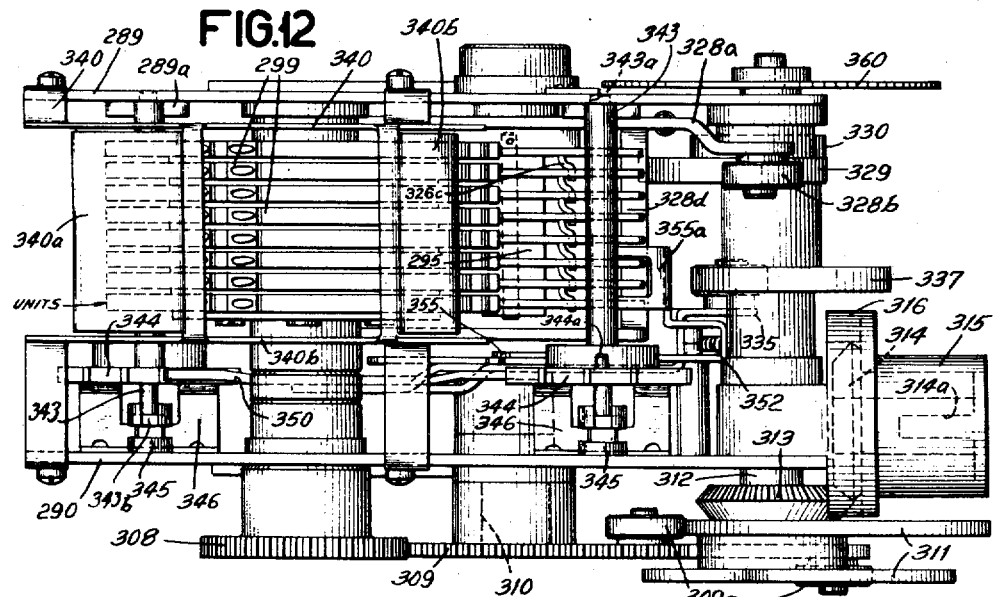
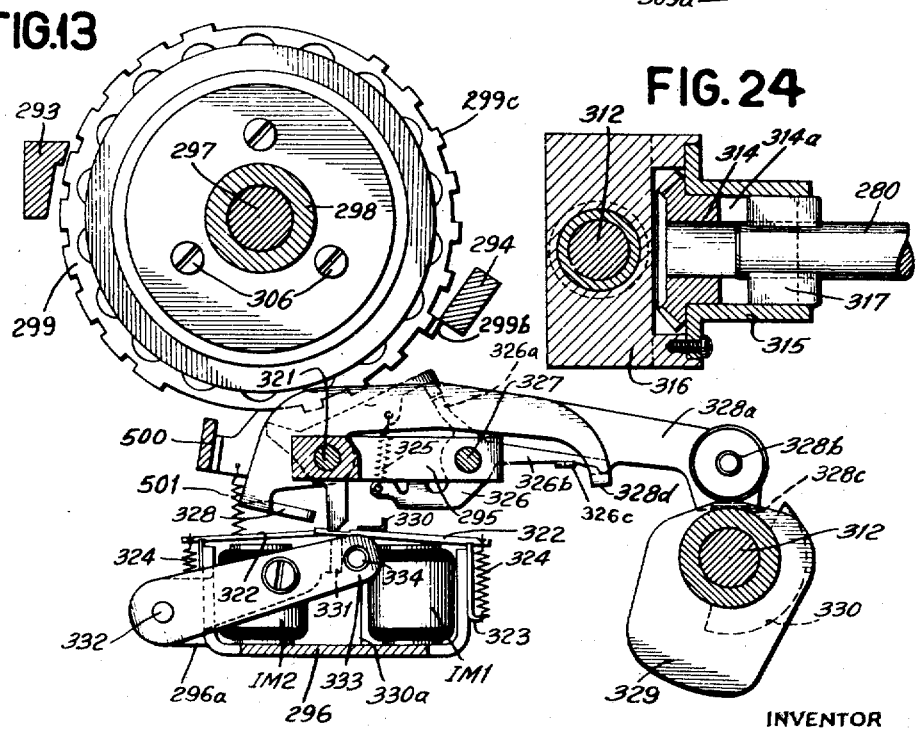

Nov. 28, 1950     G. F. DALY     2,531,873
RECORD CONTROLLED MACHINE
Filed Nov. 26, 1947     31 Sheets-Sheet 14

INVENTOR
G. F. DALY
BY
ATTORNEY

Nov. 28, 1950     G. F. DALY     2,531,873
RECORD CONTROLLED MACHINE
Filed Nov. 26, 1947     31 Sheets-Sheet 15
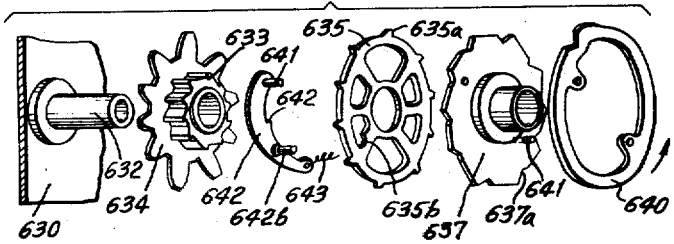
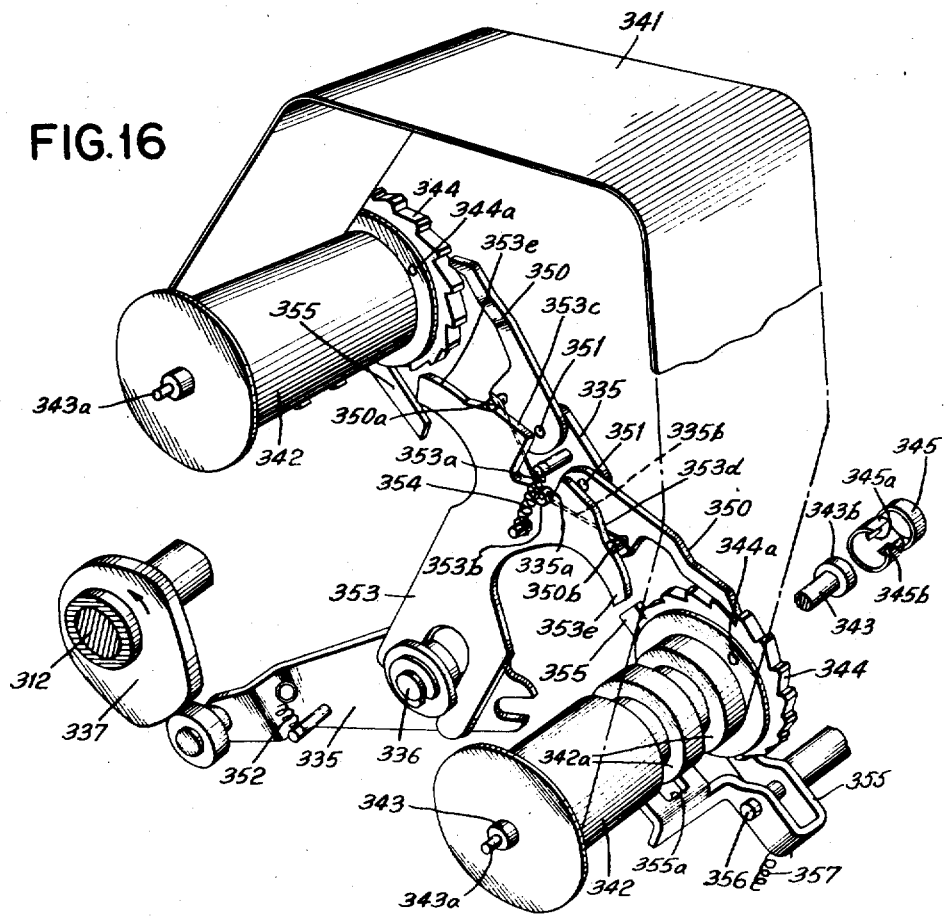
INVENTOR
G. F. DALY
BY
ATTORNEY

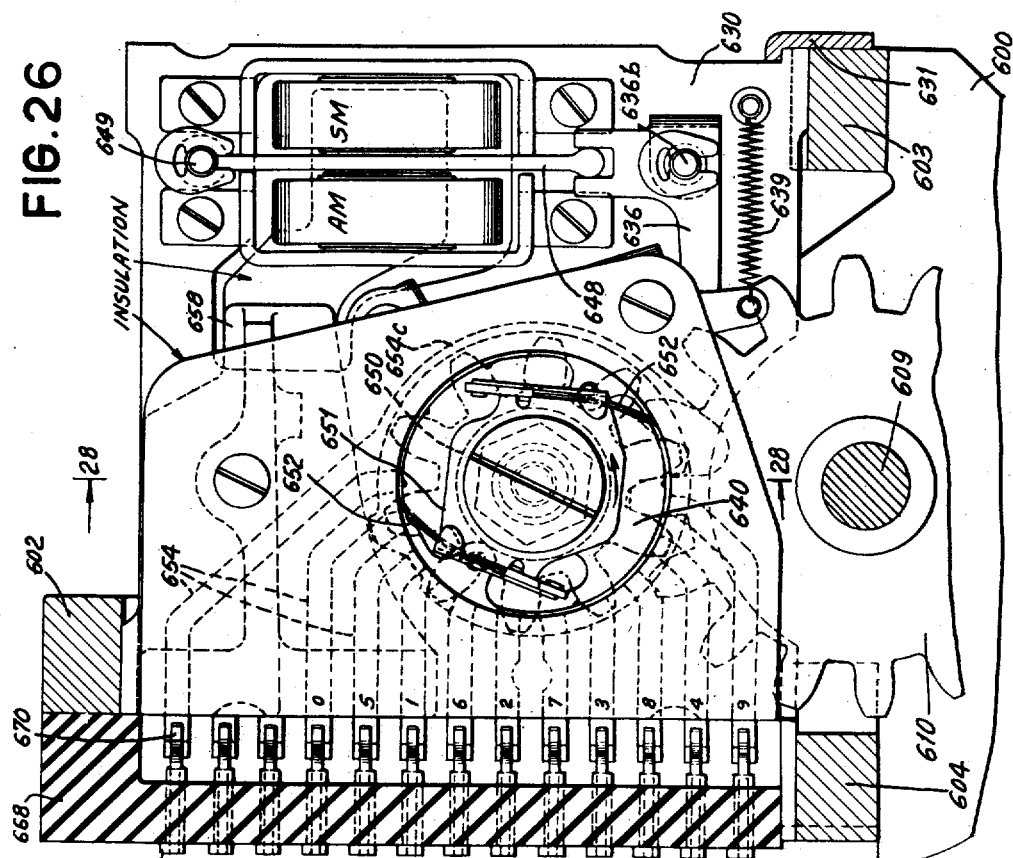

Nov. 28, 1950            G. F. DALY            2,531,873
RECORD CONTROLLED MACHINE
Filed Nov. 26, 1947            31 Sheets-Sheet 17
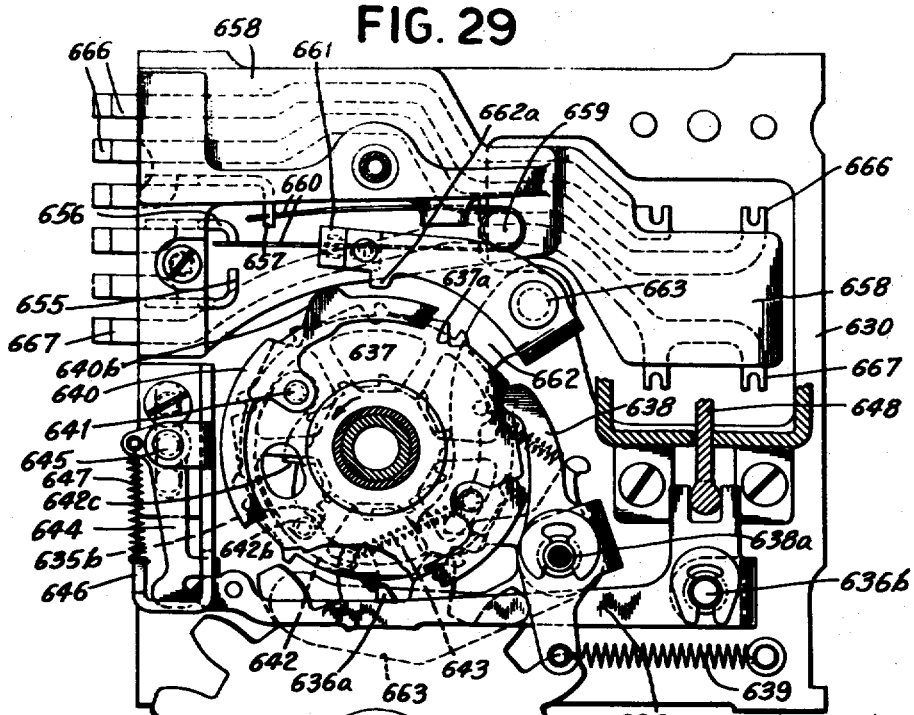
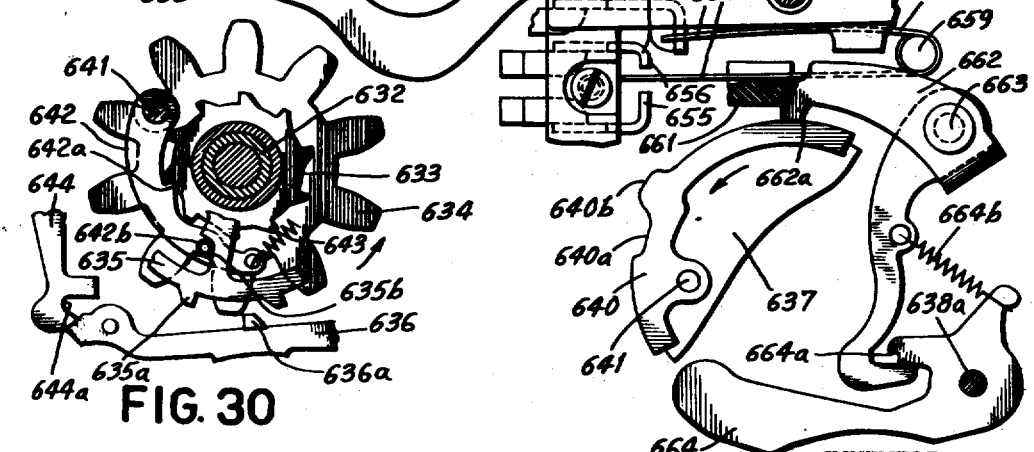
INVENTOR
G. F. DALY
BY
ATTORNEY

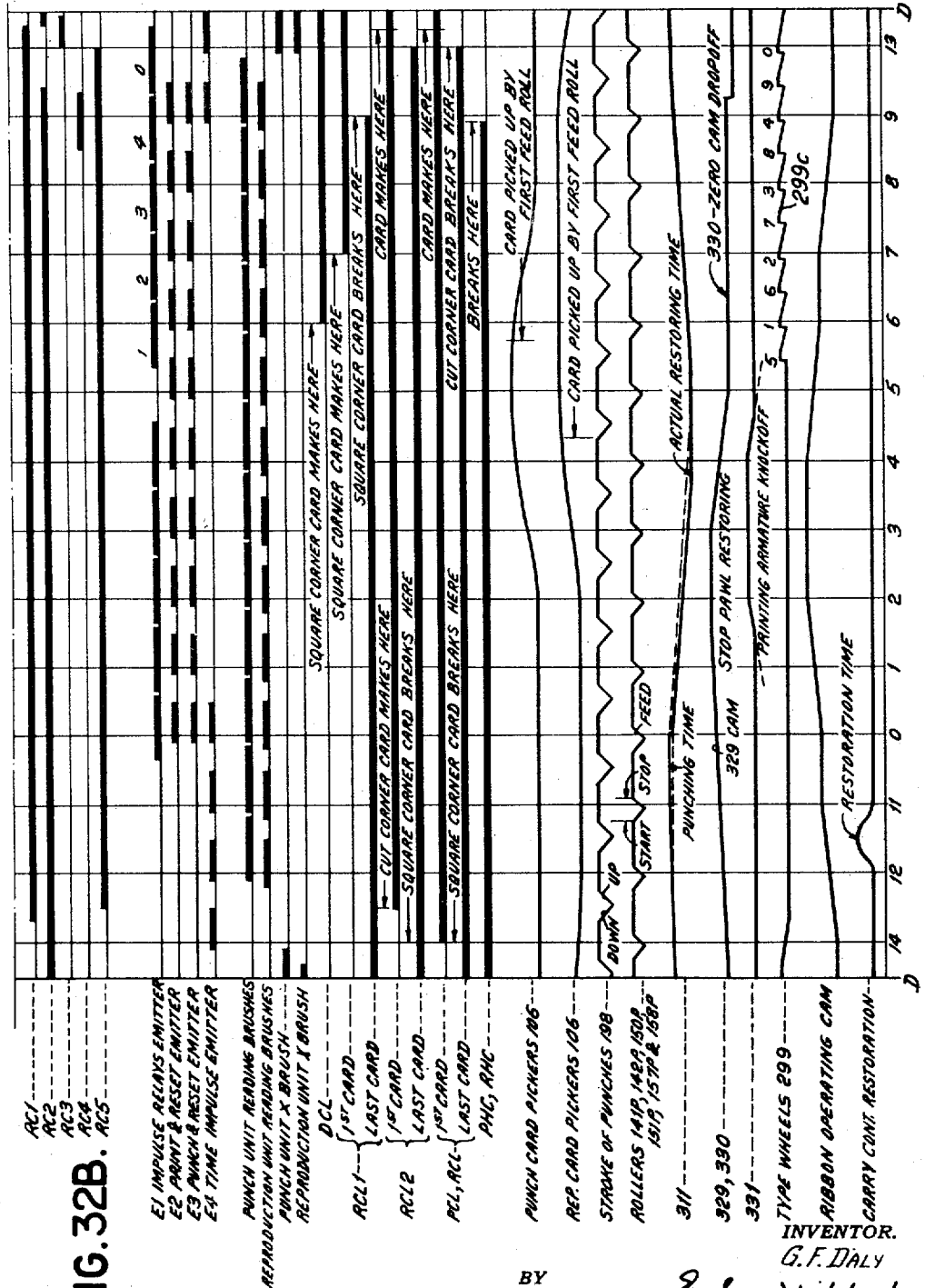

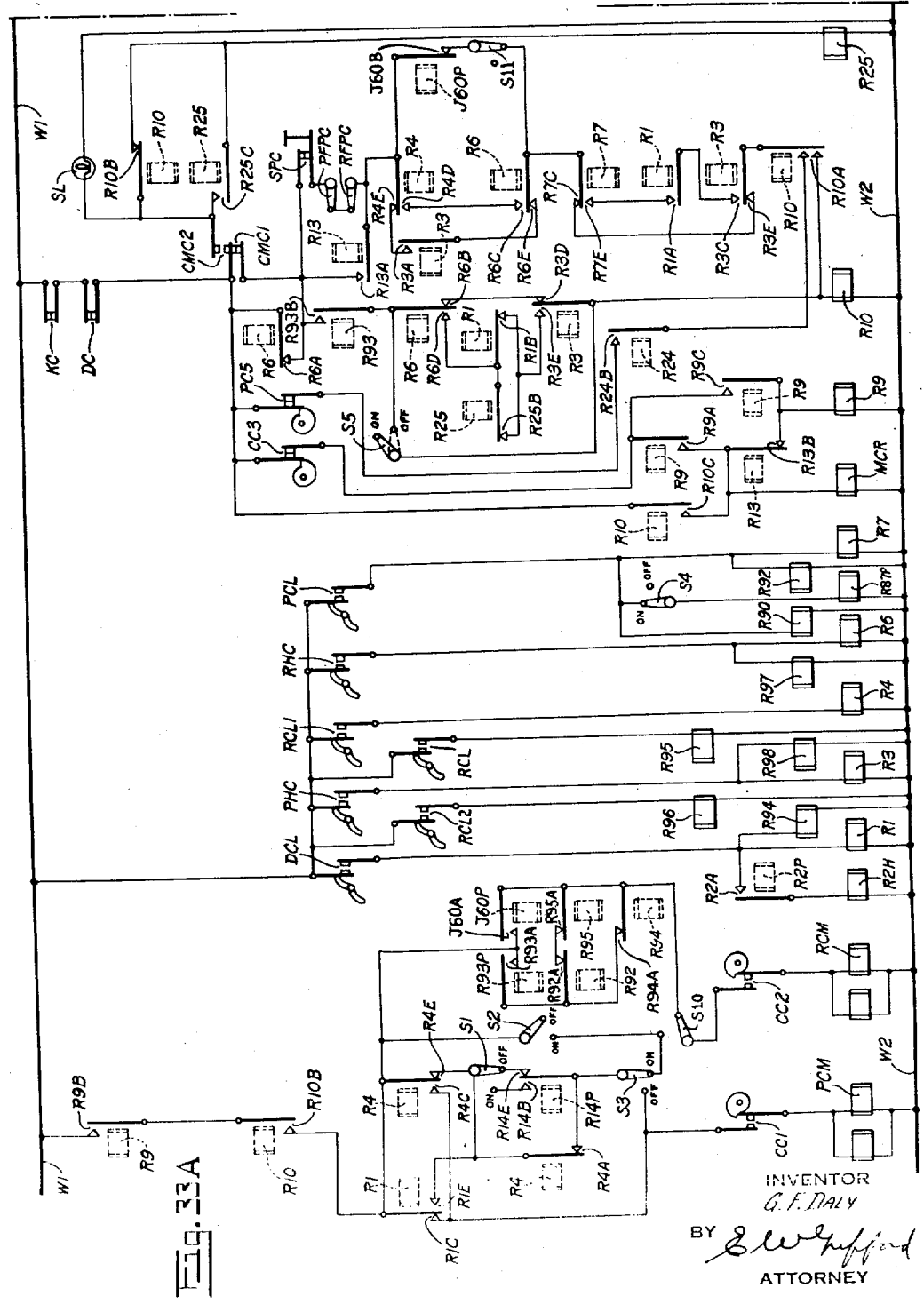

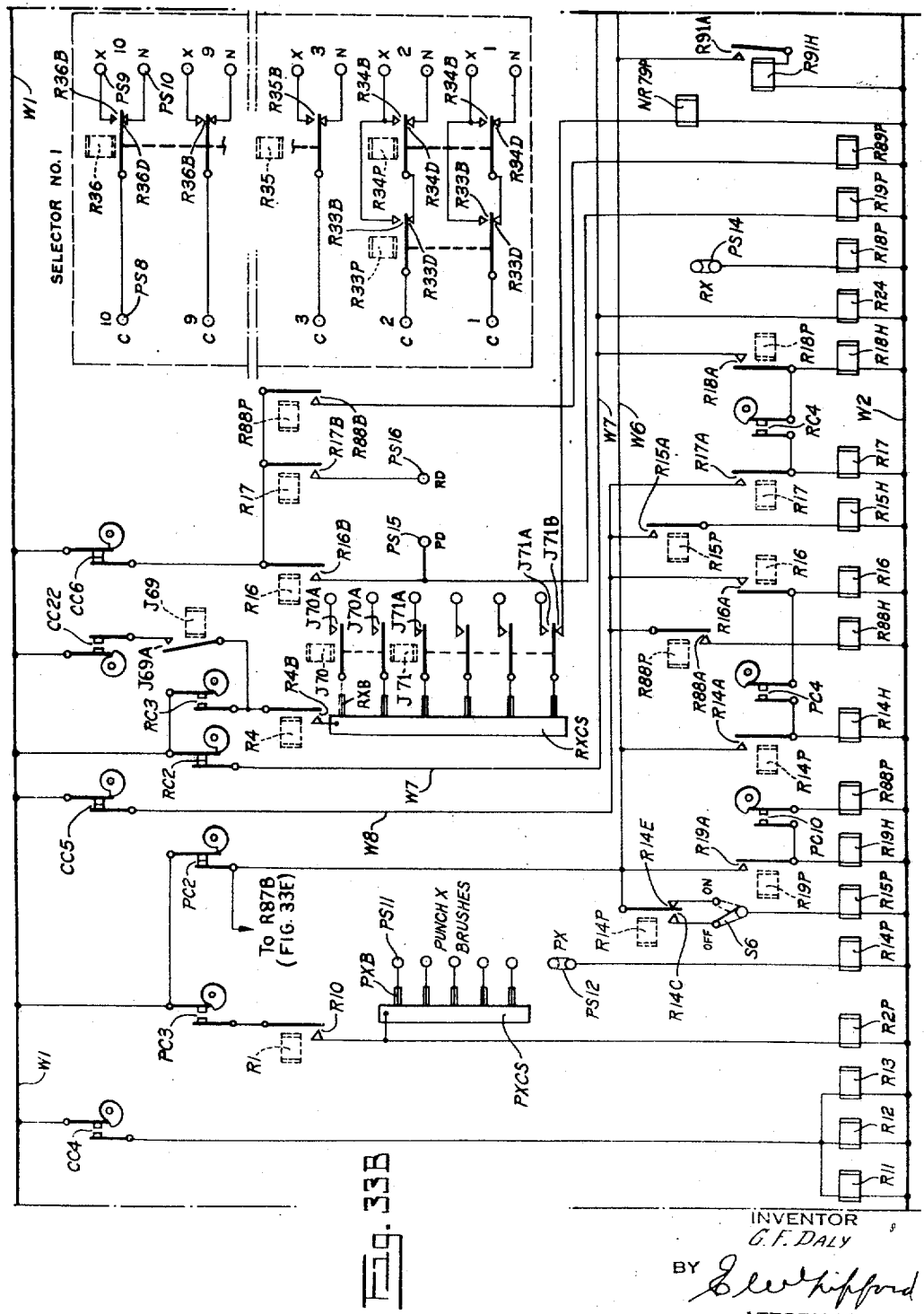

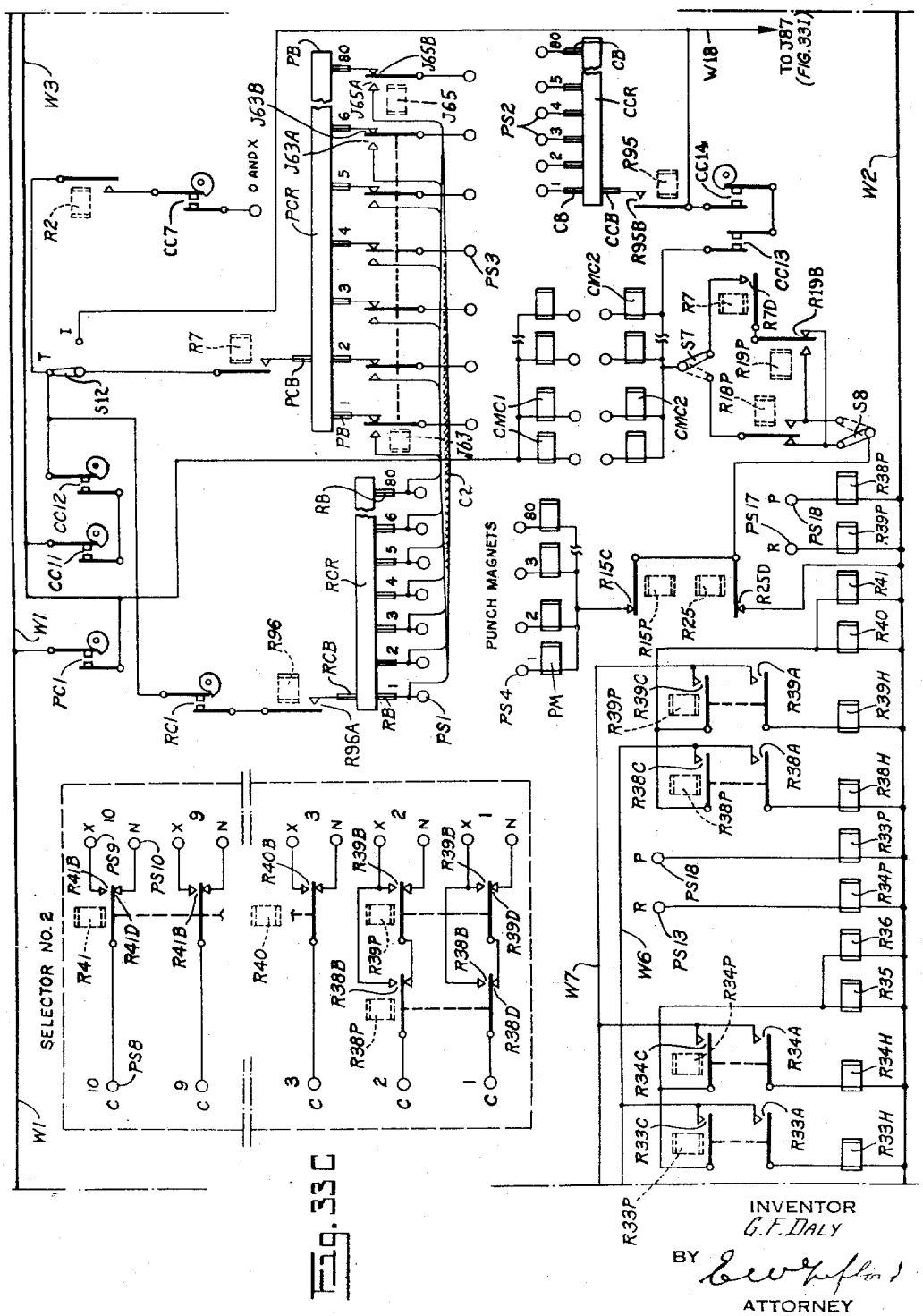

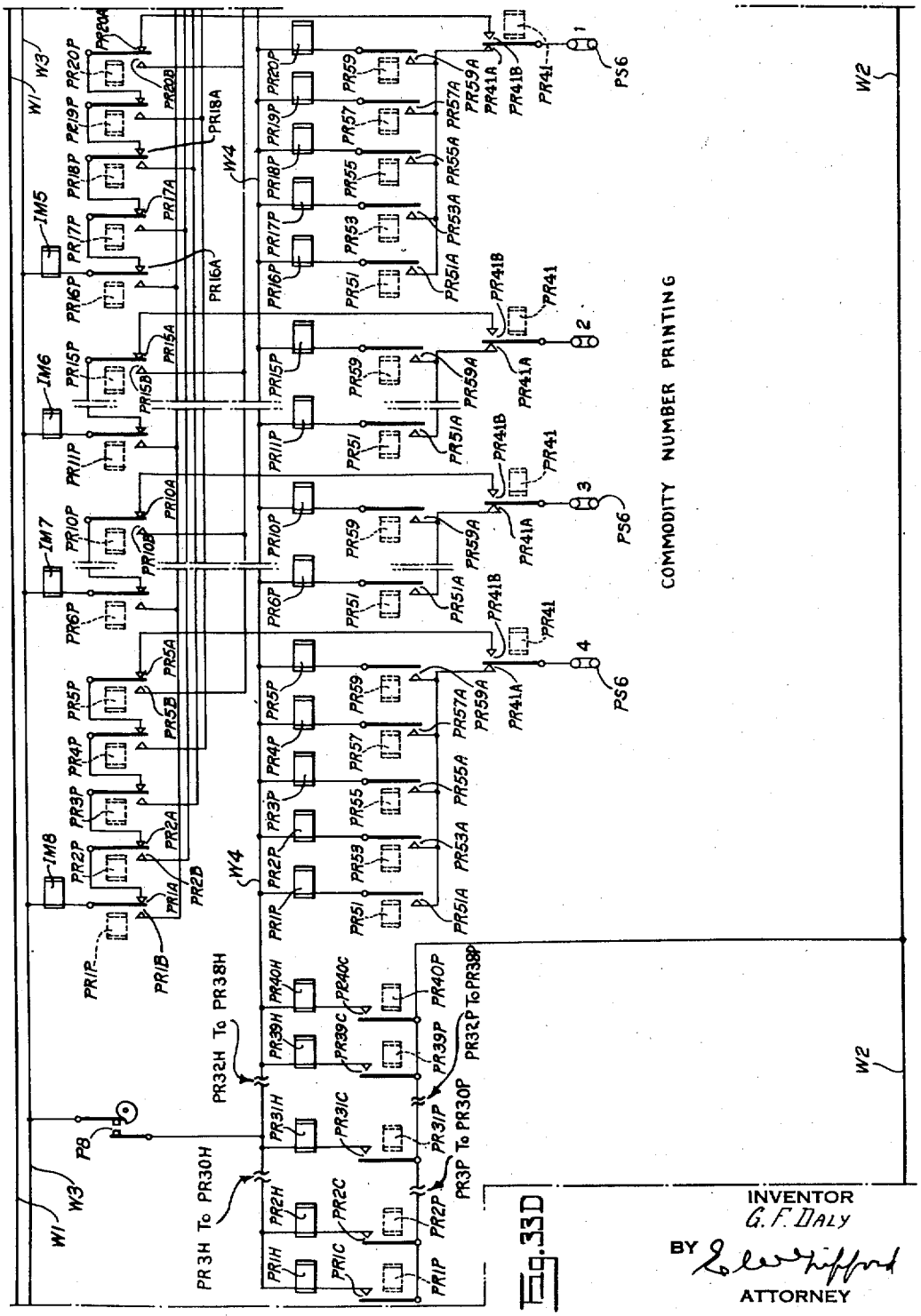

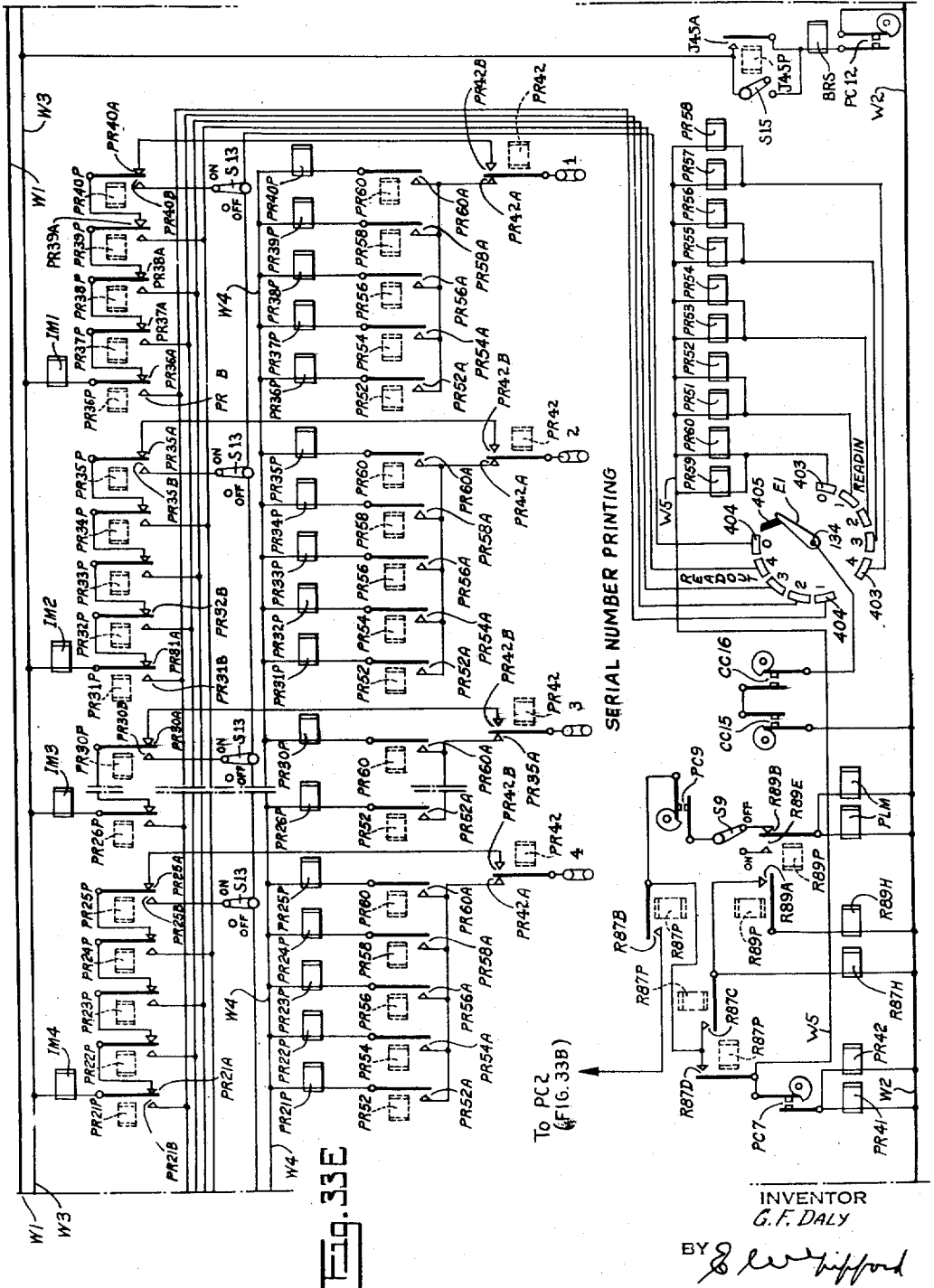

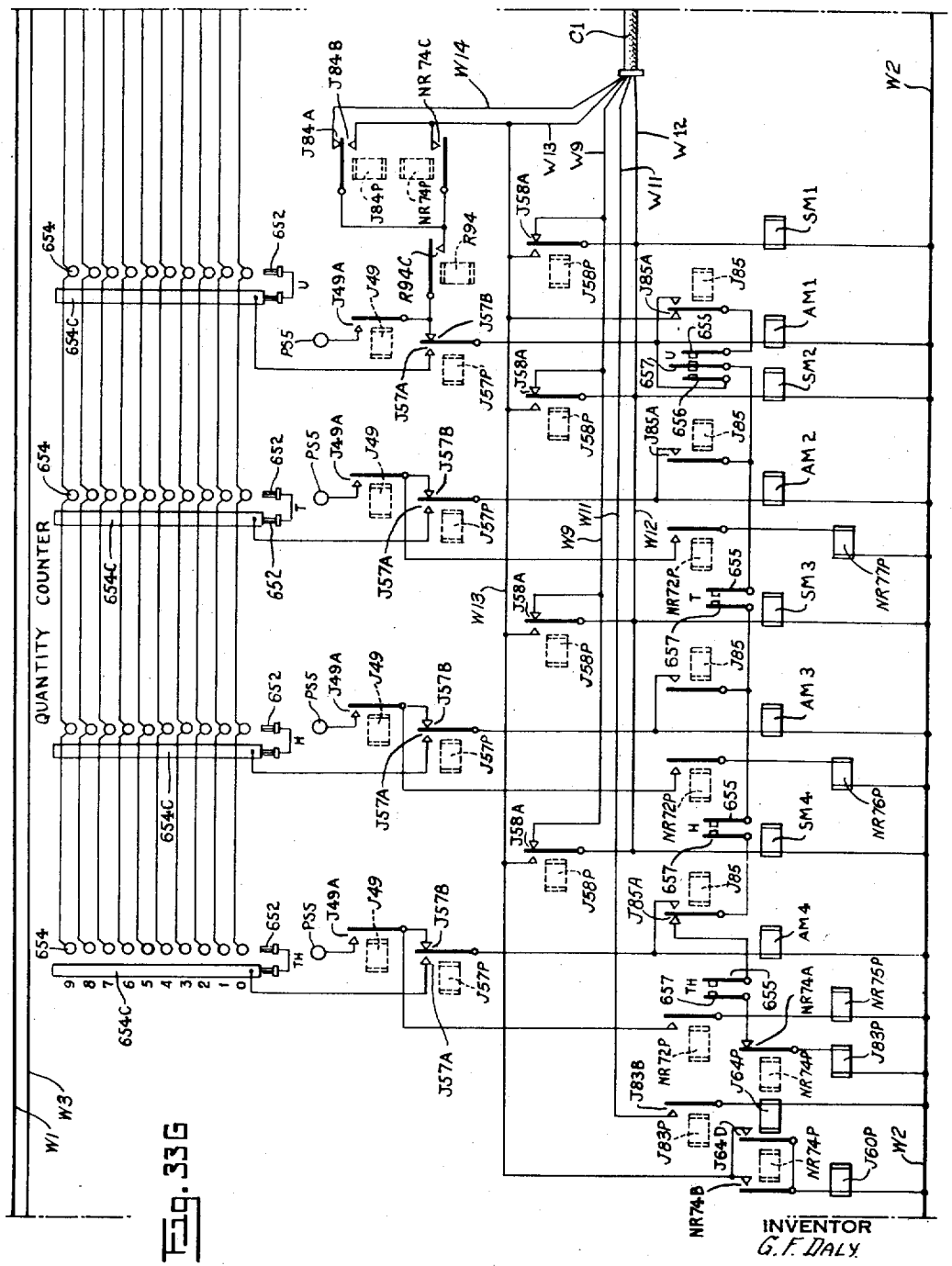

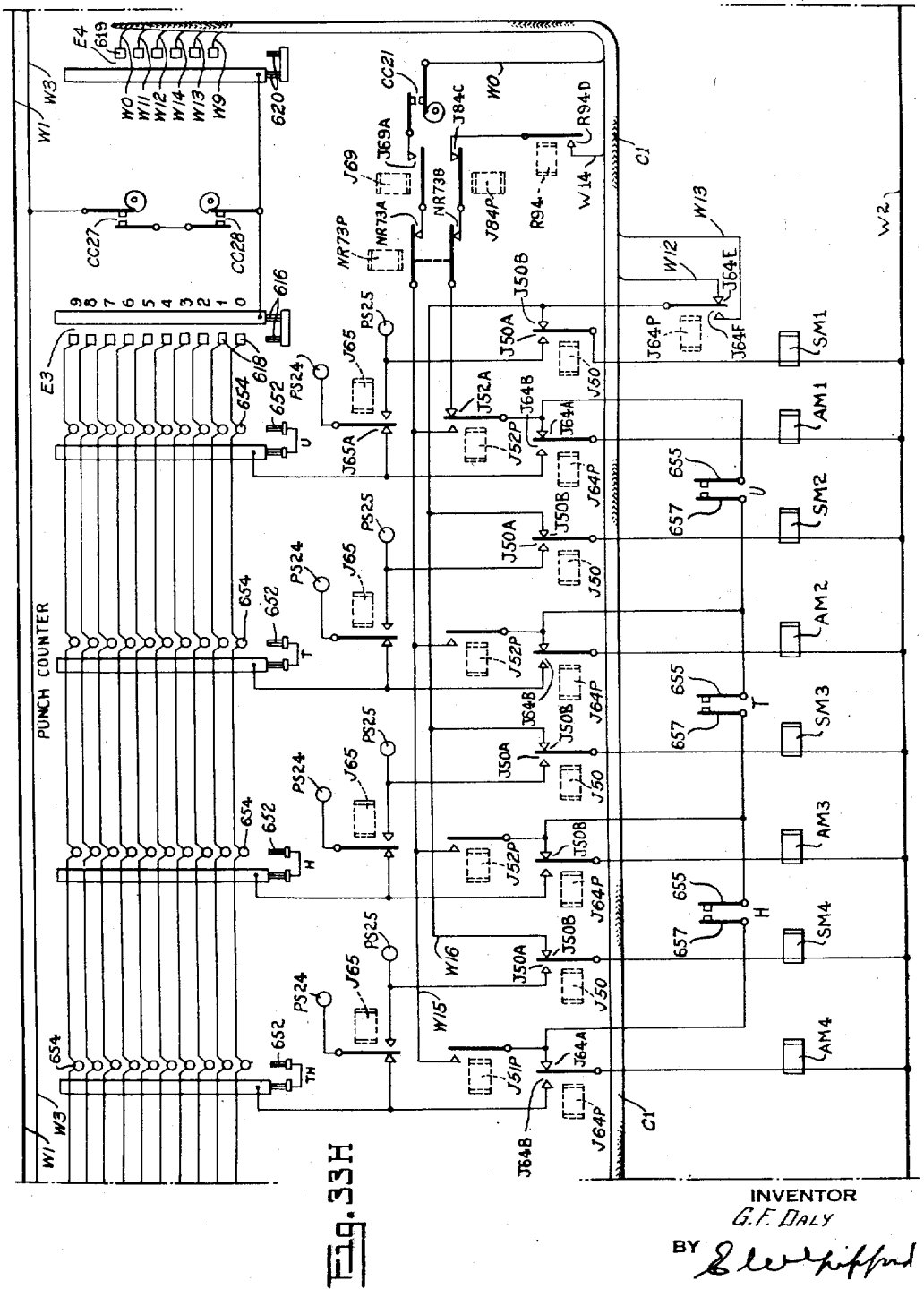

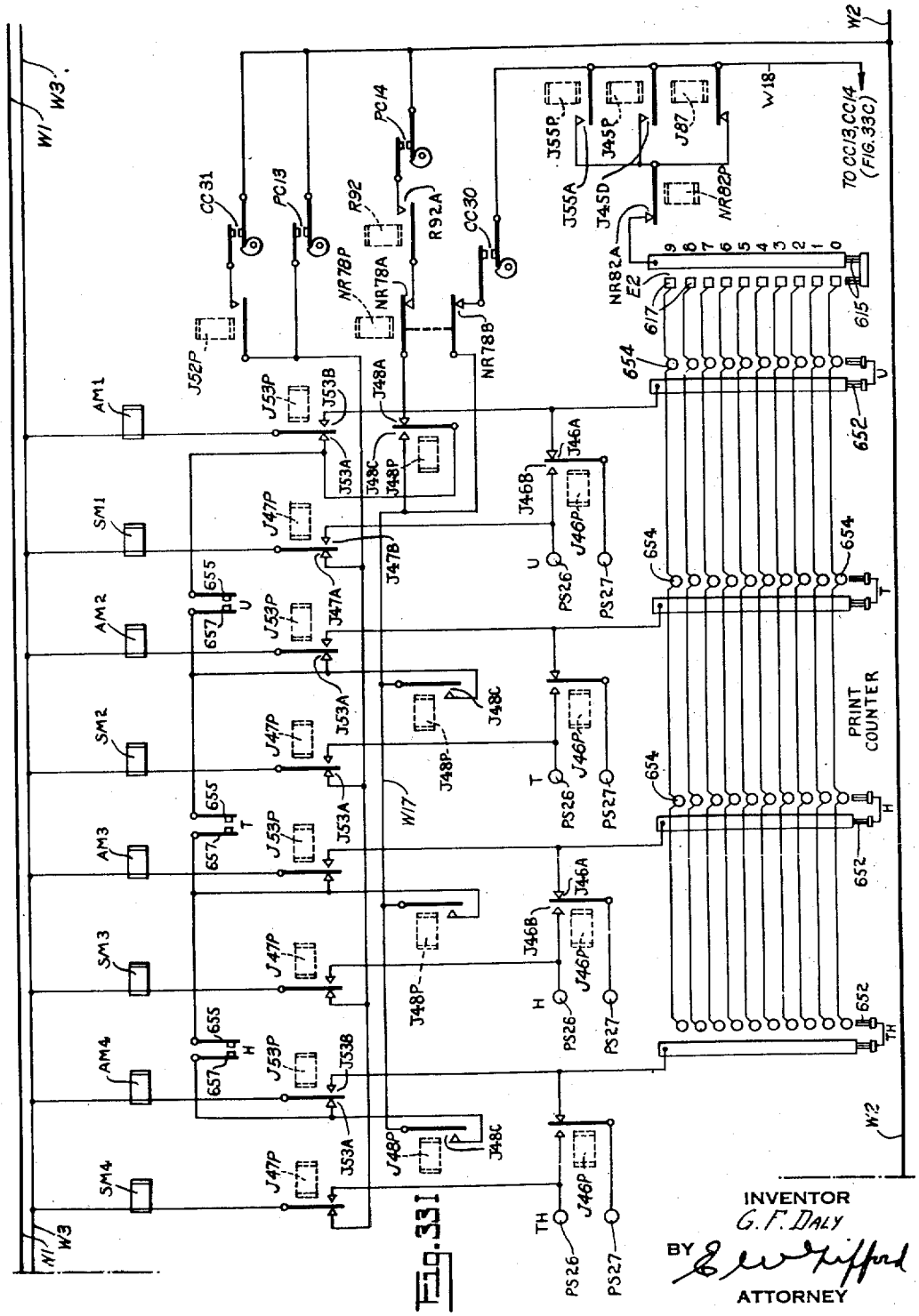

Nov. 28, 1950          G. F. DALY          2,531,873

RECORD CONTROLLED MACHINE

Filed Nov. 26, 1947          31 Sheets-Sheet 29

Fig. 34

INVENTOR
G. F. DALY
BY
ATTORNEY

Nov. 28, 1950  G. F. DALY  2,531,873
RECORD CONTROLLED MACHINE
Filed Nov. 26, 1947  31 Sheets-Sheet 31

INVENTOR
G. F. DALY
BY
ATTORNEY

Patented Nov. 28, 1950

2,531,873

UNITED STATES PATENT OFFICE 2,531,873

RECORD CONTROLLED MACHINE

George F. Daly, Endicott, N. Y., assignor to International Business Machines Corporation, New York, N. Y., a corporation of New York Application November 26, 1947, Serial No. 788,150

37 Claims. (Cl. 164—115)

This invention relates to record controlled machines, particularly to that type commercially known as a reproducer wherein suitable card perforating mechanism is arranged to gang punch records with data designating perforations and capable of utilizing one punched accounting and statistical record card to produce another such card by reproducing the first card wholly or in part. A record controlled machine of this type is disclosed in Patent Re. 21,133 which discloses the structure of the well known "International" high speed reproducer. The present invention, solely as a convenience in disclosure of the invention, has been shown in the drawings and will be described hereinafter as applied to a machine of this type.

The present invention consists of an improvement enabling groups of gang punched cards to be serially number punched and serially number printed under control of master cards.

An object is to provide means for starting the serial number punching of a group of detail cards under control of a master card with any desired number derived from the master card. For example, it may be desired to prepare a file of detail cards comprising groups of varying numbers of detail cards, each group being serially numbered beginning with an arbitrary number derived from a single master card related to the group, each group having its own master card. Other data derived from the master cards may or may not be reproduced in the detail cards as desired. Thus, in a group having a master card serial number punched, say 1801, the detail cards will be punched 1801, 1802, etc.

Another object is to provide means responsive to card quantity designations in the master cards for limiting the number of detail cards in a sequence or group punched under control of the master card.

An object is to provide means for serially number printing the detail cards to correspond with the serial numbers punched, the printing preferably being effected with large size, more readily visible, type.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front elevation of the machine;

Figs. 2A and 2B together comprise a rear elevation of the machine;

Fig. 3A is a vertical section of the reading side of the machine which receives the reproducing or master cards;

Fig. 3B is a similar view of the punch side of the machine in which detail cards are reproduced or gang punched;

Fig. 4A is a plan view of the mechanism shown in Fig. 3A;

Fig. 4B is a plan view of the mechanism shown in Fig. 3B;

Fig. 5A is a vertical section of the typewheel assembly;

Fig. 6 is a large scale detail view of certain of the main driving gears;

Fig. 7 is a detail view in vertical section showing the card punching mechanism in operated position;

Fig. 10 is a front elevation of the printing mechanism;

Fig. 11 is a side view of the printing mechanism;

Fig. 12 is a plan view of the printing mechanism;

Fig. 13 is a view showing certain parts of the printing mechanism in the normal position;

Fig. 16 is a perspective view of the ribbon feeding and reversing mechanism;

Fig. 17 is a large scale partial front view of the locking mechanism for the printing wheels;

Fig. 18 is a vertical section showing the type wheel locking mechanism in locked condition;

Fig. 19 is a view similar to Fig. 17 but showing the locking mechanism released;

Fig. 20 is a detail perspective view of the reading card lever contacts;

Fig. 22 is a detail perspective view of the master card hopper contacts;

Fig. 23 is a detail perspective view of the punch operating hook knock-off bar contacts;

Fig. 24 is a large scale detail view of the sliding driving connection to the printing mechanism;

Fig. 25 is an exploded view of a typical register or accumulator wheel and its driving mechanism;

Fig. 26 is a vertical section through the accumulator mechanism and shows in front elevation one of the accumulator plate units;

Fig. 27 is a left end view of the plate unit of Fig. 26;

Fig. 28 is a vertical section on the line 28—28 in Fig. 26;

Fig. 29 is a vertical section on the line 29—29 in Fig. 27;

Fig. 30 is a detail view showing a register or accumulator wheel in clutched relation to its drive gear;

Fig. 31 is a view of the tens transfer contacts and their operating mechanism;

Figure 32A:
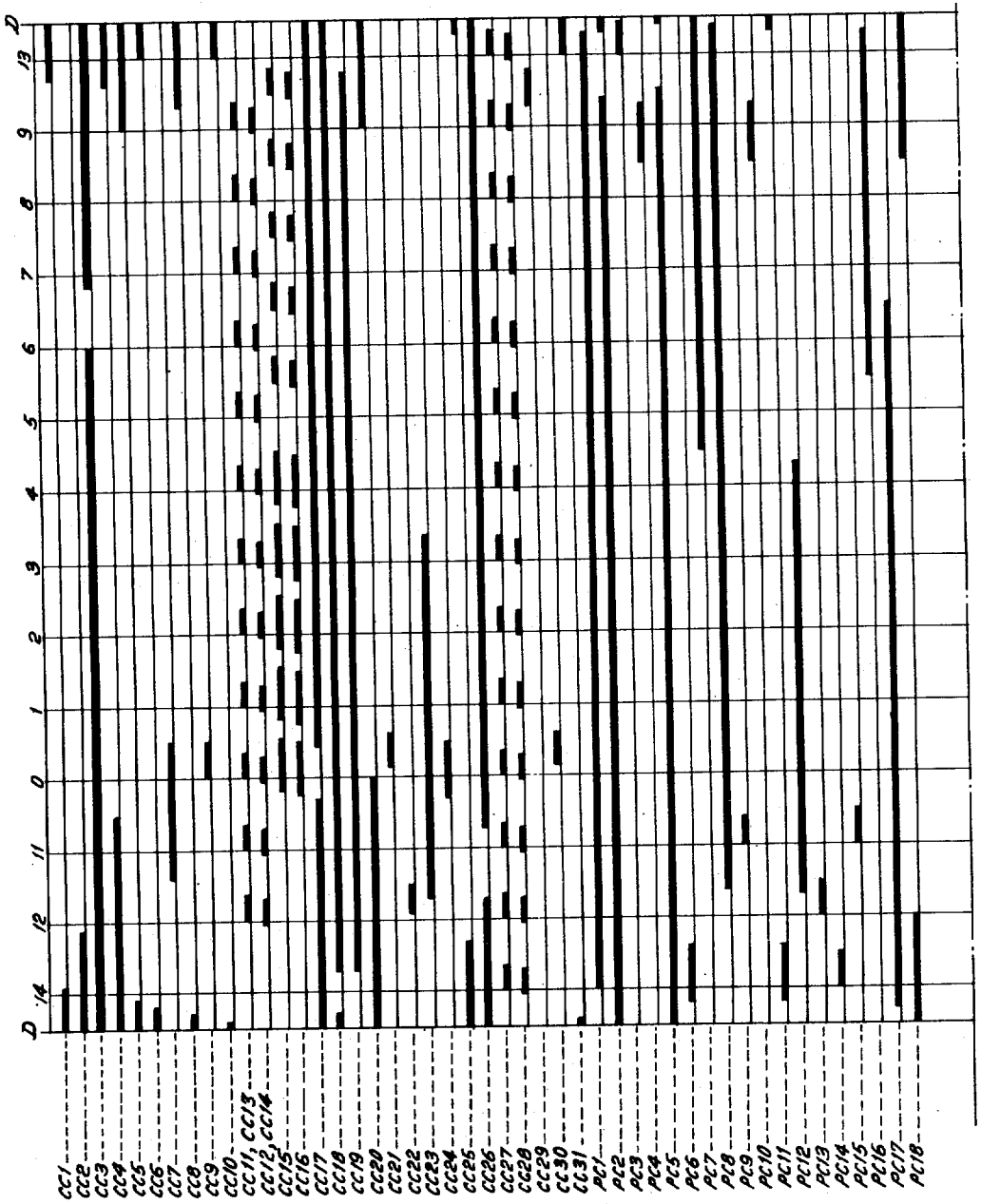
Figure 35:
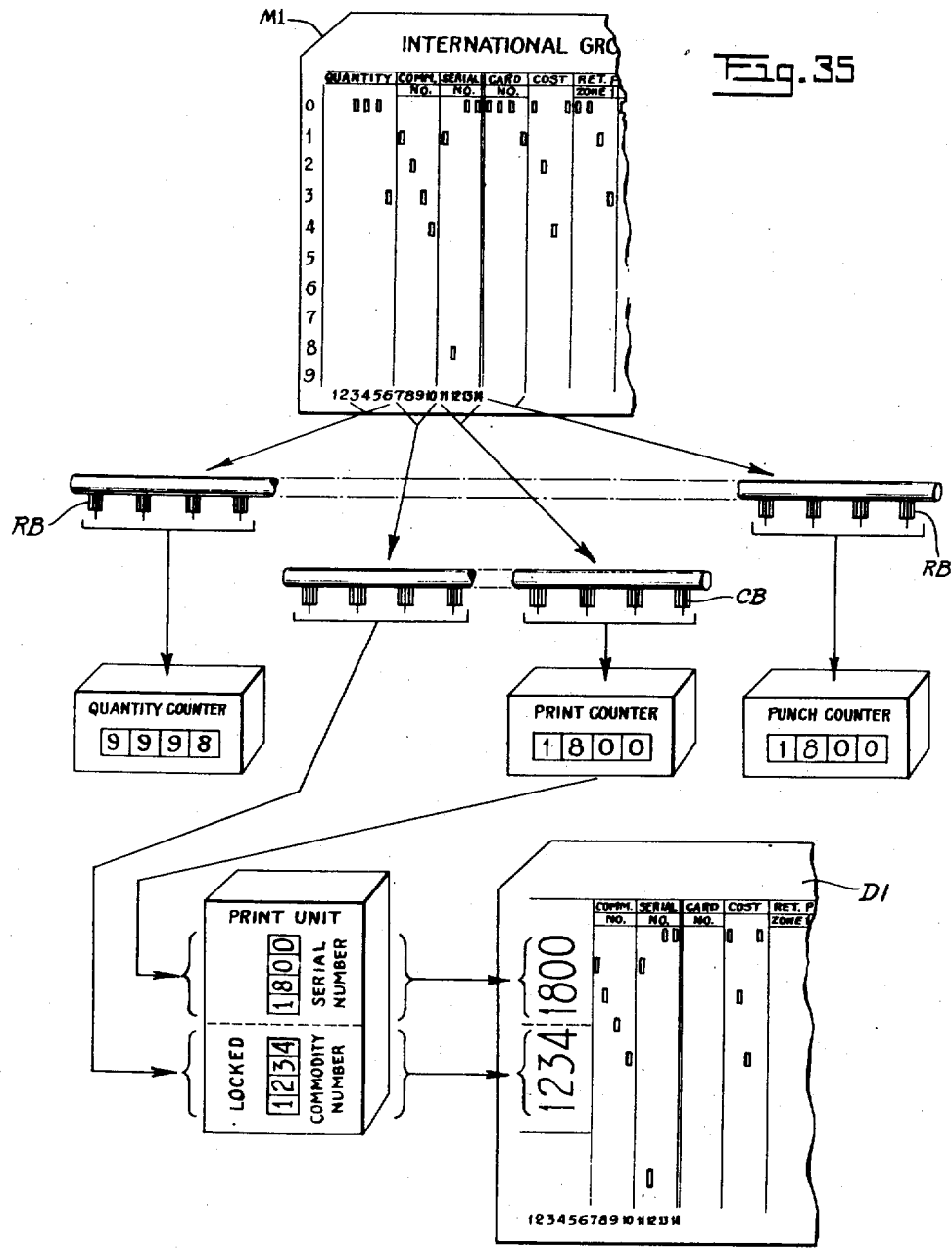

Figs. 32A and 32B together comprise an electrical and mechanical timing chart;

Figs. 33A to 33I comprise a wiring diagram;

Fig. 34 is a view showing the relation and numbering of two successive master cards and their corresponding detail cards;

Fig. 35 is a view showing the relation of a master card to a detail card and the distribution or routing of the data on the first master card of Fig. 34 to the accumulators and first detail card of Fig. 34.

Figure 36:
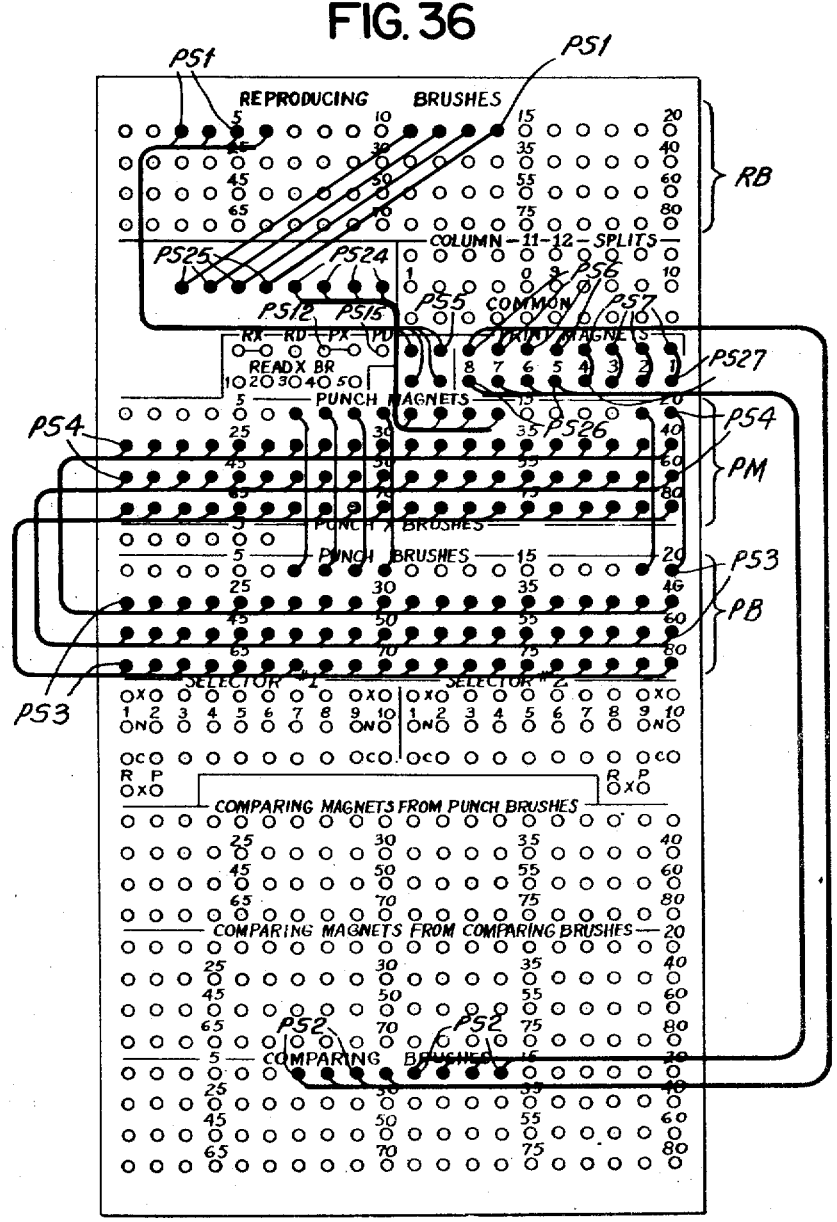

Fig. 36 is a plugboard diagram.

As a convenience in understanding the invention described herein and the description of its operation with respect to the wiring diagram, certain convenient ways have been followed in respect to the designations of the various controlling instrumentalities of the machine such as magnets, contacts, and other parts of the electrical circuits. So far as possible the various electrical elements and certain other parts of the machine have been designated with letters which have been derived from the initials of the words comprising the name of the part. For example, the hoppers in which the record cards are placed have been designated PH and RH, which refer to the punch hopper and the reading hopper, respectively. All relays have been designated with the letter R followed by a number and the contacts of the relays have been designated with the number of the relay followed by the letters A, B, C, etc. For example, R18P designates a relay and the letters R18A, R18B, etc. designate its contacts. In order to avoid a maze of wires in the wiring diagram the contact points of the relays in most cases are separated from each other in the wiring diagram in the most convenient locations, and where the contacts appear alone, the corresponding coil has been shown in dotted lines. In the present case, a number of relays are provided with two coils which are designated with the letters P and H after the number of the relay which signify the initially energized coil, often called a pick-up coil, and the holding coil respectively. For example, R14P designates the coil which is first energized, that is, picked up, in consequence of a pulse of current from a source, while the R14H designates the coil which is subsequently energized to maintain the relay in an energized condition. The controlling magnets, contacts, plug wires, line and bus wires, and the other parts are designated according to the plan mentioned above. Thus, PM designates a punch magnet, CC1 designates continually operating cam contacts; W1, W2, etc. bus wires, and PW1, PW2, etc. plug wires. This terminology will make the wiring diagram as nearly self-explanatory as possible and will facilitate the tracing of circuits with reference to the plugboard diagrams.

The machine includes a base 100 (Figs. 1, 2, 4A, 4B, and 5) on which is mounted parallel front and rear frames 101, 102, respectively, which are secured together in spaced parallel relationship by means of cross frames 103, forming the side walls of the punch and reading hoppers PH and RH, respectively, and by other frames 104 which form the hopper bottoms. The frames 101, 102 are also joined together by a number of cross bars 105 which also act as guides for pressure shoes for certain feed rollers as will be made clear hereinafter.

The machine is provided with two hoppers of which the hopper RH (Figs. 1 to 4B) receives the cards which are to be reproduced and may be called the reading hopper, while the other hopper PH receives the cards to be punched and may be called the punch hopper. As will be noted hereinafter the letters P and H, occurring in the reference numerals or designations of any part, identify the side of the machine with which the part is most intimately associated.

The hoppers are each provided with a pair of card pickers 106 (Figs. 3A, 3B, 4A, and 4B) which oscillate toward and away from the lower edges of the hopper side frames 103, that is to right and left with reference to Figs. 3A and 3B. Each hopper has a pair of side guides 107 which extend vertically and hold the ends of the cards placed in the hoppers in alignment vertically. Each hopper includes a pair of posts 108 secured to frames 104 which posts guide the left hand edges, Figs. 3A and 3B, of the cards in the hoppers. The hoppers are also provided with follower weights 109 of well known construction which are placed on top of the cards in the hoppers to keep them flat as far as possible.

The pickers 106 include slides 110 (Figs. 3A, 3B, 4A, and 4B) which are guided in suitable ways in the hopper bottom frames 104 and mesh with gear sectors 111 secured to shafts 112 journaled in the frames 101, 102. These pickers are oscillated by means which will be made clear hereinafter in describing the driving connections of the machine.

The machine is driven by a suitable driving motor (not shown) mounted on the right hand end of the base 100 with reference to Fig. 1. The driving pulley of the motor is connected by a belt 116 (Figs. 2A, 4B, and 8) to a main drive pulley 117 on a main drive shaft 118. This drive shaft is rotatable in a gear casing 119 which contains the bulk of the driving gears for the feed rollers and the punch mechanism on the punch side of the machine. The gear casing 119 is secured to the back of the rear frame 102.

Secured to the main drive shaft 118 is a gear 120 (Figs. 2A, 4B, 6, and 8) meshing with gear 121 fixed to a shaft 122 which extends outside of the gear casing 119 and has secured to it a pinion 123 meshing with a large gear 124 loose on a shaft 125. Also secured to the gear 124 and loose on shaft 125 is a gear 126 which meshes with a large gear 127 on a stud 128. A large gear 129 meshes with gear 127 and is rotatably mounted on a stud 130. The gear 129 drives a smaller gear 131 loose on a cam shaft 132 rotatably supported in the frame. The gear 131 drives a gear 133 on a shaft 134 which is rotatably mounted in the frames 101, 102. The train of gearing comprising the gears 120, 121, 123, 124, 126, 127, 129, 131, and 133 rotate continually while the machine is in operation.

Mounted on the shaft 134 are cams 135, which operate timing contacts which are designated CC1 to CC14 in Figs. 32A and 33A to 33I.

Figure 9:
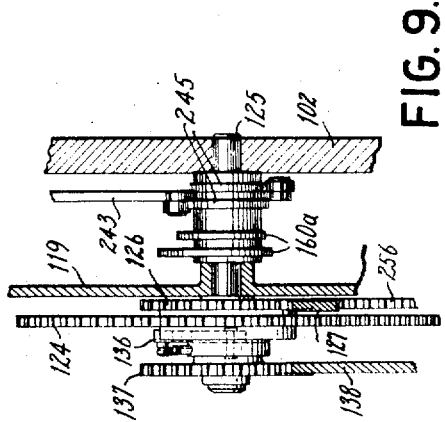
Fig. 9 is a vertical section on the line 9—9 in Fig. 6.

The shaft 125 may be driven by the gear 124 through the punch clutch mechanism which includes a one-revolution clutch generally designated 136 in Figs. 2A, 4B, and 9 of well known form which is controlled by the punch clutch magnet PCM (Fig. 2) secured to the rear face of frame 102 (Fig. 2). When the magnet PCM is energized the one-revolution clutch 136 is engaged and couples gear 124 to the shaft 125. This shaft carries a gear 137 which meshes with a larger gear 138 loose on the stud 128. The gear 138 meshes with a gear 139 fixed on a shaft 140 rotatably supported in the framework. The shaft 140 is part of a feed roller assembly 141R (Fig. 3A) which is journaled in the frame plates 101, 102 and cooperates with a feed roller 142R. Also secured to the shaft 140 is a gear 143 meshing with a gear 144 secured to a cam shaft 145. This shaft is rotatably mounted in the rear frame plate 102 and a support frame 146 secured to the rear frame plate.

Secured to the shaft 145 is a series of cams 147 (Figs. 2A and 4A) operating contacts designated PC1 to PC5, respectively, in Figs. 33A to 33I. These contacts are insulatably mounted on the frame 146. The gear 144 meshes with a gear 148 which is secured to a shaft 149 (Fig. 2A) which is part of a feed roller 150R (Fig. 3A) rotatably mounted in the frame plates 101, 102. The feed roller 150R has a cooperating feed roller 151R and the pairs of feed rollers 141R, 142R and 150R, 151R are similar in construction. These pairs of feed rollers are interconnected by small gears 152 (Figs. 2A and 4A) whereby the feed rollers are rotated through the train of gearing just described whenever the punch clutch is engaged by energizing the magnet PCM.

The gear 131 on cam shaft 132 also may be coupled to the shaft 132 through a one-revolution clutch generally designated 153 in Figs. 2A and 4A which is controlled by a reading clutch magnet RCM (Fig. 2A). Secured to the shaft 132 is a series of cams 154 (see Fig. 4A also) which actuate contacts designated RC1 to RC4 in Figs. 20 and 33A to 33I and insulatably mounted on the frame of the machine. Also secured to the shaft 132 is a gear 155 of the same diameter as a gear 131 (Figs. 2A and 4A) which meshes with a gear 156 secured to a feed roller shaft 157R (see Fig. 3A also) rotatably mounted in the frame plates 101, 102. Cooperating with the feed roller 157R is a feed roller 158R and gears 159 (Figs. 2A and 4A), similar to the gears 152, are provided to couple the feed rollers 157R, 158R together.

It will be clear from the foregoing description that, when both the punch clutch magnet PCM and the reading clutch magnet RCM are energized, the pairs of feed rollers 141R, 142R, 150R, 151R; and 157R, 158R will be rotated to advance a card from the reading hopper RH to the right (Figs. 3A and 4A).

The shaft 132 carries an eccentric strap 160 (Fig. 4A) connected to an arm 161 secured to the picker operating shaft 112 associated with the reading hopper RH. Thus, when the feed rollers 157R, 158R are operative, the picker 106 for the reading hopper RH also will be reciprocated, but the clutch 153 provides a means by which the feeding of cards from the hopper RH may be stopped when necessary. The reason for this construction will be more clearly explained hereinafter.

The lower feed rollers 142R, 151R, 158R are mounted on arms 162 (Fig. 1) which are pivotally mounted in recesses formed in the frame plates 101, 102 and are spring-pressed upwardly by pressure shoes 163 (Fig. 3A) on the upper ends of plungers 164 slidably mounted in vertical holes in the cross bars 105 and urged upwardly by means of coil springs 165.

Located between the three pairs of feed rollers associated with the reading hopper RH (Figs. 1, 3A, and 4A) are two record sensing stations which include reading contact roller RCR and comparing contact roller CCR which are rotatably mounted in the frames 101, 102. These contact rollers are provided with gears 166 meshing with idler gears 167 carried by studs on the frame 102. The idler for the contact roller RCR meshes with upper gear 159, while the idler gear 167 for the contact roller CCR meshes with the upper gear 152 secured to the shaft 149 whereby both contact rollers are rotated at approximately the same rate and in the same direction as the upper feed rollers 141R, 150R, 157R.

Cooperating with the contact rollers RCR and CCR, (Figs. 1 and 3A) are the reading brushes RB and the comparing brushes CB, respectively, which are mounted in brush carrying bars 168 secured in frames 169 slidably mounted in guides 170 carried by the frames 101, 102. The frames 169 are provided with spring pressed plungers 171, which may be seen in Fig. 8, cooperating with holes in blocks 172 adjustably slidably mounted for vertical movement in the frame 101, 102. These blocks have T-slots milled horizontally and transversely of their lower ends to rotatably receive the grooved ends of screw studs 173 whereby the frames 169 may be adjusted vertically, yet may be readily removed without disturbing the adjustment, it being merely necessary to pull the plungers 171 inwardly toward the center of the machine (Fig. 8) to permit dropping the brush frames with their brushes.

Cooperating with the contact rollers RCR, CCR are two sets of common contact roller brushes RCB, CCB, respectively (Figs. 3A and 4A), which are carried by a metallic bracket 174 in the case of brushes RCB and by a metallic short bar 175 in the case of the brushes CCB. The bracket and bar are suitably insulated from each other and from a support bar 176 secured to the frame plates 101, 102.

The punch side of the machine is similarly provided with feed rollers, contact rollers and brushes disposed in the same relative positions, the punch brushes PB and the punch contact roller PCR being located on the punch side of the machine in the same relative position with respect to the punch hopper PH as the brushes CB and contact roller CCR (Fig. 3A) are located relative to hopper RH. However, the corresponding pairs of feed rollers are designated 141P, 142P; 150P, 151P; 157P, 158P (Figs. 1, 3B, and 4B). Instead of having a contact roller and a set of brushes between the pairs of feed rollers 150P, 151P and 157P, 158P, there is provided a row of punches and a punch die. The punches have approximately the same relative positions with respect to hopper PH as the brushes RB in Fig. 3A have with respect to the punch hopper PH. However, the feed rollers on the punch side of the machine just mentioned are operated intermittently instead of continuously.

Associated with the reading mechanism shown in Figs. 3A and 4A is a series of circuit controlling contacts which indicate the presence or absence of record cards in the various sensing stations and the hoppers respectively. There is a similar set of these contacts on the punch side of the machine in identical locations, therefore, a description of the contacts on the reading side of the machine will be sufficient.

The first set of contacts involved are the reading hopper contacts RHC (Figs. 3A and 22). These contacts are secured to a plate 180 which has bent-over card guide portions 180a projecting upwardly toward the plane of a card fed from the reading hopper RH. The contacts RHC are operated by a lever 181 pivoted at 182 on a projecting portion of the hopper bottom frame 104. The lever 181 extends upwardly through a slot 104A in the frame 104 (Fig. 4A) whereby, when cards are placed in the hopper, they will rest upon the lever 181 and close the contacts RHC.

The next set of control contacts are the reading card lever contacts designated RCL1, which are insulatably mounted on the underside of the hopper bottom frame 104 as shown in Fig. 3A. These contacts are operated by an extension 183a (Fig. 20) of a bail 183 which is mounted on pivots 183b carried by a block 183c secured to the rear frame 102 between the feed roller 157R and the contact roller RCR. This bail 183 is provided with a runner 183d designed to be engaged by the cards and lifted so as to rock the bail 183 and the extension 183a counterclockwise (Fig. 20) to close the contacts RCL1.

When a card is about to pass under the contact roller RCR, its leading edge engages a lever 184 pivotally mounted at 185 on a block 186a on a cross frame 186 and rocks said lever counterclockwise in Fig. 3A. This movement closes a pair of contacts RCL2 which are insulatably mounted on a bracket 186b attached to block 186a. The timing of the card lever contacts is such that contacts RCL2 close after the brushes RB have barely moved over upon the top of the card along the reading edge. A similar card lever 184 is provided adjacent the contact roller CCR and, under similar conditions operates a pair of contacts RCL mounted on a bracket 186c carried by bar 176. On the punch side of the machine there is provided the punch hopper contacts PHC, die card lever contacts DCL, and contacts PCL which correspond to the contacts RHC, RCL1, and RCL, respectively, on the reading side of the machine.

The reading side of the machine is provided with a card receiving pocket RP having the usual vertically moving card supporting platform 187 of well known form. Associated with this pocket is a stacking mechanism most clearly shown in Figs. 3A and 4A. Secured to a shaft 188 are two stacker blocks 189 which it is preferred to form of a resilient material like rubber. The shaft 188 is connected by a train of gears 190 to a small gear 191 secured to the lower feed roller shaft 142R whereby the stacker blocks 189 are rotated in the opposite direction to the feed roller 142R. Above the pocket RP there is provided a deflector plate 192 having slots 192a to accommodate the stacker blocks 189. A card fed horizontally by the feed rollers 141R, 142R strikes the deflector plate 192 and is deflected downwardly and eventually will be gripped by the curved ends of the stacker blocks 189.

The card platform 187 is urged upwardly by means of the usual spring, not shown, which normally tends to press cards accumulated on the platform up against guide blocks 192b (Fig. 3A) secured to the plate 192 bent horizontally to the right in transverse section at a point opposite the shaft 188. As soon as the leading edge of a card fed by the rollers 141R, 142R, strikes the top card in the pocket RP the stacker blocks 189 come into action and press the card downwardly on the cards already in the pocket RP and at the same time frictionally carries the card to the right until it strikes the side walls of the pocket. These side walls consist of plates 193 vertically supported between frame plates 101, 102 and mounted on said plates and the base 100 of the machine.

Associated with pocket RP is a miniature lever switch of conventional form and designated RFPC, meaning "reproducer full pocket contacts." This switch is of the spring lever type which has only one normal position of the lever and is spring urged back to that position when released. Normally the lever projects upwardly but is in the path of the card supporting plate whereby, when the pocket RP becomes full, the switch RFPC will be opened to control circuits which stop the machine, as will be made clear hereinafter.

Associated with the feed rollers 157P, 158P and 157R, 158R are the X-brushes which sense the so-called X-holes in advance of the passage of the cards from the hoppers PH and RH past the punches and the brushes RB, respectively, as will be seen hereinafter. These X-holes exercise certain special control functions which determine how punching and printing is to be controlled. Secured to the right-hand faces of the hopper side plate 103 (Figs. 3A, 3B, 4A, and 4B) are the bars 194 which are slotted vertically on the right-hand faces of the bars with as many slots as there are brushes or punches. In the present case a machine designed to handle the so-called 80-column cards, having rectangular perforations, has been disclosed, consequently the bars 194 will be equipped with 80 notches each.

Each bar 194 is provided with a number of brush carriers 195 having an X brush, designated RXB in the case of the reading side of the machine (Figs. 3A and 4A), and PXB in the case of the punch side of the machine (Figs. 3B and 4B). The bars 194 have a rib along their lower right-hand corners which is wedge shaped with the apex of the wedge pointing downwardly and the brush holders 195 have a hook shaped portion which can be engaged with the rib. The brush holders 195 also have a toothed portion which projects into a slot in the bar 194 to hold the brush holder against displacement longitudinally of the bar 194 and also hold the brush holders erect. A thumb screw 196 on each brush holder provides a means for clamping the brush holder to the bar. While the specific number of brush holders is not particularly important, it is assumed for convenience in the present case that five are provided which at will may be set along the bar to correspond with any desired column on a card fed from the hopper.

Brushes RXB (Figs. 3A and 4A) cooperate with a common strip RXCS which are insulatably mounted on the frame 169 for the brushes RB. The brushes PXB (Figs. 3B and 4B) on the punch side of the machine similarly cooperate with a common strip PXCS which is insulatably mounted on the die of the punch mechanism. Since the die is removable, as will be explained hereinafter, there is provided a three pronged contact spring or finger 197 secured to the rear frame 103 (Fig. 3B) and the three prongs on the contact spring engage the end of the contact strip PXCS to maintain electrical contact with the external control circuits of the machine when the die is in place. In the case of the strip RXCS, this connection is established by an extra wire in the cable which connects the brushes RB to the plugboard.

Figure 15:
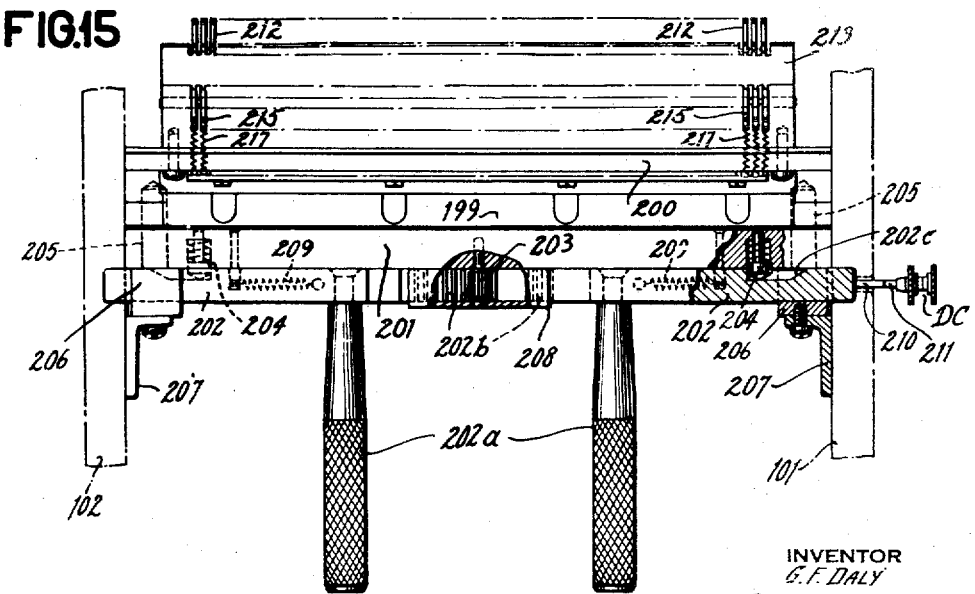
Fig. 15 is a large scale view in elevation of the punching mechanism taken on the line 15—15 of Fig. 3B.

The perforating mechanism includes punches 198 (Figs. 3A and 7), which are vertically guided in a stripper plate 199 and a plate 200 and cooperate with a die 201 which is made removable. Slidably mounted on the underside of the die 201 is a pair of bolts 202 (Figs. 3B and 15) having handles 202a which extend downwardly. Each bolt 202 has a rack portion 202b meshing with a pinion 203 pivotally mounted on the underside of the die. The ends of the bolts 202 are received in horizontal slots in the frames 101, 102 to permit the die to be moved horizontally in the direction of card feed for the purpose of adjustment. The pinion 203 and the racks 202b cause the bolts 202 to move in unison when being withdrawn from, or reseated in, the frames 101, 102.

Each bolt 202 has a cam portion 202c engaging a spring pressed plunger 204 when the bolts are fully withdrawn from the slots to force the plungers upwardly and separate the die 201 from the stripper 199. For the purpose of holding the stripper 199 and the die 201 in alignment guide pins 205 are provided which are secured in suitable holes in the dies located outside of the path of the card. Since these pins must of necessity fit quite closely to assure perfect alignment of the punches with the die openings, the plungers 204 are desirable to loosen the die when it is desired to remove it since it will have some tendency to stick. The common strip PXCS is attached to the left-hand edge (Fig. 3B) of the die 201 and is insulated from the die by a strip of insulating material.

The bolts 202 are partly guided in blocks 206 to the lower faces of which are attached angular guide pieces 207 which prevent the die from tilting too much on a horizontal axis parallel with the frame plates of the machine when the die is dropped. This helps to prevent jamming of the die when it is being removed or inserted. The inner ends of the bolts 202 are guided by a box like member 208 secured to the underside of the die 201 and, with the bottom face of the die 201, surrounding the inner ends of the bolts. Springs 209, attached to pins carried by the bolts 202 and by the die 201, tend to force the bolts 202 toward the frames 101, 102.

Since it is undesirable that the machine be operated without the die, means are provided to prevent starting the machine when the die has been removed and through carelessness has not been replaced. Mounted on the front face of the frame 101 (Figs. 1, 4B, 8, and 15) are contacts designated DC, hereinafter called the die contacts, having a long pin 210 extending through a small hole in the frame 101 opposite the end of the front bolt 202 and normally holding the contacts DC closed when the die is in place. However, if the die is removed, the retraction of the right-hand bolt 202 (Fig. 15) will allow the plunger 210 to move deeper into the hole in frame 101 and permit contacts DC to open. A short stop pin 211 on the contacts DC adjacent the plunger 210 limits the opening movement of the contacts by striking the side of the frame 101.

With the intercoupling of the bolts 202 by means of the pinion 203, it is impossible to leave the die in a partly latched position and still start the machine. For example, it would be impossible to have the right-hand bolt 202 fully in its socket with the left-hand bolt bearing against the inside of the frame 102, since the left-hand bolt through the pinion 203, would keep the right-hand bolt retracted, permitting the contacts DC to open. Thus, the die must not only be in place, but it must be fully latched before the machine can be started as will be made clear hereinafter.

Pivotally mounted on the upper end of each punch 198 (Figs. 3B and 7) is a punch operating hook 212 which is urged in a counterclockwise direction (Fig. 3B) by a spring 214 anchored to a spring anchoring bar 213. This spring anchoring bar is slotted to guide the operating hooks 212, but movement of the hooks in a counterclockwise direction is limited by stop dogs 215 which are in alignment with the slots in the bar 213 and the hooks 212 and the latter normally rest against the ends of the dogs 215. The dogs 215 are pivoted on a wire 216 and are actuated by springs 219, each dog having a stop portion bearing against the left-hand side of bar 218 which is mounted on the plate 200 and supports both the spring anchoring and hook guide bar 213 and the wire 216.

Each punch is connected by a link 219 (Fig. 3B) to an arm 220 forming part of an armature 221 pivoted at 222 to a frame 223. The latter supports the armatures 221 and the magnet coils PM each of which is associated with one of the armatures 221. The cross pieces are supported in grooves 224a formed in a punch supporting frame 224. This frame also supports the stripper plate 199, guide plate 200, and the bars 213, 218. This punch support frame is adjustably slidable horizontally between the frames 101, 102 for the purpose of adjusting the punches.

Pivoted on a cross shaft 225 (Figs. 3B, 4B, 5, 7 and 8) is a punch operating frame 226 to which is pivotally connected, by means of pins 227a, a pair of sockets 227 receiving one of the threaded ends of the double ended studs having right and left-hand threads, respectively, the other ends of which are threaded into members 229 which act as housings for roller bearings 230. The inner part of the roller bearings 230 are mounted on an eccentric portion of a shaft 231. The studs 228 are provided with lock nuts and a hexagonal portion at the center to enable the angularity of the frame 226 to be adjusted relative to the horizontal.

Secured to the left-hand edge of the frame 226 is a punch operating bar 232. The shaft 231 is mounted in bearings 234 (Figs. 4B, 5, and 8) carried by the frames 101, 102. Extending parallel with the punch operating bar 232 and the row of punch hooks 212 is a knock-off bar 235.

There is a punch 198, an operating hook 212, and a punch magnet PM associated with each column on the card, which in the present case will require that the machine be equipped with 80 punches and their associated magnets and other parts. The shaft 231 is provided with a gear 236 (Figs. 2A, 4B, 5, 6, and 8) meshing with a gear 237 fixed on the main drive shaft 118. Thus shaft 231 vibrates the frame 226 continuously while the motor is running.

When a magnet PM is energized, its armature 221 (Fig. 3B) will rock the arm 220 counterclockwise and draw the link 219 to the right.

This rocks the punch operating hook 212 in a clockwise direction allowing it to hook over the left-hand edge of the bar 232 on its downward stroke. This pushes the punch downwardly through a card between the stripper 199 and the die 201. Upon the return stroke of the frame 226 and deenergization of the magnet PM, the spring 214 will draw the hook 212 back to the position of Fig. 3B. In the event that the armature 221 should stick to the poles of the magnet PM, the upper rounded end of the hook 212 will engage a rib 235a formed in the knock-off bar 235 and will be cammed in a counterclockwise direction to force the hook 212 out of engagement with the bar 232, the rib 235a being formed as a cam surface for this purpose.

The dogs 215 are provided to prevent breakage of the punches. Formerly the movement of the punch operating hooks 212 was limited by the ends of the slots in the bar 213 and, if a punch hook 212 was only partly hooked on the bar 232, the hook 212 would jam in the slot in the bars 213 and bend its punch 198 sufficiently to break it. The springs 217 yield when a condition like this occurs and allows the dogs 215 to rock slightly clockwise thereby providing a little more clearance space for the hook 212 which may not be properly seated to descend without risk of breaking the punch.

Figure 8:
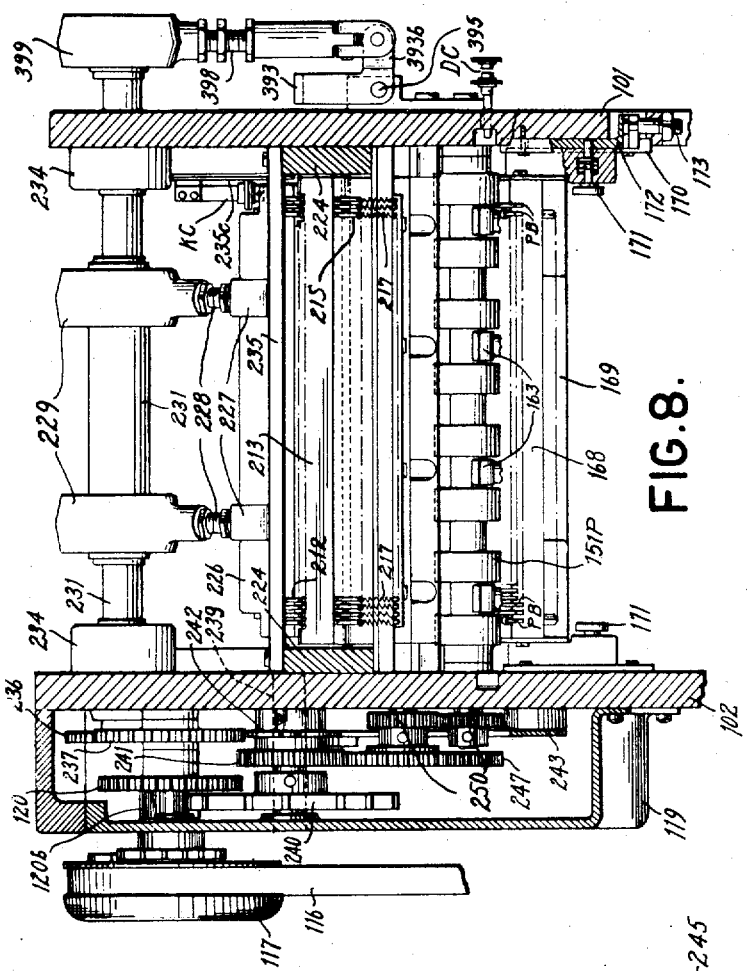
Fig. 8 is a transverse vertical section on the line 8—8 in Fig. 7.
Figure 21:
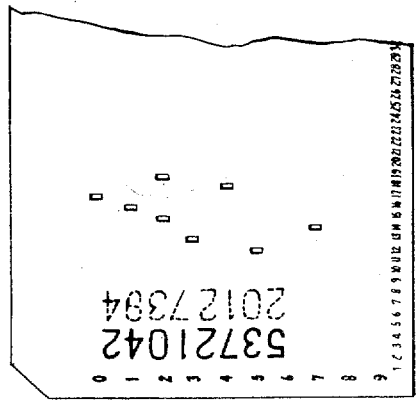
Fig. 21 is a view of the left hand portion of a detail card.

It has been found that if the machine is operated when the knock-off bar 235a is removed, breakage of the punches results and, since these parts are quite expensive to make on account of the precision necessary in their manufacture, means is provided to prevent operation of the machine when the knock-off bar is removed. It is necessary to remove this bar to replace broken punches and other parts and sometimes the serviceman forgets to replace the bar. This means is shown in Figs. 4B, 8, and 19, and includes a pair of knock-off contacts KC mounted on a block 235b attached to the inside face of the frame 101 a little to the right of the shaft 231 (Fig. 4B). These contacts are operated by a lever 235c pivoted at 235d on the frame 101. The lever 235c has one of its arms engaging one of the contacts KC while the other arm extends downwardly and curves around the rib 235a to engage the underside of the bar 235 near its end. This bar is fastened in the machine by means of screws at its ends. The adjustment of the contacts KC is such that as soon as the bar 235 is lifted slightly the contacts KC open and prevent starting the machine as will be made clear hereinafter. The contacts KC and DC operated as described are in the main motor control circuit, or basic running circuit as it will be called, which is necessary to maintain the machine in operation and the opening of this circuit results in stopping the driving motor.

The pairs of feed rollers 141P, 142P; 150P, 151P; and 157P, 158P are driven intermittently one index-point position at a time and the timing is such that the movement of the card is arrested while the punches are passing through the card. In other words, the card is fed one index-point position and stopped to allow time for the punches to perforate, then is advanced to the next index-point position. In the present case the cards are placed in the hopper PH and RH face down with the "12" index-point positions to the left (Figs. 3A and 3B) and all holes of similar value are perforated in a row at the same time, the "12" holes being perforated first and the "9" holes last.

For the purpose of driving the feed rollers an intermittent drive gearing is provided which is most clearly shown in Figs. 4B, 6, and 8. Secured to a shaft 239 is a Geneva driven gear 240 which may be coupled to a gear 241 through a one-revolution clutch 242. Gear 241 is loose on shaft 239. The clutch 242 is controlled by a clutch trip lever 243 pivoted on a stud 244 and operated by a pair of complementary cams 245 (Fig. 9) secured to the shaft 125 which it will be remembered is rotated only when the punch clutch 136 is engaged. The cams 245 are so timed that the lever 243 is rocked out of clutch disengaging position once per card cycle. Therefore, if the shaft 125 does not turn, the lever 243 will be held in a position to hold disengaged the clutch dog of the clutch 242.

The gear 120 which is secured to the shaft 118 is provided with a pin 120a (Figs 4B, 6, and 8) cooperating with the slots of the Geneva gear 240 and the hub of the gear 120 is formed with a Geneva locking surface 120b which cooperates with locking surfaces 240a in the Geneva gear 240. The gear 120 makes one revolution for each index-point position, that is 14 revolutions per cardcycle, whereby the card 241 will be intermittently fed.

Secured to the feed rollers 141P, 150P, 157P are large gears 246, 247, 248 (Figs. 2A, 4B, 6, and 8) of which the gears 247, 248 (Fig. 6) mesh directly with the gear 241, while gear 246 meshes with an idler 249 meshing with a gear 247. Gears 250 couple the feed rollers 141P, 150P, 157P to the feed rollers 142P, 151P, 158P. Contact roller PCR is driven by gears 166a, 167a (Figs. 2A and 4B), from the gear 250 on feed roller 150P.

Because of the fact that the feed rollers 157P, 158P rotate intermittently, whereas card pickers 106 of the punch hopper PH operate with a continuous feeding movement, means are provided to separate the feed rollers 157P, 158P while the picker is moving a card to the right in Fig. 3B after which the feed rollers are re-engaged to continue the feeding of the card. This is done to prevent buckling of the card as its strikes the bight of the feed rollers when they are momentarily stationary. Journaled on the feed roller 158P (Fig. 3B) adjacent the inside faces of the frames 102 are downwardly extended links 251 which are slotted to embrace a cross shaft 252 journaled on brackets 253 fixed to plates 101, 102. This shaft is provided with a pair of cams 254 one for each link which cooperate with rollers 255 attached to the lower ends of the link. Thus, as the shaft rotates, the feed roller 158 P will be drawn downwardly to separate it from the feed roller 157P. Secured to the shaft 252 (Fig. 6) is a gear 256 which meshes with a gear 126 secured to the gear 124 which it will be remembered turns continually while the machine is in operation. Thus the feed rollers 157P, 158P are opened once per cycle, even when the punch mechanism is not in use.

The punch side of the machine is provided with a pocket P (Figs. 1 and 3B) which has a vertically moving card platform 258 spring urged upwardly and provided with a platform plate 258a which slants downwardly from left to right. Between this pocket and the feed rollers 141P, 142P, are provided two pairs of feed rollers 260, 261 (see Fig. 4A also). The lower feed rollers 261 are rotatably mounted in a side frame plate 262 secured to the frames 101, 102. The upper feed rollers 260 are rotatably mounted in bearings 263 which are vertically slidably mounted in open slots cut in the upper edges of the plates 262. Leaf springs 264 secured to the top edges of the plates 262 are bent downwardly at their free ends to press upon the blocks 263.

The plates 262 are joined together by three cross bars 265, 266, 267 (Fig. 3B). The cross bars 265, 266 support an upper card guide 268 which extends from the right-hand pocket partition plate 269 to a point just to the right of the feed rollers 141P, 142P and is upturned slightly at 268a (Fig. 4A) so that a card fed by the rollers 141P, 142P will be directed under the guide 268. The bar 267 supports a shorter guide 270 similar in shape to the left-hand half of guide 268 and is bent downwardly at its left-hand end so that a card fed by the rollers 141P, 142P will pass between the guides 268, 270 in its progress toward the pocket P. The guide 268 is provided with a large hole 268b (Fig. 4B) through which projects a card deflector 271 best shown in Fig. 3B which is fastened to the top side of the guide 268 adjacent the hole 268b. This deflects cards fed by the right-hand pair of feed rollers 260, 261 downwardly on top of the cards on the plate 258a.

Journaled in the rear plate 262 and in a bracket 272 (Figs. 3B and 4B) secured to the under side of the cross bar 266 is a shaft 273 provided with stacker rollers 274. The springs which operate the card platform 258a lightly press the platform plate 258a and the cards which may have been deposited thereon up against the rollers 274. When a card is discharged from the right-hand feed rollers 260, 261 it is gripped by the rollers 274 and pushed downwardly to the right against the upturned portion 258b of the platform plate 258a or the right-hand side plate 269. This stacker arrangement is necessary because of the relatively slow speed at which punching is effected in order to insure that the cards will be properly stacked.

The rollers 260, 261, the stacker rollers 274, and the printing mechanism are driven by a train of gears from the gear 138. Secured to the shaft 273 is a gear 275 (Figs. 3B and 4B) which meshes with a larger gear 276 secured to the shaft of the right-hand feed roller 261 (Fig. 3B). A smaller gear 277 on the same feed roller 261 meshes with a larger idler gear 278 (Figs. 2, 3B and 4B) and the gear 278 meshes with another small gear 277 on the left-hand feed roller 261 (Figs. 3A and 3B) or the right-hand one (Fig. 2). The idler gear 278 also meshes with a gear 279a (see Fig. 5 also) on a cam shaft 280a which has a gear 281a. The gear 281a is connected to the gear 138 (Fig. 2) by a train of gears which comprises a gear 281b on a second cam shaft 280b; idler gears 282a, 282b and 283; a gear 284 on a shaft 285, and a gear 286 on shaft 285, the latter meshing directly with gear 138. It will be remembered that the gear 138 turns only when the punch clutch 136 controlled by magnet PCM is engaged.

Secured to cam shafts 280a, 280b (Figs. 2 and 5) is a number of cams 287 operating contacts designated PC7 to PC17 (Figs. 2 and 4B). These contacts are insulatably mounted on brackets 288a, 288b (Fig. 2) secured to the base 100. The cam shaft 280a also drives the printing mechanism which operates only when the punch mechanism is in operation. Secured to feed roller 142P (Fig. 1) is a gear 250a meshing with a gear 250b loose on a fixed stud 250c. Fixed to gear 250b is a cam 287a actuating contacts PC18 insulatably mounted on frame 101.

The printing station is located between the feed rollers 141P, 142P and the left-hand feed rollers 260, 261 (Fig. 3B) and is in two parts. One part comprises the platen operating mechanism, which is mounted on the front frame 101, while the other part includes the printing wheels, ribbon mechanism, and main drive mechanism for the printing wheels and ribbon mechanism, and is a removable unit which also may be set to either of two positions in the machine to print the data in two different printing lines on the card. The removable printing unit will be described first.

This unit has a main frame comprising two vertical plates 289, 290 (Figs. 1, 3B, 5, 9, 10, 11, 12, and 14). These plates are joined together at the bottom by a front bar 291 and a rear bar 292. The plates are also joined by an upper stop bar 293 (Figs. 10, 11, 13, and 14) and a lower stop bar 294 which limit the stroke of the typewheels, as will be made clear hereinafter. The plates are also joined by a stop pawl pivot bar 295 and by a magnet support frame 296.

Journaled in the plates 289, 290 is a shaft 297 (Figs. 5, 5A, 11, 13, and 14) on which is secured the typewheel drum 298 on which the typewheels generally designated 299, are rotatably mounted. The typewheels are mounted upon the drum 298 (Fig. 5A) by means of rings 300 having shoulders abutting the sides of the typewheels. The front or left-hand end (Fig. 5A) of the typewheel drum is shouldered at 300a like one of the rings 300 to support the front or units typewheel. Interposed between the faces of the shoulders in the rings 300 and the portion 300a of drum 298 and the side or hub portion of the typewheels are friction rings 301 which may be cemented to the typewheels. A key 302 is provided to lock the rings 300 to the drum 298 and fits in keyways cut in the rings 300 and in the drum 298 respectively. The key 302 also projects through a rectangular hole in the shouldered portion 300a of the drum 298. Located between the typewheels 299 are spring friction rings 303 which have rings 304 of friction material such as paper cemented to them, which paper rings 304 engage the front or left-hand faces of the rings 300. The inner or right-hand end of the drum 298 is provided with a retaining washer 305 which is attached to the drum by means of screws 306. The friction rings 303 are spring tempered and flat when manufactured, but, in assembling the typewheels on the drum, the rings 303 become dished by having their centers pushed to the left (Fig. 5A) until the right-hand faces of the paper rings 304 are flush with the right-hand faces of the typewheels 299, the typewheels being provided with annular recesses 299a to accommodate the friction rings. In order to prevent the rings 303 from turning relative to the typewheel the typewheels are provided with pins 307 which project through holes in the friction rings 303.

Figure 14:
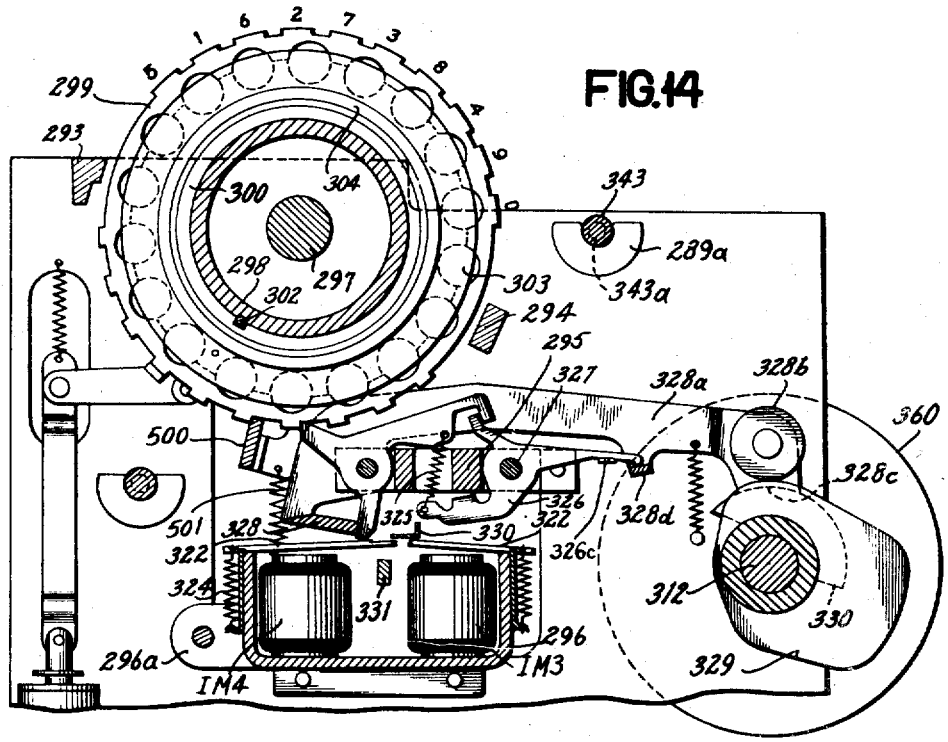
Fig. 14 is a similar view showing parts of the printing mechanism in operated position.

The typewheels are oscillated between the stop bars 293, 294 which limit the operative stroke of the typewheels, and for this purpose each typewheel is provided with a long stop tooth 299b (Figs. 11, 13, and 14) and is also provided with teeth 299c one for each of the characters "0" to "9" inclusive. The upper half of the periphery of the typewheels with reference to Figs. 13 and 14 is provided with type characters in the order 5, 1, 6, 2, 7, 3, 8, 4, 9, 0. The teeth 299c correspond to the characters and are located diametrically opposite the corresponding character. Thus, as shown in Fig. 14, the typewheel 299 has been stopped in a position to print 2 when the platen is operated. In Fig. 13 the typewheels are shown in the fully set position and are about to be restored in a clockwise direction.

Shaft 297 is oscillated by mechanism which is generally shown in Figs. 5, 10, 11, and 12. Secured to the shaft 297 is a gear 308 which meshes with a gear sector 309 on shaft 310 journaled in the plates 289, 290. The gear sector 309 takes the form of a cam follower having rollers 309a cooperating with complementary cams 311 on a cam shaft 312 also journaled in the plates 289, 290. The shaft 312 is provided with a bevel gear 313 (Figs. 5B, 5, 10, 12 and 24) meshing with a bevel gear 314, the hub of which is rotatably mounted in a flanged bearing member 315 secured to a gear housing 316 fixed to the side plate 290. The hub of the gear 314 is provided with diametrically opposite slots 314a as best shown in Fig. 24 which receive a key 317 in the end of shaft 280, which it will be remembered rotates whenever the punch clutch is engaged and the punch mechanism is in operation. The keyways in the hub of gear 314 are long enough so that the printing unit can be removed from the machine or set in either of two positions to print on two different lines of the card.

Figure 5:
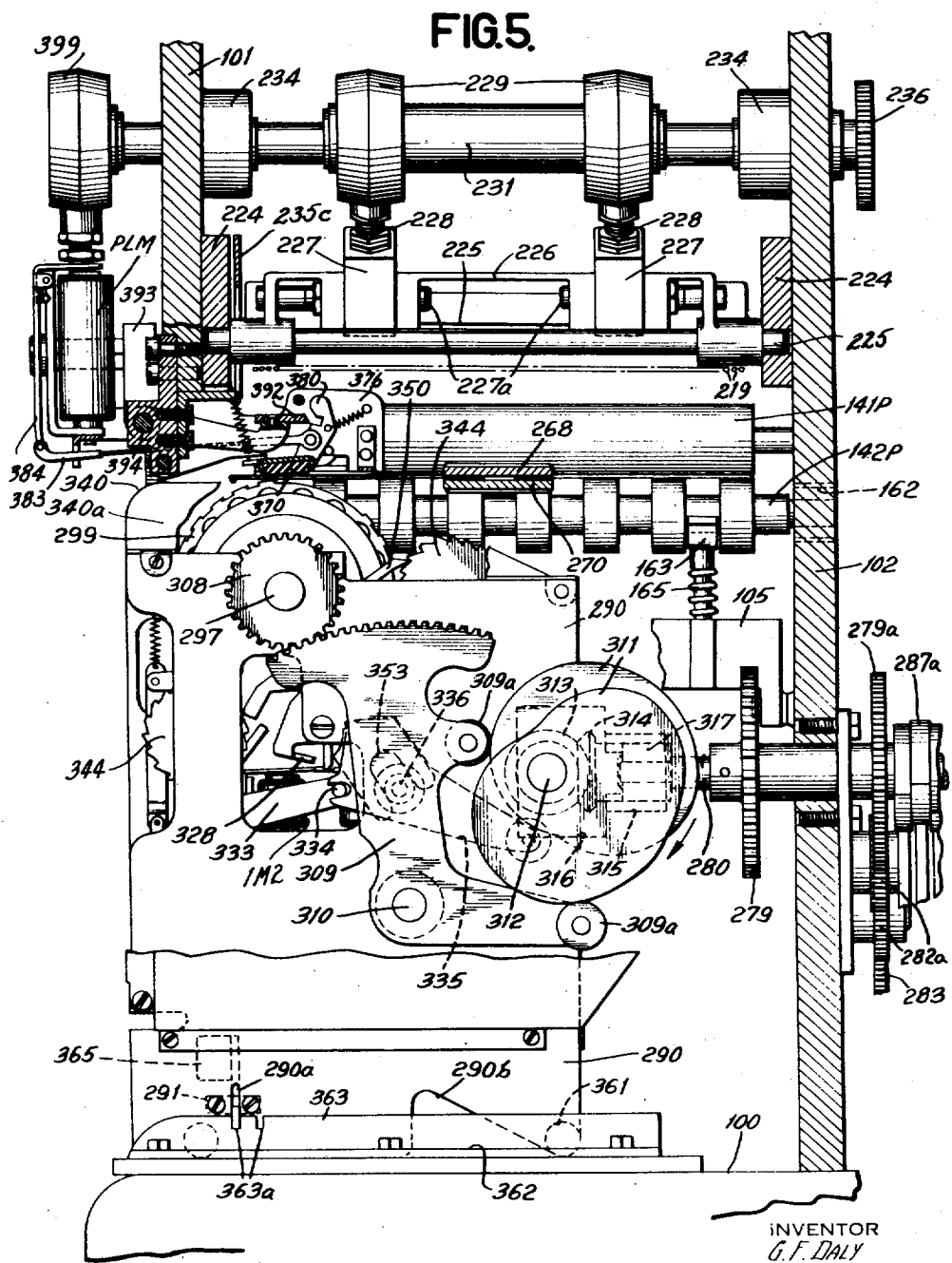
Fig. 5 is a large scale vertical section on the line 5—5 of Fig. 3B with the punch magnet removed.

When the shaft 312 rotates, the complementary cams 311 oscillate the gear sector 309 and thereby oscillate the shaft 297 through gear 308. The parts are shown in Figs. 5 and 13 in the position taken when the machine stops with both clutches disengaged. In this position the typewheels will have been oscillated to the limit of their setting stroke, that is the counterclockwise part of the stroke during which the typewheels may be stopped selectively under control of impulses from the record sensing brushes or the storage relays of the print mechanism as will be made clear hereinafter. Fig. 14 shows one of the typewheels arrested with the "2" type on the printing line and the cam shaft 312 is shown approximately 90° short of the normal stopping position, that is a little beyond the "7" position in the cycle (Fig. 32B).

The selective stoppage of the typewheels preparatory to printing is controlled by stop pawls 320 (Figs. 11, 13, and 14) which are pivoted on a rod 321 carried by the bar 295, this bar being provided with transverse slots which hold the pawls 320 in alignment with their respective typewheels 299. Normally the pawls 320 are latched in the position of Fig. 13 by the armatures 322 of the interpreting magnets designated IM1 to IM8 (Figs. 33D and 33E) of which only the first two are shown in Fig. 13. The even numbered magnets are located in a row on the left (Fig. 13) while the odd numbered magnets are located on the right and are staggered with reference to the others. The magnets IM1 to IM8 are mounted on the cross frame 296 and their armatures are pivoted on brackets 323 attached to upstanding posts or lugs formed in the frame 296. Springs 324 anchored to the brackets 323 urge the ends of the armatures, which are provided with latching shoulders, into engagement with the tails of the pawls 320 to hold them in the position of Fig. 13.

The pawls 320, when released, are urged in a clockwise direction into engagement with the teeth 299c of the typewheels, as in Fig. 14, by means of springs 325 (Figs. 13 and 14) which are anchored to stop arms 320a in the pawls 320 and also to zero pawls 326 which are pivoted on a rod 327 carried by the frame 295. The zero pawls 326 have stop portions 326a abutting the stop portions 320b in the position of Fig. 13 to prevent the pawls 320 from engaging the typewheels.

Pivotally mounted on the rod 321 (Figs. 5, 11, 13, and 14) is a restoring bail 328 having a cam follower arm 328a provided with a roller 328b engaging a cam 329 on the shaft 312. The arm 328a is also provided with an arcuate cam surface 328c (Figs. 13 and 14) which, in the position of Fig. 13, rests on the hub of the cam 329. The bail 328 is formed with a cross bar 328d which cooperates with arms 326b of the zero pawls 326.

The timing of the cam shaft 312 is such that at about the middle of the cycle the cam 329 will have elevated cam follower arm 328a to its highest position in which the bail 328 will have rocked the pawls 320 counterclockwise slightly beyond the position of Fig. 13 to relatch those pawls 320 which may have been previously tripped, as a preparation for a new setting of the typewheels. Shortly thereafter, before the "5" point in the cycle is reached, the arm 328a is allowed to drop until the surface 328c engages the periphery of a cam 330 formed in the hub of the cam 329. This allows the bail 328 to move to the position shown in Fig. 14 in which it remains throughout the last half of the cycle, during which the typewheels will be set under control of impulses to the magnets IM1 to IM8.

Let it be assumed that the magnet IM4 (Fig. 14) receives impulses between the "6" and "7" points in the cycle with reference to Fig. 32B. This will cause the armature of the magnet IM4 to be attracted, releasing the pawl 320 associated with the typewheel 299 in the fourth or thousands order of the mechanism at a time when the "2" tooth 299c is approaching the final stopping position of the end of the pawl 320, with the result that the typewheel corresponding to the magnet IM4 will be stopped with the "2" type at the printing line as in Fig. 14. This action occurs, of course, in consequence of an oscillation of the typewheels in a counterclockwise direction effected as described above by the cams 311 during which the stop lugs 299b of all the typewheels will move in unison from the stop bar 293 to the stop bar 294 until the typewheels are stopped by pawls 320. During this period, as will be made clear hereinafter, as many of the magnets IM1 to IM8 as may have been plugged may receive impulses either directly from the record sensing brushes or from a storage relay system which will be described later herein. In other words the setting of the typewheels will take place over a period amounting to about one-half of the period in which the record sensing brushes traverse the "0" to "9" index-point positions of the record cards.

At the end of the cycle, when all of the typewheels have been set, the cam surface 328c trips off the cam 330, this occurring just beyond the "9" position (Fig. 32B) and when the machine stops, if it is going to stop for any reason, the cam 329 will occupy the position of Fig. 13 with all the typewheels which have had a magnet IM1 to IM8 tripped in the printing position. The reason for this is that on account of space limitations, the actual printing from a line of type on the typewheels 297 must take place during the cycle following the one in which the record card passes the record sensing brushes. The actual printing time takes place at about "11" in the following cycle (Fig. 32B), that is when the preceding card passing the brushes CB has the "11" index-point positions under said brushes. This printing time is adjusted so that the actual printing takes place while the punched card is momentarily at rest.

When the arm 328a is raised to restore the pawls 320, the cross bar 328d rocks the zero pawls 326 in a counterclockwise direction beyond the position of Fig. 14 and holds them there until the stop pawls are restored. During the period in which the magnets IM1 to IM8 are being energized to control the setting of the typewheels, the zero pawls 326 are held in the position of Fig. 14 to permit release of the pawls 320. At the end of the cycle those pawls 320 which have not been tripped will be locked by the zero pawls 326 as shown in Fig. 13.

The zero pawls 326 are provided for the purpose of preventing printing of zeros to the left of a significant figure. Each pawl 326 has a finger 326c (Figs. 11 to 14) which extends underneath the next adjacent lower order zero pawl, or diagonally downward and to the left as shown in Fig. 12. Let it be assumed, for example, that a typewheel stop pawl 320 has been tripped under control of a hole in the "1" to "9" index-point positions of a column, say the fourth order typewheel, which would be the fourth from the bottom in Fig. 12. The tripping of the fourth order stop pawl 320 will lock the fourth order zero pawl 326 in the position of Fig. 14, thereby holding all of the zero pawls 326 for the first three orders or positions in elevated position when cam surface 328c drops off cam 330 a little after "9" in the cycle (Fig. 32B). This holds in unlocked condition the stop pawls 320 of the first three orders. If now a zero impulse is given any of the magnets IM1 to IM3, the pawls 320 associated therewith will be free to stop the typewheels 299 at zero. With respect to the four highest orders, the zero pawls 326 will move to the position of Fig. 13 before "0" in the cycle and prevent release of the stop pawls 320 for such orders. Thus, even if a card happened to be perforated "0000200" only the last two zeros would be printed. However, a zero hole must be present or zero cannot be printed. Thus, if one of the magnets IM1 to IM8 is not plugged the typewheel 299 associated therewith will be moved beyond the zero position and will be stopped in a blank position by bar 294.

The armatures of the magnets IM1 to IM8 are provided with a stop bar 330 (Figs. 13 and 14) in the form of an inverted U-shaped frame having side arms 330a attached to the top surface of the frame 296 which limits rotation of the armatures 322 by the springs 324 when the magnet assembly including frame 296 is removed from the machine. There is also provided an armature knock-off bail 331 pivoted at 332 to ears 296a formed in the frame 296. Adjustably secured to this bail is an arm 333 having a pin 334. This pin 334 is embraced by a slot in cam follower lever 335 pivoted at 336 to the side plate 290. The lever 335 cooperates with a cam 337 secured to the shaft 312. The lever 335 also operates the ribbon mechanism as will be explained more clearly hereinafter.

Secured to the top edges of the frames 289, 290 (Figs. 1, 5, 10, 11 and 12) is a ribbon guiding frame 340 formed of thin sheet metal which includes side guides 340a and inclined guide surfaces 340b over which passes the inking ribbon 341 to and from the spools 342. The spools 342 are loosely mounted on spindles 343 to which are secured feed ratchets 344, each being provided with a pin 344a (Figs. 10 and 16) which registers with a suitable hole in the ribbon spool to key each ribbon spool to its shaft 343. The left-hand ends of the spindles 343 (Figs. 10 and 16) have reduced portions 343a which fit into holes in the side plate 289 adjacent semicircular raised portions 289a secured to said plate which half surround the larger diameter of the spindle.

The right-hand ends, with reference to Fig. 10, of the spindles 343 are enlarged slightly at 343b (Figs. 10, 11, 12, and 16). Secured to the inside faces of the plates 290 are bushings 345 which are cut as best shown in Fig. 16 with a central semicircular slot 345a into which may be slipped the enlarged portion 343b. The spindle 343 is then pushed downwardly to the left (Fig. 16) until the enlarged portion 343b lies between the claws 345b formed by slotting the bushings 345 longitudinally.

In inserting the ribbons in the machine the spools 342 are first slipped on the spindles as shown in Fig. 16, then the spindles are placed in the machine with the left-hand ends resting on portions 289a and with the enlarged portions 343b in the bushing 345 by passing the enlargement 343b through the slot 345a. When the spindles are released, double pronged leaf springs 346 (Figs. 10, 11, and 12), secured to the inside faces of the plates 290 and pressing upon the sides of the ratchets 344, push the spindles to the left (Fig. 10) so that the reduced portion 343a enters the hole provided therefor and the enlarged portion 343b enters the space between the claws 345b, thereby securing the ribbon spindles and spools in place.

The ribbon 341 passes from the lower spool 342 (Figs. 11 and 16) upwardly over the left-hand member 340b (Fig. 11) of the ribbon guide frame 340, across the faces of the type at the printing line, down over the right-hand portion 340b, thence on to the upper spool 342.

The ribbon spools are rotated by reversible feed mechanism which includes ribbon feed pawls 350 (Figs. 5, 11, 12 and 16) pivotally mounted at 351 on the lever 335. This lever is urged in a clockwise direction (Fig. 16) by a spring 352 but its movement in this direction is controlled by the cam 337. Normally only one of the ribbon feed pawls 350 engages a ratchet 344. For the purpose of controlling the engagement of the pawls 350 with ratchets 344 there is provided a T-shaped plate 353 which is slotted at its lower end to embrace the pivot 336 for the lever 335. A spring 354, anchored to pins carried by the lever 335 and by plate 353, tends to draw the plate 353 upwardly (Fig. 16). This movement is limited by a pin 335a in the lever 335 which pin may be positioned in either of two slots 353a, 353b in the plate 353. The pawls 350 are urged in a direction to engage the ratchets 344 by means of a wishbone spring 335b coiled around pin 335a and extending over the upper side of pins 350b, 350a on the pawls 350. These pins rest upon cams 353c, 353d formed in plate 353.

With the parts shown in the position of Fig. 16, the lower or right-hand pawl 350 engages the lower ratchet 344, that is the left-hand one with reference to Fig. 11. Once per cycle cam 337 rotates away from the position of Fig. 16 and allows the spring 352 to rock the lever 335, thereby through the pawl 350 rotating the lower ratchet 344 and its spool 342 one tooth space.

When the plate 353 is rocked clockwise (Fig.

16) relative to the lever 335, to the position of Fig. 11, the pin 335a will pass from the notch 353b to the notch 353a. This movement causes the cam 353d to lift the pin 350b and the lower dog 350 out of engagement with the lower ratchet 344, as in Fig. 11, while the cam 353c allows the pin 350a to drop thereby lowering the upper pawl 350 into engagement with the upper ratchet 344. This shifting movement of the plate 335 is effected by spring 352 or the cam 337, according to the direction to which the plate 353 must be shifted, and is controlled by fingers 355 pivoted on studs 356 attached to the frame plate 290. The fingers 355 have forked portions 355a urged against the ribbon wound on the spools by means of springs 357 and the forked portions 355a, as most clearly shown in Figs. 10 and 16, are aligned with circumferential grooves 342a in the spools 342. When there is present one or more turns of the ribbon around the spools 342, as is the case in Fig. 11, the fingers 355 are held by forks 355a clear of projections 353e in the plate 353 to enable this plate to oscillate freely along with the lever 353. In Fig. 16, however, the parts are shown in the position in which the lower spool 342 has become unwound to an extent to expose the grooves 342a to the forked portion 355a whereby the fingers 355 have been rocked by spring 357 to the position there shown.

When the finger 355 is rocked as described, it moves into the path of the adjacent projection 353e whereby, upon the next oscillation of the lever 335, the lever, in rocking clockwise to the position in Fig. 16, will bring the projection 353e into engagement with the finger 355 and plate 353 will be held while the lever 335 rocks a further extent clockwise. This, in effect, causes the plate to be shifted in a counterclockwise direction, relative to the arm 335, whereby the pin 335a takes the position now shown in Fig. 16. This movement of the plate allows the dog 350 for the lower ratchet 344 to drop into teeth of said ratchet and, with succeeding operations of the cam 337, will be rotated clockwise.

When the upper spool 342 becomes completely unwound, the finger 355 associated therewith will move into the path of the upper left-hand projection 353e in Fig. 16 and cause the plate 353 to be shifted to carry the pin 335a into the notch 353a. Shifting of the plate 353 from the position shown in Fig. 16 to the alternative position is effected positively by the cam 337, but from this position to the one shown in Fig. 16 the shifting is effected by the spring 352 which naturally is made strong enough to overcome the resistance of the cams 353c and the spring 354.

Since there is a possibility that the cam shaft 312 may get out of time when the printing unit is removed for any purpose, the shaft 312 is provided with an index disk 360 (Figs. 1, 3B, 10, and 12) adjacent the left-hand plate 289, which disk is provided with suitable graduations cooperating with an index on plate 289. This disk is also a convenience in adjusting the timing of the parts of the printing unit when it is removed from the machine.

The lower corners of the plates 289, 290 are provided with pairs of circular disks 361 (Figs. 1, 5, and 10) riveted together on opposite sides of the plates. Mounted on the top of the base 100 is a plate 362 having Z-shaped guide bars 363 secured to the right-hand and left-hand edges of the plate (Fig. 1). The bars 363 lap over the outer disks 361 and serve as guides in inserting and removing the printing unit and for holding the printing unit in its proper position with respect to the card feeding rollers 141P, 142P, 260, 261. The bar 290 has a longitudinal slot in which is pivoted at 364 a latch lever 365 which is urged in a clockwise direction by a spring 366. The lever 365 has a horizontal arm which projects through a slot 290a (Figs. 5 and 10) in the plate 290 and engages either of two slots 363a cut transversely of the right-hand bar 363 (Fig. 1). When the latch 365 is seated in the left-hand notch 363a (Fig. 5) the printing unit will be positioned to print a line of numbers shown in solid lines in Fig. 17. When the latch is in the right-hand notch 363a the printing will be effected in the position shown by the dotted lines in Fig. 17. When the printing mechanism is removed from the machine the latch 365 may be released and the entire printing unit, that is all parts enclosed or supported by the plates 289, 290, may be moved forward with reference to Fig. 1 or to the left (Fig. 5).

In replacing ribbons, however, it may be desired to merely partly remove the printing unit and leave it attached to the machine. For this purpose plates 289, 290 are provided with cut out portions or notches 290b (Fig. 5) which enable the printing mechanism to be partly withdrawn and tilted downwardly until the diagonal edges of the notches rest upon the top surface of the plate 362. When this is done the printing unit need only be withdrawn about two-thirds the distance required for complete removal, and, when so withdrawn, the plates 289, 290 will act like cantilever beams to support the printing unit.

Printing from a line of type set up on the printing drum and exposed on the printing line is effected by a platen mechanism under the control of platen control magnets designated PLM (Figs. 4B, 5, 11 and 21E). The mechanism controlled by these magnets is most clearly shown in Figs. 1 and 11. Printing is effected by means of a platen 370 (Fig. 11) which is attached to a bail 371 pivoted at 372 in a block 373 attached to the front of the frame 101, the frame being suitably cut away and recessed to accommodate the block 373 and the parts of the platen mechanism which project interiorly of the space between the frame 101, 102 and between the feed rollers 141p, 142 and the left-hand pair of feed rollers 260, 261 (see Fig. 4B also). Springs 374 attached to the bail 371 hold the bail with projections 371a on its side arms up against a stop rod 375 carried by a frame 376 secured to the back of the block 373. The side plates of the frame 376 are joined by a U-shaped bracket 377 and to the underside of the cross bar of this bracket is secured an L-shaped card guide 378. One leg of guide 378 is relatively wide, as shown in section Fig. 11, and the other leg 378a (Figs. 4B and 11) is narrower and extends transversely of the plate 101 and toward the latter, alongside the highest order typewheel 299. This portion of the card guide is upturned along the edge nearest rollers 141P, 142P to insure that a card will be fed underneath the platen 370 and will not catch upon the end of it.

Pivotally mounted on studs 379 at the ends of the bail 371 are two bail operating hooks 380 similar to the hooks 212 attached to the punches 198 (Fig. 3B). Each hook 380 is urged in a clockwise direction (Fig. 11) against the stop rod 375 by a spring 381. A knock-off rod 382 is also provided for the hooks 380 which rod rigidly joins the side plates of the frame 376. The platen operating hooks 380 are connected by links 383 to downwardly extending arms 384 attached to the armatures 385 of the magnets PLM. The armatures 385 are pivoted at 386 (Figs. 1 and 11) on lugs formed in a plate 387 secured by screws 388 and posts 389 to the front face of frame 101. The lower edge of the plate 387 is bent at an angle to form a ledge or shelf supporting magnets PLM, and the underside of the shelf is provided with an angular strip 390 having slots which guide the links 383.

An operating bail is provided which includes side arms 391 and a cross bar 392 (Fig. 11). One of the side arms 391 is secured to a second bail 393 pivoted at 394 to the block 373 (Fig. 11) and at 395 (Fig. 1) to a block 396 secured to the front plate 101 of the machine. The bail 393 has a stiffening member 393a and also has an arm 393b extending horizontally to the left (Fig. 11). Arm 393b is connected by an adjustable linkage 398 to a housing 399 for a roller bearing 400 mounted on an eccentric portion of the shaft 231 outside of the frame 101.

When the shaft 231 rotates (Fig. 1) the link 398 will be vibrated up and down and will impart an oscillating motion to the bail 393 which will be transmitted to the bail comprising the side arms 391 and cross bar 392.

When the magnets PLM are energized with the bar 392 vibrating up and down, the platen operating hooks 380 will be drawn into cooperative relationship with the bar 392 in the same way as the punch hooks 212 are operated, and the platen 370 will be operated to effect an imprint upon a card from the line of type set up in the manner explained above. The rod 382 performs the same function for hooks 380 as the rib 235a in the knock-off bar (Fig. 3B) performs for hooks 212.

For the purpose of controlling the operation of the magnets IM1 to IM8 there is provided a storage relay system which includes a series of printing relays designated PR1 to PR60, inclusive, in Figs. 33D and 33E. In order to save space all of these relays are not shown in the drawings, but the ones which are missing are connected according to the same system as those shown. The complete connections for all of the printing relays associated with the groups of relays for the first, second, fourth, fifth, seventh, and eighth orders or positions of the printing mechanism are shown in Figs. 33D and 33E and the end relays of each group for the partly missing groups are also shown to indicate the fact that these groups are connected in the same way as the others.

The storage relay system also includes an emitter generally designated E1 which, as shown in Fig. 1, consists of a circular frame 402 concentric with the shaft 134 and secured to the front plate 101. This emitter includes a group of five read-in contacts or segments 403 and five read-out contacts 404 which are insulatably mounted. Cooperating with these contacts 403, 404 is a brush 405 mounted on shaft 134. The emitter E1 turns at the rate of one revolution per card cycle and is timed as shown in Fig. 32B so that during the read-in portion of the cycle, in which the brush 405 is traversing the read-in segments 403, circuits may be established through the segments 403 in synchronism with the establishment of circuits through the sensing brushes to the printing relays in a manner hereinafter to be explained in detail. During the remaining, or read-out portion of the cycle when the brushes traverse the segments 404, the spacing of such segments is such that the read-out circuits are closed approximately half-way between index-point positions on the card for a purpose which will be made clear hereinafter.

In one application of the machine it is desired to repeatedly print one number on the detail cards while serially number printing these cards. Means is provided to lock half of the type wheels 299 while a series of detail cards is being punched so that the same number will be printed on all of them. The four type wheels 299 at the left in Figs. 5A and 10 which print the first four digits of the number 53721042 in Fig. 21 and the numbers 1234, 4321 on the specimen cards in Figs. 34 and 35, are provided with a locking bail 500 (Figs. 13, 14, 17, 18 and 19) the side arms of which are pivoted on the rod 327. A spring 501 urges the bail 500 counterclockwise (Figs. 13 and 19) to a position in which the bail 500 clears the teeth 299c of the type wheels 299. The bail 500 is cut away at 500a (see Fig. 17) opposite the remaining four type wheels 299 so as to have no effect on the latter, even when the bail 500 is in the alternate, or type wheel locking, position of Figs. 14, 17 and 18.

The rear side arm as shown in Figs. 13, 14, 18 and 19, or the left-hand one, as shown in Fig. 17, has a block 500b disposed in the path of a pin 502 shown in Figs. 5A, 17, 18 and 19 and carried by the drum 298 supporting type wheels 299. It will be recalled that this drum is rocked counterclockwise to set the type wheels. When this takes place to set the type wheels to print on the first detail card of a group related to a master card, with the bail 500 initially in the released position of Figs. 13 and 19, pin 502 engages block 500b and rocks bail 500 clockwise to the position of Figs. 14, 17 and 18 to lock the four type wheels affected by bail 500. Block 500b is slotted to guide one arm of a latch lever 503 having a notch engageable with a shoulder in the slot to latch bail 500 in the position of Figs. 17 and 18. Lever 503 is held in this position by a spring 504 anchored to a vertical link pivoted both to lever 503 and to the plunger of the bail release solenoid BRS. The latter is mounted on the side plate 289 of the printing unit.

The foregoing action takes place at the end of the type wheel setting stroke of drum 298, after all of the type wheels have been set, preventing restoration of the left-hand four type wheels 299 in Fig. 5A of which one is shown locked in Fig. 17. The remaining four type wheels 299 are unaffected and restore for a new setting, which it will be seen hereinafter, may represent the next higher serial number.

The machine is equipped with three accumulators for controlling automatic serial number punching and printing, each accumulator having four orders capable of retaining four-digit numbers. Each accumulator order includes an accumulator or register wheel and a read-out device enabling numbers to be read out of the accumulator to effect printing and punching and to determine the number of cards to be serial number printed and punched.

The accumulator mechanism is mounted at the left-hand end (Fig. 4A) of the machine in a frame consisting of the front and rear plates 600, 601 (Figs. 2B, 4A, and 25) connected together by five parallel cross bars 602 to 606. The bars 605, 606 are secured in any suitable manner to the vertical edges of frames 101, 102.

A shaft 134a (Figs. 2B, 3A, and 4A) is journaled in plates 600, 601 and is provided with cams 135a similar to cams 135 and operating the group of contacts CC15 to CC29 supported by the frame comprising plates 600, 601 and cross bars 602 to 606. Shaft 134a is driven by shaft 134 through a gear 607 on shaft 134 meshing with a gear 608 on shaft 134a (Figs. 2A, 2B, 3A, and 4A). An accumulator drive shaft 609 (Figs. 2B, 4A, 25, 26, and 28) is journaled in plates 600, 601 and carries twelve accumulator drive gears 610. The shaft 609 is driven by shaft 134a through a gear 611 fixed thereto and a gear 612 on shaft 609 (Figs. 2A, 2B, and 4A). Thus shafts 134a and 609 turn all the time the machine is in operation and rotate once per card cycle.

Mounted on the rear plate 601 is a plate 613 which supports the fixed contact support frames 614 of two emitters E2, E3 (Figs. 2B and 4A) the rotary brushes 615, 616 of which are mounted on the ends of the shafts 134a, 609 respectively. Except for the spacing of the contact elements 617, 618 of these emitters, they are like the emitter E1 in construction and are of a form commonly used in record controlled machines. A fourth emitter E4 (Fig. 4A) similar to emitters E2, E3 is mounted alongside of the emitter E1. This emitter has contacts 619 and brushes 620 (Fig. 33H) and, like emitter E1, is driven continually by shaft 134. The timing of the four emitters E1 to E4 in relation to the sensing of the record cards is shown in Fig. 32B.

The accumulating mechanism comprises twelve accumulator plate units, each of which is mechanically independent of the other and removable as a separate assembly without disturbing the electrical or mechanical connections of the others. Preferably the plate units are of the same type as disclosed in Patent 2,328,653 but any other suitable accumulator known in the art may be used since the specific construction of the accumulator mechanism is not a feature of the present invention.

The accumulator plate unit comprises a mounting plate 630 (Figs. 26 to 29) slidably insertable in horizontal slots in the frame bars 602, 603, 604 (Fig. 26). A clamping bar 631 secured to the frame bar 603 holds the row of twelve plate units in place. Plate 630 has fixed to it a sleeve 632 rotatably carrying a drive device comprising the rigidly connected ratchet 633 and gear 634 (Fig. 30), each continuously driven by an associated gear 610. Rotatably carried by the hub of ratchet 633 is a disk 635 having ten teeth 635a adapted to be engaged by a tooth 636a (Fig. 30) on the long arm of a clutch lever 636 to hold the disk against rotation in a counterclockwise direction. Lever 636 is pivoted at 636b to plate 630. At the side of disk 635 is an accumulator or register wheel 637 rotatable on sleeve 632 and provided with ten peripheral notches 637a representing ten positions corresponding to the values 0 to 9. A lever 638, pivoted at 638a to plate 630 and actuated by spring 639 engages with a notch 637a of the register wheel 637 to hold impositively and to center it in any value position to which it has been rotated.

A transfer cam 640 (Figs. 25, 29, and 31) is fixed to the side of wheel 637 by the pair of studs 641 which extend through openings in disk 635 to positions adjacent ratchet 633. One stud 641 pivotally carries a clutch dog 642 and the other stud anchors one end of a spring 643 connected to the free end of dog 642 to urge a tooth 642a of the clutch dog to engage ratchet 633. In the positions shown in Fig. 29, the clutch lever 636 is in declutching position, its tooth 636a is restraining rotation of disk 635 counterclockwise, and clutch dog 642 is clear of ratchet 633. The clutch dog is held clear of ratchet 633 by coaction of a pin on the dog with the upper portion of a cam edge 635b of disk 635.

When the clutch lever 636 is rocked downwardly, its tooth 636a releases the disk 635 for counterclockwise movement and spring 643 rocks the clutch dog 642 into engagement with ratchet 633. During this movement of the clutch dog, its pin 642b rides down the cam edge 635b of disk 635 and cams the disk counterclockwise until its tooth 635a, previously engaged by tooth 636a, is to the right of the latter tooth and the tooth 642a engages ratchet 633. The parts are then in clutching position shown in Fig. 30, and the register wheel 637 is coupled by dog 642 to the gear 634 for rotation in the direction of the arrows.

When the clutch lever 636 is returned to upper, or declutching position, its tooth 636a intercepts a tooth 635a of disk 635 to stop the disk. The register wheel 637 and clutch dog 642 continue rotating enabling cam edge 635b of disk 635 to cam the pin 642 of the clutch dog radially of sleeve 632 until it is again in its outer position. As the pin 642b is cammed radially outwardly, tooth 642a of clutch dog 642 moves clear of the ratchet 633 and declutches the register wheel 637 from the driving means. The register wheel is then held and centered in its new value position by lever 638.

The clutch lever 636 is held in either clutching or declutching position by a latch 644 (Figs. 29 and 30) pivoted on a stud 645 carried by an arm of a bracket 646 secured to plate 630 and the latch is urged counterclockwise by a spring 647. When the clutch lever 636 is in upper or declutching position, the wedge-shaped tip of the lever is seated firmly in a V-shaped notch 644a of latch 35. When the lever 636 is moved to clutching position, its wedge-shaped tip cams the latch 644 clockwise until the lever tip is below and clear of the notch. The spring 647 then snaps the latch 644 back to retain the lever 636 in lower or clutching position. The free ends of the level 636 and latch 644 project into a guide slot formed in bracket 646 which slot holds the lever and latch in alignment.

The clutch lever 636 has its short arm slotted to pivotally embrace the lower end of an armature 648 pivoted at 649 to plate 630 (Figs. 26 and 29). The armature is disposed between the pole pieces of an advance magnet AM and a stop magnet SM mounted on plate 630. Energization of magnet AM rocks armature 648 clockwise to lower the long arm of lever 636. Subsequent energization of magnet SM rocks armature 648 counterclockwise to raise the long arm of lever 636.

A read-out commutator is provided for each plate unit to read out the values accumulated and comprises a rotor including an insulating bushing 650 (Fig. 28) fixed to the hub of register wheel 637. Bushing 650 carries a conductive plate 651 mounting the brushes 652 (Fig. 26) on opposite sides of sleeve 632. A plate 653 is secured to plate 630 and is moulded of insulating material with conductive inserts 654. The conductive inserts 654 at their left ends project beyond the moulding while their inner ends act as commutator segments for engagement by brushes 652.

Ten of the inserts 654 act as the value segments 0 to 9 while another insert is shaped to act as a common segment 654c. Gear 610 makes one revolution a cycle and gear 634 driven thereby has ten teeth and makes one revolution in ten-fourteenths of a cycle. When gear 634 is clutched to the register wheel 637, it rotates the wheel one tooth space or one-tenth of a revolution for each unit of value. The register wheel 637 covers all ten value positions in one revolution and brushes 652 have a corresponding sweep. The 0 to 9 segments 654 are disposed within half the circle of travel of the brushes and the segment 654c is disposed in the opposite half.

Values are entered by rotating the register wheels 637 from one to nine-tenths of a revolution, that is, from one to nine tooth spaces of gear 634 or 36° per unit of value. It is necessary to selectively connect the value segments 654 to the common segment 654c through brushes 652 in the same numerical order as the value positions of the register wheel 637 so that when the register wheel stands at "0," for example, as in Fig. 26, one of the brushes 652 will rest on the 0 segment 654 and the other on the common segment 654c. In order to do this, the segments 654 are spaced 18° apart and segment 654c extends over a little less than 180°. The upper left-hand brush 652 is spaced 198° clockwise and 162° counterclockwise of the lower right-hand brush in Fig. 26. In other words, the lower right-hand brush is short of being diametrically opposite the upper brush by 18°. Since the segments 654 are 18° apart and brush 652 moves 36° per unit, the upper brush 652 will move 36° from the 0 segment 654 in Fig. 26 to the third segment 654 in a counterclockwise direction, which segment represents the value 1, when a unit is added. At the same time, the other brush 652 will sweep 36° over segment 654c. When "6" is entered, starting with the parts as in Fig. 26, the upper brush will move 216° on to segment 654c and the lower brush 652 will move on to the 6 segment 654.

In Figs. 26 and 27 the values of the segments 654 are denoted by the small numbers 0 to 9 over and above, respectively, the segments 654, but in the wiring diagram (Figs. 33G, 33H, and 33I) the segments 654 are shown diagrammatically in numerical order and not interspersed as in Fig. 26. Actually, the read-out mechanism is the same in principle and the emitters E2, E3 function in the same general way as in Patent 2,045,977 (Figs. 8 and 10) and the accumulators there shown could be used herein, if desired, although less compact. The commutator construction described herein eliminates the 2:1 gearing heretofore used between the register or accumulator wheel and the read-out mechanism.

When a register order moves from "9" to or past "0" during a cycle, a units transfer or carry must be effected to the next higher order. If the latter order is in "9" position at the carry time, a further carry must take place to the second higher order. The latter carry is known as the long carry while the other carry is known as the short carry. The long carry is controlled by a "9" carry contact 655 and the short carry by a "10" carry contact 656 (Figs. 29 and 31). Above contact 656 is the common carry contact 657. These carry contacts are inserts set in an insulating moulding 658 fastened to plate 630. Moulding 651 is provided with an insulating pin 659 projecting into the loop of a hair-pin type of contact spring 660. The upper leg of the spring is anchored to contact 657 while the lower leg is movable between contacts 655 and 656. The lower leg of the spring passes through a slot in an insulating element 661 fixed to the free end of the upper arm of a carry lever 662. Lever 662 is pivoted at 663 to plate 630 and a lug 662a on its upper arm coacts with the periphery of the carry cam 640 which is fixed to register wheel 637.

When the register wheel is in any one of the value positions 1 to 8, a circular portion of the cam 640 underlies lug 662a and keeps the lever 662 in neutral position, as in Fig. 31, in which contact spring 660 has its lower leg halfway between contacts 655, 656. At this time, the lower arm of lever 662 has its tip below the notch 664a of a latch lever 664. The latter is pivotally mounted on plate 630 and connected by a spring 664b to lever 662. When the register wheel moves to "9" position, a notch 640a in the carry cam 640 underlies lug 662a of lever 662, permitting the lever to rock counterclockwise. As the lever 662 rocks in this direction, it brings the lower leg of contact spring 660 into engagement with "9" carry contact 655. When the register wheel 637 advances to or past the "0" position during a cycle, a projection 640b of cam 640 rides past lug 662, rocking lever 662 clockwise to the position shown in Fig. 29, moving the lower leg of contact spring 660 into engagement with "10" carry contact 656.

In order to retain the lever 662 and contact spring 660 in "10" carry position until after the carry operation has taken place in the machine cycle, the lever 662 is latched in the position of Fig. 29 by engagement of the tip of its lower arm with the notch 663a of latch lever 664 (Fig. 31), also pivoted at 638 to plate 630. After the carry period of a cycle has terminated, a pin 665 (Fig. 29) on drive gear 610 engages latch lever 664 and cams it clockwise to release notch 663 from lever 662 which thereupon is returned counterclockwise by spring 664b either to normal position, if the register wheel is in one of positions 1 to 8, or to "9" carry position if the register wheel has been advanced to the "9" position.

Inserts 654, 654c, the inner ends of which form the read-out commutator segments, and inserts 655, 656, 657, which form the carry contacts, project beyond moulding 658 in two parallel rows (Fig. 27). Included in the shorter row are the inserts 666, 667 which act as the terminal conductors for advance magnet AM and stop magnet SM, insert 667 being a common terminal for these magnets.

Attached to the frame bars 602, 604 is a moulding 668 of insulating material. Conductive plug sockets 669 with spring contact pieces 670 are inserted in holes in moulding 668, and their spring ends engage the beveled outer ends of the inserts 654, 654c, 655, 656, 657, 666, 667. Suitable wire connections are made to plug sockets 669 to connect the electrical circuits of the machine to the electrical parts of the accumulator plate units.

The operation of the machine will now be described with reference to the wiring diagram, Figs. 33A to 33I; the timing chart, Figs. 32A and 32B; and Figs. 34 and 35, which illustrate typical cards and the routing of the various data designating impulses from the card to the counters which control the printing and punching of the cards.

In Fig. 34 there is shown at the top a pair of master cards which, it will be understood, will be the first two cards fed from the reproducing hopper RH (Fig. 1), while at the bottom are shown the corresponding two groups of detail cards which are to be punched under control of the two master cards M1, M2. The detail cards of group 1 corresponding to the master card M1 are designated D1 to D3, whereas the cards of group 2, corresponding to the master card M2, are designated D4, D5. As will be noted by reference to the master card M1, this card is punched 3 in column 6 indicating that three detail cards are to be prepared which are to be serially numbered from 1800 to 1802, the initial serial number 1800 being punched in columns 11 to 14. The detail cards D1, D2, and D3 are not only to be punched with this serial number but are to be printed as well in large letters, as shown at the left in Fig. 34, the numbers extending in a row transversely of the card adjacent the left-hand short edge. In addition to this, the commodity number, which indicates the class of commodity, is to be printed alongside of the serial number and punched in columns 7 to 10 of the three detail cards.

In Fig. 34 the cards are shown as they appear after the punching operation has been completed in order to illustrate the result accomplished by the machine of automatically serial number punching and printing detail cards beginning with a predetermined number which is derived from another card, namely, a master card. It will be understood that any number of cards may be serially numbered and punched within the capacity of the counters which, in the illustrative embodiment of the invention, have four orders and, therefore, are capable of punching numbers from 0 to 9999. It will be understood that, by providing counters of larger capacity, a larger number of cards may be punched from a single master card.

The machine has two different modes of operation which depend upon the number of cards in the group which is to be punched under control of a single master card. When more than one card is to be punched the machine will operate in one way, which will be dealt with first, but, when only one detail card is to be punched under control of a single master card, the operation of the machine is automatically simplified to reduce the number of cycles necessary to effect the punching to thereby speed up the operation of the machine. This mode of operation will be described last.

The pack of master cards, including the first two, M1, M2 (Fig. 34), will be placed in the hopper RH face down with the 9 index point positions at the left and the 12 index point positions at the right so that the cards will be fed from the hopper 12's first. It will be understood that the bottom two cards are the master cards M1, M2, which are already punched as shown in Fig. 34. It will also be understood that in hopper PH are placed in the same manner the blank cards which are to be punched and that these cards will not have any holes. The various switches designed S with a numeral suffix in Figs. 33A to 33I will be placed in the positions shown in solid lines in Figs. 33A to 33I. The machine will be plugged in the fashion shown in Fig. 36, the plugboard chart. In order to avoid complexities and confusion on the plugboard chart, the plug wires have been shown as cabled and it will be understood that the plug sockets are connected so that the one at the extreme right or the units order in any group is connected to the corresponding one at the right of the second group of plug sockets. For example, the reproducing brushes RB corresponding to the upper right-hand group of plug sockets PS1 (Fig. 36) are connected systematically to the plug sockets PS25 so that the extreme right-hand plug socket PS1 corresponding to column 14 is connected to the extreme right-hand units plug socket PS25. In the plugboard the small numbers 1 to 4 in association with the plug sockets PS5, PS6, PS7, PS24, PS25, PS26, and PS27 indicate the units, tens, hundreds, and thousands orders, respectively, of the counters or the connections associated with these orders, and in the wiring diagram the small letters U, T, H, and TH denote these orders.

The data appearing in columns 7 to 10 and 19 to 80 on the master cards shown in Fig. 34 will be reproduced in the detail cards by conventional transcription and gang punching in which the master card M1 will first transfer the data to the first detail card D1 and subsequently the first detail card D1 will transfer the same data to the subsequent cards of the same group by conventional gang punching circuits. This phase of the operation will only be described very briefly since it is accomplished in the usual way by means well known to those skilled in the art. It should be remarked that aside from the special operations of serial number punching and printing, the machine functions normally as a gang punch reproducer and is equipped to function in the same general way in this respect, as disclosed in Patent Re. 21,133.

Figure 33F:
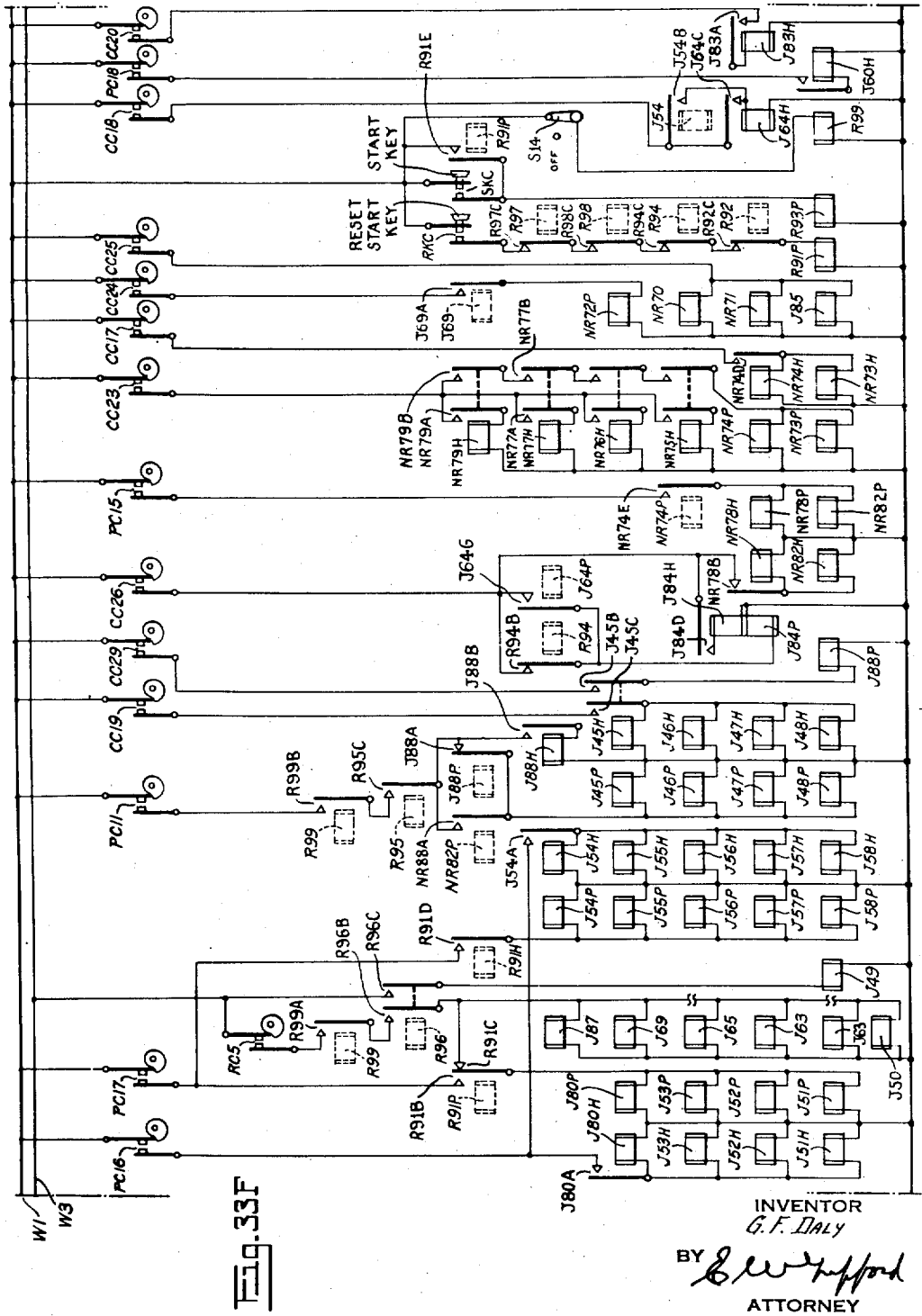

As soon as the cards are placed in the hoppers RH and PH, the reading hopper contacts RHC and the punch hopper contacts PHC (Figs. 3A, 3B and 33A) will close thereby energizing the relays R3, R98, R6 and R97. This partially conditions the main starting circuits and control circuits for the driving motor which extend through the contacts KC, DC in Fig. 33A. The start key is now depressed closing the contacts SKC (Fig. 33F) and energizing the relay R93P. Contacts R93B close and start the machine in operation by a circuit traced in Fig. 33A as follows: line wire W1, contacts KC, DC, CMC1, R93B, R6D, R1B and R25B in parallel, R3E, and relay R10, to line wire W2. Relay R24 is always energized except for a brief period at the end of the cycle when contacts RC2 open (Figs. 32B and 33B). Hence a holding circuit for relay R10 is set up through contacts PC5 which is broken near the end of the cycle. Relay R9 is energized in parallel with relay MCR through contacts R13B.

Relay R10 closes contacts R10C and establishes a parallel circuit through the coil of the motor control relay MCR. This starts the driving motor of the machine (not shown) in the usual way. Since no cards have been fed as yet, the circuit through the relay R10 cannot be maintained and, as soon as the start key is released, the contacts R93B open and will cause the machine to stop at the end of the first cycle unless the start key is held depressed.

The contacts R93A also close when relay R93 is energized and, due to the energization of relays R9, R10, a circuit is established from line wire W1 (Fig. 33A), through contacts R9B, R10B, R1C, CC1, and the punch clutch magnet PCM, to the line wire W2. A second circuit is also established through the contacts R93A, R94A, switch S10, contacts CC2, and the reading clutch magnet RCM to line wire W2. As a result of these circuits, which are initially established by the depression of the start key, the machine will enter upon the first card feeding cycle during which the first master card M1 and the first detail card D1 will be advanced from the hoppers RH and PH, respectively, as far as the reading brushes RB and the punch die 201, but the cards will stop just short of the brushes and the die. During this cycle the die card lever contacts DCL (Fig. 3B) and the card lever contacts RCL1 (Fig. 3A) will close, thereby energizing relays R94, R1, and the relay R4 (Fig. 33A). Relay R4 closes contacts R4C in parallel with contacts R1C, whereby the energization of relay R1 is temporarily ineffective as far as the circuit through the punch clutch magnet PCM is concerned.

If the start key is again depressed or held depressed throughout the first cycle of operation, the punch clutch magnet PCM and reading clutch magnet RCM will again be impulsed over circuits similar to those traced before, except through contacts R4C and R95A, the relays R9 and R10 likewise being energized to start the motor or continue it in operation for another cycle. During the second cycle, an initial entry in the quantity counter (Fig. 33G) is made before the data from the first master card M1 is transcribed to the first detail card D1 (Fig. 34). It will be understood that as yet no values have been entered in any of the counters because of the fact that so far no card has been sensed by any of the analyzing brushes PB, RB, or CB.

The number of detail cards which are punched under control of a single master card is controlled by the quantity counter disclosed in Fig. 33G and shown diagrammatically in Fig. 35. At the thirteenth point of the first cycle, a circuit is established as follows: line wire W1 (Fig. 33C), contacts PC1, line wire W3, contacts CC27, CC28 (Fig. 33H), the brushes 620 of the emitter E4 and the wire W13 of cable C1, contacts J84B, R94C, J57A (Fig. 33G), and the units order magnet AM1 of the quantity counter, to line wire W2. This engages the clutch in the units order to start adding in the units order of the quantity counter. When the second cycle takes place a second impulse is emitted by the emitter E4 (Fig. 33H), over the wire W12 to all of the magnets SM1 of the quantity counter in parallel (Fig. 33G). This disengages the clutch in the units order of the quantity counter and, since the pulses occur over the period of two successive points between the two cycles, the quantity counter will have the value 2 accumulated in it before the analysis of the first master card occurs.

The relay J84 is energized as soon as contacts CC26 (Figs. 32A and 33F) close during the first cycle and maintain relay J84 energized long enough for the entry of 2 between the first two cycles. Energization of relay R94 at the end of the first cycle then prevents further energization of relay J84, except when a new master card is to be fed as explained hereinafter, by opening contacts R94B (Fig. 33F).

During the second cycle of the machine, in which the first master card M1 passes the brushes RB and the first detail card D1 passes the punches, the data in columns 7 to 10 and 19 to 80 will be transcribed from the master card to the first detail card. It will be noted, with reference to Fig. 33C, that the reading brushes RB are not only directly connected to the plug sockets PS1 but also are indirectly connected to the plug sockets PS3 through the relay contacts J61A to J63A, and J65A to J68A, making it possible to control the punch magnets PM from either the punch brushes PB or the reading brushes RB. As soon as the first master card M1 starts underneath the reading brushes RB, the contacts RCL2 (Figs. 3A and 33A) are closed, thereby energizing the relay R96, this taking place before any holes are sensed in the card. With the relay R99 held energized by the switch S14 across the line wires W1, W2 (Fig. 33F), a circuit is established as follows: line wire W1 (Fig. 33C), contacts PC1, wire W3, contacts RC5 (Fig. 33F), contacts R99A, R96B, and the coils of relays J50, J61 to J63, J65 to J69 and J87. The energization of these relays just prior to the sensing of the first master card M1 transfers the control of the punch magnets PM from the punch brushes PB (Fig. 33C) to the reading brushes RB, whereby anything punched in columns 7 to 10 and 19 to 80 of the master card M1 will be transferred to the first detail card D1 by a typical transcribe circuit as follows: line wire W1, contacts PC1 (Fig. 33C), CC11, CC12, RC1, R96A, common brush RCB, contact roll RCR, a reading brush RB, the cable C2, the appropriate relay contact such as J63A, through the plug wire between the plug socket PS3 and plug socket PS4 and the proper punch magnet PM, and the contacts R15C, R25D, to line wire W2, thus causing the detail card D1 to be appropriately punched in one column. Besides these circuits through the punch magnets, which are for the purpose of transcribing the data on the master card M1 to the detail card D1, a certain number of other circuits are established to the counters as a preliminary to the operation of automatic serial number printing and punching of the detail card D1.

Owing to the fact that the relay R7 is still not energized, since the first detail card D1 has not passed the punch brushes PB, it is necessary to hold the start key down for more than two cycles or depress it a third time to cause a third card cycle to take place. During this cycle the contacts PCL1 will close just before the first detail card passes under the punch brushes PB. The closure of the contacts R7E (Fig. 33A) now permits a running circuit to be established for the relay R10 to maintain the machine in operation after the start key has been released. This main circuit extends through the contacts KC, DC, CMC1, SPC, PFBC, RFPC, J60B, switch S11, contacts R7E, R1A, R3C, R10A and coil of relay R10 to line wire W2. This circuit is in parallel with the previous circuit traced through contacts R93B and is maintained as long as the machine is in operation, except in case of exhaustion of the hoppers or failure of a detail card to feed.

The contacts RCL, PCL close near the end of the second card cycle and energize the relays R92, R95, this occurring before the contacts CC2 can close a circuit through the clutch magnet RCM. Since contacts R94A (Fig. 33A) are now open, the opening of contacts R92A, R95A prevents impulsing of the clutch magnet RCM and thus the second master card M2 will be stopped in a position in which it is about to pass under the brushes RB. Owing to the fact that the feed rollers 150R, 151R and 141R, 142R are continually driven, the first master card M1 will continue feeding for another cycle past the brushes CB. The relay J60P controls the impulsing of the clutch magnet RCM to cause the next master card to feed when the required number of detail cards have been punched under control of the preceding master card. Since the relay J60P is now deenergized, the clutch magnet RCM will remain deenergized until the relay J60 is energized. The first master card is fed past the brushes CB during the third cycle of the machine, while the first detail card is passing the punch brushes PB, and during this cycle the contacts RCL will open allowing the relay R95 to become deenergized. This, however, has no effect on the clutch magnet RCM because relay R92 remains energized and the contacts RCL have no control over the main running circuit through the contacts J60B. Thus the gaps between the master cards which arise from continuing the feeding of detail cards while the master card preceding the one controlling the punching of such cards is held at the brushes RB have no adverse effect on the operation of the machine.

While the first master card M1 is passing the brushes CB for columns 7 to 10, the magnets IM5 to IM8 will be energized through the plug wire connections between the plug sockets PS2 and PS6. A typical circuit for the units order is established at the 4 point in the cycle, bearing in mind that the first master card has the commodity number 1234, as follows: line wire W1, (Fig. 33B), contacts PC2, contacts 87B (Fig. 33E), 87D, wire W5, relays PR57, PR58, the 4 segment 403 of emitter E1, and brush 405, and contacts CC15, CC16 to line wire W2. The energization of relay PR57 enables a print circuit to be established as follows: line wire W1 (Fig. 33C), contacts PC1, wire W3, contacts P8 (Fig. 33D), wire W4, relay PR19P, contacts PR57A, and PR41A, the plug wire between plug sockets PS6 and PS2 (Fig. 33C) for column 10, brush CB for column 10, contact roll CCR, common brush CCB, contacts R95B, CC14, CC13, switch S7, contacts R7D, R19B, switch S8, and contacts R25D, to line wire W2.

The energization of the relay PR19P sets up a holding circuit which extends from contacts P8 (Fig. 33D) and line wire W4 through the holding coil PR19H, which is one of the group shown at the left in Fig. 33D, the coils of which are designated PR1H to PR40H, to line wire W2. Later in the cycle, when the brush 405 engages the 4 readout segment 404 (Fig. 33E), a second circuit will be established which may be traced from line wire W2, contacts CC15, CC16, the brush 405 of emitter E1 and the 4 segment 404, the contacts PR19B (Fig. 33D), PR18A, PR17A, PR16A, and the interpreting magnet IM5, wire W3, and contacts PC1 (Fig. 33C) to line wire W1. The energization of the magnet IM5 in this fashion causes the type wheel to be stopped at 4. In a similar fashion, the other type wheels will be stopped in positions to print the value 1234 when the printing operation takes place during the fourth cycle. The foregoing description has assumed that the relay R87P is energized. With switch S4 closed, the relay R87P is energized near the end of the second cycle of the machine when the contacts PCL close.

If a value higher than 4 occurs in any of the columns of the commodity number field, the impulses which energize magnets IM5 to IM8 will be transmitted via contacts PR41B and all of the "A" contacts of a group of the PR relays associated with a given one of magnets IM5 to IM8. In the units order, column 10, for example, a 5 impulse enters the plug socket PS6 then passes to magnet IM5 by way of contacts PR41B, PR20A, PR19A, PR18A, PR17A, and PR16A.

These remarks also hold for the serial number printing section, shown in Fig. 33D, in which relay PR42 is the counterpart of relay PR41. Relays PR41, PR42 are energized at 5 in the cycle by contacts PC7 to permit the energization of the magnets IM1 to IM8 under control of either direct impulses (5 to 9) or indirect impulses (0 to 4) interspersed with the 5 to 9 impulses.

It will be understood that the printing mechanism functions in the same way as in application Serial No. 434,773, filed March 14, 1942, by G. F. Daley, now Patent 2,448,781, and the above tracing of the circuit is only intended to be illustrative of the general manner in which the application of impulses to the plug sockets PS6 ultimately effects the printing of the number on the card. The four orders of the printing mechanism associated with the plug sockets PS6 which print the commodity number are locked so that this number is repeated with each succeeding card cycle of the two remaining to print and punch the group of detail cards D1 to D3 associated with the first master card M1. The manner in which the printing wheels are locked has already been described with reference to Fig. 14 which shows the bail 500 in locking position with the numeral 2 at the printing point. This bail is automatically locked in consequence of the first setting movement of the printing wheels and will remain locked until the bail release solenoid BRS is energized during the cycle preceding the one in which the last card is printed. If the switch S15 is closed (Fig. 33E) the magnet BRS will be energized during every cycle of the machine and prevent the bail from remaining locked and the printing wheels will be reset every cycle. For the operation of serial number printing, however, the switch S15 is in open position, placing the bail BRS under control of the relay J45P.

During the second cycle of the machine, when the first master card passes the brushes RB, the quantity appearing in columns 3 to 6 is entered subtractively in the quantity counter over the plug wires inserted between plug sockets PS1 and PS5 (Fig. 36) and at the same time the serial number appearing in columns 11 to 14 is entered in the four orders of the punch counter (Fig. 33H) associated with the plug sockets PS25 over the plug wire connections between these plug sockets and plug sockets PS1. It has already been explained how two units are entered positively in the quantity counter (Fig. 33G) between the first and second cycles. By energizing the entry of the quantity from columns 3 to 6 of the master card M1 is effected subtractively by circuits traced.

In order to simplify the tracing of circuits and to avoid repetitious tracing between common parts of the circuits, the plug sockets associated with various card sensing brushes and the wires W0, W11, W12, W13, W14 of cable C1 will be treated as impulse sources and tracing of the circuits will begin at the plug socket or wire corresponding to the particular brush or brushes involved.

An illustrative circuit is that for the units order which in the master card M1 is the value 3 denoting that three cards are to be punched. At the 3 point in the second cycle the brush RB for column 6 will encounter the 3 hole and establish a circuit to the magnet AM1 for the units order of the quantity counter. This circuit extends from the plug socket PS1 (Fig. 33C) for column 6 over the plug wire to the plug socket PS5 for the units order of the quantity counter (Fig. 33G) contacts J49A, J57A, and the units magnet AM1, to line wire W2. This engages the units order clutch and starts the units order wheel rotating. At the 9 point in the second cycle, the emitter E4 will close a circuit to the wire W9 of cable C1 and energize all of the magnets SM1 to SM4 of the quantity counter through contacts J58A, thus causing the value 6 to be entered in the units order. At the 0 point in the second cycle the clutch magnets AM2 to AM4 will be energized by similar circuits through the other contacts J49A of relay J49 and engage all of the clutches in the tens, hundreds, and thousands order and these clutches will be disengaged by the magnets SM2 to SM4 in the same fashion as for the magnet SM1. Thus, at the 9 point of the second cycle the value 9996 will have been added to the previous value 2 in the units order so that the quantity counter (Figs. 33G and 35) will stand at the value 9998.

The quantity counter controls the number of detail cards punched and it is necessary to give it this advance to accumulation because of the fact that it is necessary for the counter to anticipate the fact that the last card is being punched at least one cycle before the cycle in which such last card is punched in order to allow time for setting up the controls to feed a new master card.

During the second cycle the entry of the serial number in the punch counter is effected as follows, again taking the units orders as an illustrative example: the 0 hole in column 14 causes a circuit to be established for the units order from plug socket PS1 for column 14, through the plug wire and plug socket PS25 (Fig. 33H) for the units order of the punch counter, through contacts J50A and magnet SM1. However, at the instant that this takes place all of the magnets AM1 to AM4 are energized together over a circuit from wire W0, contacts CC21, J69A, NR73A, J52A, and all of the magnets AM1 to AM4 in parallel, to line wire W2.

As a result these impulses in the units order cancel each other and no entry is made in this order. In the highest order, however, the 1 hole in column 11 of the master card M1 will occur one index-point position later in the cycle than the impulse from wire W0 and will cause 1 to be added in the punch counter. Similarly, an 8 will be added in the hundreds order and the 0 in the second order has no effect. Since relay J65 is energized during the second cycle, the punch magnets for columns 11 to 14 will be energized in parallel with magnets SM1 to SM4 for the punch counter to punch the serial number 1800 in the first detail card. These branch circuits extend from plug sockets PS25 through contacts J65B to plug sockets PS24 and the plug wires to plug sockets PS4 for columns 11 to 14.

During the third cycle, while the master card M1 is passing the brushes CB, the serial number appearing in columns 11 to 14 will be entered in the print counter (Fig. 33I) in the same fashion as in the punch counter. At the beginning of the third cycle all of the magnets AM1 to AM4 of the print counter (Fig. 33I) are energized by a circuit as follows: line wire W1, contacts PC1 (Fig. 33C), wire W3, the magnets AM1 to AM4 (Fig. 33I), contacts J53A, J48C, wire W17, contacts NR78B, CC30, wire W18, contacts CC13, CC14 (Fig. 33C), switch S7, contacts R7D, R19B, switch S8, and contacts R25D, to line wire W2. This engages all of the clutch magnets AM1 to AM4 of the print counter and starts all of the wheels turning.

If any of the columns in the card are punched 0 a simultaneous 0 circuit will be established which will cancel the effect of energization of any magnet AM1 to AM4 in a generally similar way to the one previously described for the punch counter. The initial serial number is 1800 and in the units order the 0 brush circuit will be traced as follows: plug socket PS2 for column 14, the plug wire between plug socket PS2 and the units order plug socket PS26 (Fig. 33I), contacts J47B, and units order magnet SM1, wire W3, and contacts PC1, to wire W1. At the 1 and 8 points in the cycle, the values 1 and 8, respectively, will be entered in the thousands and hundreds orders by circuits similar to the 0 brush circuit. In all cases these circuits will be common in respect to that part of the circuit extending from line wire W2 (Fig. 33C), contacts R25D, switch S8, and contacts R19B, R7D, switch S7, contacts CC13, CC14, R25D, the common brush CCB, the contact roll CCR, and brushes CB, to the respective plug sockets PS2.

Since relay J46P is energized during the third cycle, the impulses to plug sockets PS26 which cause the entry of 1800 in the print counter will split and parallel impulses to magnets IM1 to IM4 will be emitted through contacts J46B to plug sockets PS27 and then through the plug wires to plug sockets PS7 to set the printing wheels to 1800. This causes the first detail card to be printed 1234–1800 during the fourth cycle.

So far, during the first three cycles of the machine, the quantity 003 has been entered negatively in the quantity counter, the serial number 1800 has been entered positively in the punch counter, the quantity counter has been preset by the value 2 to anticipate the punching of the last detail card, the commodity number 1234 has been set up and locked in the print unit, and the serial number 1800 has been set up positively in the printing unit and print counter. Also during the second cycle of the machine, due to the transcribing control effected by the relays J61 to J63, and J65 to J69, the first detail card has been punched with all of the necessary data. During the third cycle, the data in columns 7 to 10 and 19 to 80 will be gang-punched from the first detail card to the second detail card by impulses emitted from the plug sockets PS3 to the plug sockets PS4. In the respect the machine has functioned in the normal way and well known in the art and need not be described.

During the third cycle the punch counter emits impulses from the plug sockets PS24 to the punch magnets for columns 11 to 14 to punch the serial number in the second detail card. However, this counter must punch the next higher number 1801 and before this can take place it is necessary that the punch counter be advanced a unit. It will be remembered that this counter receives an entry positively and accordingly it is necessary to energize the magnets AM1, SM1 one cycle point apart between the time the first detail card is punched and the time the second detail card is punched. These operations are effected by energizing the units magnet AM1 in Fig. 33H by a circuit as follows. Line wire W1, contacts PC1, wire W3, contacts CC27, CC28, brushes 620, and the 14 segment 619, wire W14 of cable C1, contacts R94D, J84C, NR73B, J52A, J64A, and magnet AM1, to line wire W2. This engages the units wheel clutch and starts the counter wheel turning. At 12 in the second cycle a similar circuit is set up through wire W12, contacts J64C, J50B, and magnet SM1 to line wire W2, thus causing a unit to be entered in the punch counter.

During the third cycle, when the second detail card is being punched under control of the punch brushes PB, the emitter E2 for the punch counter (Fig. 33H) will read out the total 1801 now standing on this counter to the punch magnets PM for columns 11 to 14, the impulses being emitted from the plug sockets PS24 to plug sockets PS4 for columns 11 to 14. Taking the units order, for example, the punch magnet PM for column 14 will be energized at the 1 point in the second cycle by a circuit as follows: Line wire W1, contacts PC1, wire W3, contacts CC27, CC28, the 1 segment 618 and brushes 616 of emitter E3 (Fig. 33H), the cross-connecting wire common to the segments 654 corresponding to the 1 position of the accumulator, the units order segment 654, the brushes 652, the contacts J65A, plug socket PS24, the plug wire, plug socket PS4 for column 14, the punch magnet PM (Fig. 33C) for column 14, and contacts R15C, R25D, to line wire W2. This causes 1 to be punched in column 14 of the second detail card and in a similar fashion the remainder of the serial number will be punched in the second detail card.

In consequence of the fact that the print unit is displaced in such as position that printing must be effected on a detail card during the cycle following the passage of the detail card past the punch brushes PB, it is necessary to delay the advancing of the print counter a unit until the beginning of the fourth cycle. By this time the card lever contacts RCL will have opened since these contacts open after the first master card M1 passes the brushes CB.

The opening of the contacts RCL (Fig. 3A) deenergizes the relay R95 (Fig. 33A), thereby deenergizing the group of relays J45P to J48P (Fig. 33F). This allows the contacts J48A (Fig. 33I) to close and, with the closure of the contacts PC14 at 14 in the cycle, a circuit is established from line wire W1, contacts PC1, wire W3, magnet AM1 for the print counter, contacts J53A, J48A, NR78A, R92A, and PC14, to line wire W2. This engages the units order clutch of the print counter and one cycle point later at 12 the clutch is disengaged by a circuit through the magnet SM1 for this counter which may be traced as follows: Line wire W1, contacts PC1, wire W3, magnet SM1, and contacts J47A, PC13, to line wire W2. Immediately after this takes place, the first detail card will be printed with the serial number 1800.

For the purpose of printing the serial number 1801 the print counter (Fig. 33I) emits impulses during the fourth cycle from the plug sockets PS27 to the plug sockets PS7. Owing to the deenergization of relay J46 the common strips of the readout commutators for the print counter are now connected directly to the plug sockets PS27 as shown in Fig. 33I. This enables the readout commutators for the print counter to control the magnets IM1 to IM4 to cause the serial number 1801 to be printed on the first detail card in alignment with the commodity number 1234. At the 1 point in the cycle a circuit is established which extends from line wire W1, through contacts PC1 (Fig. 33C), wire W3, units magnet IM1 (Fig. 33E), contacts PR36B, switch S13, the 1 read-out segment 404 of emitter E1, and contacts CC16 and CC15, to line wire W1. This causes the value 1 to be set on the type wheel in the manner clearly explained in application Serial No. 434,773 and briefly explained above. In the same manner the other type wheels are set for the remainder of the digits of the value 1801 by similar circuits traced through the tens, hundreds, and thousands readout commutators of the print counter.

In order to print the values set up in the print unit, platen operating magnets PLM are energized during the fourth cycle by a circuit which extends from line wire W1, contacts PC3, PC2 (Fig. 33B), contacts R87B, PC9, switch S9, contacts R89B, and magnet PLM to line wire W2, this circuit being set up and functioning in the same manner as described in application Serial No. 434,773. Between the third and fourth cycles the punch counter (Fig. 33H) again will be advanced a unit to 1802 in the manner described above.

The quantity counter was initially advanced two units and subsequently the quantity 3 was entered as the 9's complement during the second cycle so that at the end of the second cycle the value accumulated on this accumulator is 9998. At the beginning of the third cycle a single unit is added to the quantity counter to advance it to 9999. This is effected by a circuit traced as follows: The emitter E4 closes a circuit to wire W14 at the beginning of the third cycle, thereby closing a circuit through the contacts J84A (Fig. 33G), R94C, J57B, and magnet AM1, to line wire W2, this occurring at 14 in the cycle. At 12 in the third cycle, all of the magnets SM1 are energized in parallel by the closure of a circuit to the wire W12 by emitter E4, thereby disengaging the clutch for the units order one cycle point after it was engaged by energizing magnet AM1. Thus, a unit is added in the quantity counter and the units order is stepped to 9, thereby closing the 9's carry contacts 655, 657. This indicates to the machine that the next cycle, during which the third detail card D3 will be punched, is the last one of the group.

At the 13 point in every card cycle a test circuit is made to ascertain the condition of the quantity counter in order to determine if it is about to be restored to 0 which condition will be manifested by the fact that all of the wheels stand at 9. This test circuit is closed by emitter E4 through the wire W13, and extends through the contacts J85A (Fig. 33G) and the 9's carry contacts 655, 657 in series, contacts NR74A and relay J83P to line wire W2. Since the last card is still to be punched, requiring one more cycle, it is desired that a delay be introduced for the time being and accordingly the relay J83P closes its contacts J83A (Fig. 33F) to establish a holding circuit for itself through its hold coil J83H and the contacts CC20. It will be noted by reference to the timing chart (Fig. 32A) that the contacts CC20 close near the end of the third cycle and hold the circuit for coil J83H until 0 of the fourth cycle. During this cycle the third detail card will be punched.

At the beginning of the fourth cycle the quantity counter will be advanced a unit in the same manner as before and will be restored to 0, thereby closing the contacts 656, 657 which, it will be recalled, are the tens carry contacts in the units order of the quantity counter. The energization of the relay J83P causes contacts J83B to close and connect the relay J64P to the wire W11 which is connected to the 11 segment of emitter E4. However, this occurs near the end of the third cycle and has no effect for the time being. At the beginning of the fourth cycle the emitter E4 closes a circuit to the wire W11 and thereby energizes the relay J64P through the contacts J83B, the relay J83B now being held through the contacts CC20. Relay J64P closes its contacts J64C (Fig. 33F) and a holding circuit is established through coil J64H and the contacts CC18 which will not be broken until the beginning of the fifth cycle. Thus, relay J64P remains energized throughout the fourth cycle in which the third detail card is being punched and closes the contacts J64D (Fig. 33G) conditioning the circuit for relay J60P. At 13 in the fourth cycle the emitter E4 sends an impulse through wire W13 and contact J64D to the relay J60P which signifies that a new master card should be fed in readiness for punching the fourth detail card D4, which is the first card of the second group to be punched under control of the second master card M2 (Fig. 34). The relay J60P closes contacts J60A (Fig. 33A) during the fourth cycle whereupon the contacts CC2 close a circuit to the reading clutch magnet RCM at the end of the fourth cycle to feed the second master card past the brushes RB.

Only two cards are to be punched under control of the second master card and the sequence of operations described with reference to the master card M1 will be repeated with respect to the second card but, during the fifth cycle, the quantity counter will be advanced to 9999 immediately in consequence of the addition of the values 2 and 9997. During this cycle the machine will make the test of the 9's carry contacts as before and again condition the machine for the punching of the last detail card of the group exactly as described above. In consequence of the entries made in the print and punch counters between cycles the successive detail cards D4, D5 will be properly punched and serial number printed by circuits similar to those traced above.

It is necessary before punching a new series of detail cards to reset the punch and print counters in preparation for receiving new entries from the new master card M2. The manner in which these resetting operations are carried out will now be described.

When the relay J64P is energized during the fourth cycle, it closes the contacts J64B (Fig. 33H), thereby connecting the adding magnets AM1 to AM4 in parallel with the punch magnets for columns 11 to 14 which punch the serial number in the card. It is apparent that, when the emitter E3 closes circuits through the readout commutators to punch the serial number 1802, the adding magnets AM1 to AM4 for the punch counter will be energized in parallel with the punch magnets. For example, since the units order wheel of the punch counter (Fig. 33H) now stands at 3, the magnet AM1 will be at 3 in the fourth cycle energized through the contacts J64B and engage the units and clutch to start the units wheel turning. At 13 in the cycle the magnets SM1 to SM4 will be energized by an impulse from the emitter E4 through the wire W13 and contacts J64F, J50B. This causes the counter wheel to be engaged at 3 and rotate through seven steps of movement which will carry it back to 0 before the magnets SM1 to SM4 are energized at 13 in the cycle. Thus, the punch counter wheels are restored to 0 simultaneously with the operation of punching the third detail card. In the case of the print counter these operations are permitted during the fifth cycle by the relay J53P which connects the common strips of the readout commutators for the print counter to the magnets AM1 to AM4 of the print counter. The plug sockets PS27 are plugged to the magnets IM1 to IM4, and the impulses emitted by the print emitter E2 and the readout commutators for the print counter will be sent to both the magnets AM1 to AM4 and the magnets IM1 to IM4. The relay J53P is energized by the energization of relay R96 which comes as a result of the resumption of feeding the master cards.

On account of the single cycle delay necessary to complete the printing operation, resetting of the print counter will occur one cycle later than the resetting of the punch counter, it being necessary to retain the serial number 1802 of the third detail card until the third detail card reaches the print station. This will occur during the fifth cycle. This is also one of the reasons why the serial number is entered in the printing unit under control of the comparing brushes CB rather than the reading brushes RB.

Prior to the resumption of feeding of the new master card M2 it is necessary to condition the quantity counter for the new group of detail cards by adding 2 as in the case of the first master card M1. It will be noted in Fig. 33G that the relay J84P, through its contacts J84A, J84B, controls the time of energization of the magnet AM1 of the quantity counter. Prior to the feeding of the new master card, that is, during the fourth cycle, relay J84P is energized by the closure of contacts J64G (Fig. 33F), closing contacts J84B and allowing an impulse from wire W13 to be transmitted to the units magnet AM1 through the contacts R94A, J57A. At the beginning of the fifth cycle all of the magnets SM1 to SM4 will be energized which, in the units order, will have the effect of disconnecting the units order clutch of the quantity counter as described above after two units have been added.

The relay J84P is held by the contacts J84D through the holding coil J84H and contacts CC26 until the early part of the fifth cycle when the holding circuit is broken, thereby permitting the contacts J84A to reclose to condition the machine for adding a unit in the quantity counter during the first part of the sixth cycle. The addition of 9997 steps the quantity counter to 9999, signifying that the sixth card cycle will be the last cycle for the second group punched under control of the master card M2 and the functioning of the machine, as described above, will be repeated to cause a third master card to be fed.

In the above description it has been assumed that the card groups were short in order to simplify the description by reducing the number of cycles necessary to show a complete sequence of operations. In actual practice, however, the groups will necessarily frequently contain larger numbers of detail cards than 10 which will entail tens transfer operations in the various counters. Since the values entered into the print and punch counters are positive the transfer likewise will be positive in these counters. This requires the energization of the magnets AM1 to SM1 at the proper times to add one unit in one or more orders to properly advance the counter wheels to zero whenever any lower order counter wheel passes through zero.

The higher order wheels never receive multidenominational entries but only receive transfers, since normally only one entry is ever made at a time which is confined to the units orders respectively. This simplifies the problem of effecting transfers and enables the 9's transfer contacts alone to be used except in the case of the quantity counter in which the tens transfer contacts for the units order are used. No double transfers will ever occur.

Let it be assumed that at the end of a cycle the print counter stands at 9 and moves to zero when a unit is entered at the beginning of the next cycle. The impulse to magnet AMI at 14 in the cycle will find the units transfer contacts 655, 657 closed and energize the adding magnet AM2. The impulse for energizing the magnet AM2 is traced from wire W1, contacts PC1, wire W3, magnet AM2, contacts J53A, units 9's transfer contacts 655, 657, and contacts J48A, NR78A, R92A, PC14, to line wire W2. Both the units and tens wheels rotate in unison. At 12 the contacts PC13 close and energize all of the magnets SM1 to SM4 through the contacts J47A between line wires W2 and W3, thus disengaging the clutch SM2 and allowing only one unit to be added on the next higher order wheel which, in this case, is the tens order.

If it should happen that the hundreds wheel also stands at 9, requiring a second transfer, then the next higher order magnet AM3 will be energized in parallel with the magnet AM2 through the tens order contacts 655, 657. Thus three counter wheels will be started, rotated, and disengaged in unison.

The punch counter (Fig. 33H) functions upon a transfer in much the same fashion except that the adding magnets AM1, AM4 are engaged by impulses from the wire W14 through the contacts J84C, NR73B, J52A, and J64A. The impulses which disengage the punch counter clutches by energizing magnets SM1, SM4 are transmitted by the wire W12, through the contacts J64E and J50B, to the magnets SM1 to SM4.

It may happen that only one detail card is to be punched under control of a master card. In other words, a master card is to be merely duplicated in a detail card and in this case the quantity 0001 will be punched in columns 3 to 6 of the master card. In order to save unnecessary cycles involved in resetting the punch and print counters (Figs. 33H and 33F), which would lower the efficiency of the machine, provision is made for suppressing entries in these counters when only a single detail card is to be punched. In order to accomplish this result provision is made for pre-reading the master card while it is passing from the hopper RH to the brushes RB to determine the fact that this card is punched 1 in column 6 and later, when the 0 positions of the master card are sensed by the brushes RB, the quantity counter (Fig. 33G) is utilized to sense the fact that the card is zero punched in columns 3, 4, and 5. These facts are coordinated in a circuit which operates to suppress the entries into the punch and print counters.

With reference to Figs. 3A and 33B, it will be noted that the usual X brushes are designated RXB, of which six are shown, and are connected to the contacts J10A, J11A of the relays J10, J11 and there is an additional normally closed contact J11B controlling the relay J19. As is well known in machines of this type, the X brushes RXB are located to pre-sense cards before they pass the brushes RB to ascertain whether or not the card is punched with an X. The lowermost brush RXB (Fig. 33B) is positioned manually in advance of starting the machine to sense column 6 of the master card in which the value 1 will be punched signifying the possiblity of a single card group. When this card is sensed by the brush RXB, the 1 hole in column 6 will cause the relay NR79P to be energized by a circuit from line wire W1, contacts CC22, J69A, R4B, common strip RXCS, the brush RXB for column 6, and the relay NR79P, to line wire W2.

The relay R79 closes its contacts NR79A to establish a holding circuit for itself through the holding coil NR79H (Fig. 33F) and the contacts CC23. The contacts NR79B also close a parallel circuit involving the contacts CC23. Subsequently, when the 0's on the master card are sensed by the brushes RB for columns 3, 4, and 5, the relays NR75P, NR76P, NR77P (Fig. 33G), which are connected in parallel with the magnets AM2, AM3, AM4 for the quantity counter, will be energized. The relays NR75P, NR76P, NR77P operate at a considerably higher speed than the magnets AM2, AM3, AM4 and close their contacts NR75A, etc. to set up holding circuits through their holding coils NR75H, NR76H, NR77H (Fig. 33F) in exactly the same fashion as the relay NR79H. The contacts NR75B, NR76B, NR77B now close a series circuit to energize the relays NR73P, NR74P which in turn close the contacts NR74H to establish a holding circuit for the coils NR73H, NR74H through the contacts CC17.

The contacts NR74C (Fig. 33G), contacts NR73A, NR73B (Fig. 33H) open and prevent impulses to magnets AM1 to AM4 of the punch counter, thereby suppressing the entry of the serial number into the punch counter, it being recalled that it is possible to enter values in the punch counter only by first energizing all of the magnets AM1 to AM4 at zero and then selectively energizing the magnets SM1 to SM4. Since the counter wheels are normally in a declutched position, the energization of the magnets SM1 to SM4 when the serial number in columns 11 to 14 is sensed by brushes RB will have no effect. The entry of a unit in the units order of the punch counter also is suppressed.

On account of the fact that the print counter (Fig. 33I) receives its entries from the brushes CB, it is necessary to set up a cycle delay circuit which will become effective one cycle later to suppress entries in the print counter (Fig. 33I). During the cycle in which the master card passes the brushes RB the relays 73, 74 will be energized at 0 and the holding circuit therefor will be established through contacts CC17 until a little beyond 11 of the following cycle in which the master card will pass the brushes CB.

While the relays 73, 74 are still held energized during this following cycle, the contacts PC15 close (Fig. 33F) and energize the relay NR78P, NR82P through the contacts NR74E. The contacts CC26 close about this time (see Fig. 32A) and a holding circuit is established through contacts NR78B and the coils NR78H, NR82P which will be maintained until a little beyond 12 of the cycle in which the master card is stacked in the pocket RP. Thus, during the time in which the one-card group master card is passing the brushes CB, the relay contacts NR78A, NR78B (Fig. 33I) will be open and prevent entries in the print counter by preventing energization of the magnets AM1 to AM4 and by preventing the entry of a unit therein which would ordinarily occur immediately after the serial number is entered under control of the comparing brushes CB. The relay NR82P opens contacts NR82A to suppress the readout of the print counter.

Entries in the quantity counter are not suppressed during the cycle in which the one-card group master card passes the brushes RB. Since the master card is punched 001 in columns 3 to 6 the value 9998 will be entered therein when such card passes brushes RB and added to the value 2 in the units order which is entered in the manner described with the net result that the quantity counter will stand at 9990 at 13 in this cycle, and it is now necessary to turn the three higher order wheels to 0 before the next master card is sensed by brushes RB. The adding of the 8 to the 2 in the units order of the quantity counter has caused the tens transfer contacts 656, 657 to close and latch in the usual way. The entry of two units in the counter occurs between 13 of the one cycle and 12 of the next cycle in which the master card which is punched 001 passes the brushes RB. At the end of this same cycle 2 is again added to the counter in the units order, since the one-card master card is followed by another master card, and this entry of 2 occurs between 13 of the one cycle and 12 of the cycle in which the second master card passes brushes RB. At 14 of this period the contacts 656, 657 are still closed and a circuit is established from the wire W14 through the contacts J84A (Fig. 33G), R94C, J57A, 656, 657, and the contacts J85A in parallel, through the magnets AM2 to AM4. This circuit can only be established at 14 notwithstanding the fact that a circuit also is closed from wire W13 to the magnet AM1 at 13 in the cycle, because the relay J85 is only energized from 13 to 14, thus preventing energization of the magnets AM2, AM3, AM4 at 13 in the cycle. Thus the value 1110 is added in the quantity counter, turning the upper three wheels to 0 but the units order wheel will stand at 2 since the entry of 2 in consequence of the feeding of a new master card was not affected. The relays NR70, NR71, and J85 are energized by the contacts CC25 which, it will be noted in Fig. 32A, are not closed at 13.

It should be explained that there is a certain amount of mechanical lag in the clutches controlled by the magnets AM1, SM1, etc. so that it is necessary to get the pulse into these magnets at 13 in the cycle in order to effect the engagement of the clutches, and the closure of contacts CC25 comes just a little too late to allow the pulsing of the magnet AM1 at 13 to affect the magnets AM2, AM3, AM4. At 12 in the cycle the magnets SM1 are energized in parallel by a pulse over the wire W12 in the same manner as described above in dealing with the first master card cycle.

When the master card for the 1 card group passes the brushes RXP and the relay NR74P is energized, as described above, the contacts NR74B (Fig. 33G) close. At 13 in this cycle an impulse is transmitted through these contacts to the relay J60P which functions as described above to enable the energization of the clutch magnet RC to feed the master card following the one which is punched 001. This one-card master card causes the punching of a single detail card in the same manner as any other master card and the corresponding detail card will be printed with the commodity number and the serial number in exactly the same fashion as any other detail card, the printing wheels being set up in the same manner as for the first detail card of a multiple card group.

It may happen that for some reason or other the machine stops or is manually stopped by means of the stop key SPC (Fig. 33A). For example, the cards might jam, the card lever contacts might open, or the operator may depress the stop key. It is necessary to start all over again under these conditions and accordingly the operator will remove the cards from the respective hoppers RH, PH, and, by holding down the start key and maintaining the contacts SKC closed, run the remaining cards in course of feed at the time the machine stopped into the respective pockets RP and P. As soon as this is done it is necessary to reset the various counters in preparation for restarting the machine. To do this the operator depresses the reset start key and closes the contacts RKC (Fig. 33F). Since the cards have all been removed from the machine and all of the card levers have assumed the no-card position the various card lever relays R92, R94, R96, and R97 will be deenergized and their contacts R92C, R94C, R96C, R97C (Fig. 33F) will be closed, thereby causing the energization of the relay R91P. The relay R91P closes its contacts R91E and thereby energizes the relay R93P to start the machine in operation. Relay R91P also closes contacts R91D, thereby causing relays J54P to J58P to be energized. The holding coils J54H to J58H of these relays are then energized through the contacts J54A and the contacts PC16. The relays J51P, J52P, J53P, J80P are also energized by the closure of contacts R91B, and holding circuits therefor through the hold coils J51H, J52H, J53H, J80H are made through contacts J80A and PC16. The contacts PC2 close near the end of each cycle and at this time are still closed, thereby setting up a holding circuit for the coil R91H over the wire W6 in Fig. 33B. Thus, it is unnecessary for the operator to hold the reset start key down for a full cycle. The relay J55P closes contacts J55A (Fig. 33I) to render the emitter E2 effective for this cycle and the relay J53 closes its contacts J53B to connect the readout commutators of the print counter to the magnets AM1 to AM4. If there is a value standing on any of the wheels of the print counter, the corresponding magnet of the group AM1 to AM4 will be energized at the point in the cycle corresponding to the value wheel, thereby clutching the wheel to the drive shaft therefor and at 13 in the cycle all of the magnets SM1 to SM4 will be energized to declutch any of the wheels that are rotated. The circuits for the magnets SM1 to SM4 extend from wire W2, through contacts PC13 and J45A to line wire W3 and contacts PC1 to line wire W1.

The energization of relay J54P causes the relay J64P (Fig. 33F) to be energized by closure of contacts J54B. This causes contacts J64B (Fig. 33H) to connect the magnets AM1 to AM4 for the punch counter to the common strips of the readout commutators for such counter, thereby effecting the resetting of the punch counter in the same manner as the print counter. The energization of relay J57P closes contacts J57A and connects the magnets AM1 to AM4 for the quantity counter to the common strips of the readout commutators of such counter and the latter also is reset. Since the various holding circuits for the relays involved in the resetting operation are maintained through continually running contacts which break every cycle, they will be broken down by the end of the cycle and the machine will stop. The operator may now replace the cards in the hoppers and make a fresh start.

It may happen that the operation of the machine is interrupted after a large number of detail cards for a given master card have been punched, making it undesirable to throw away the cards of the incompleted group. For example, if the operation of the machine were interrupted in the middle of a 3-card group it is cheaper to throw away the detail cards already punched and resume operations with the master card which started the punching of this group. This is not feasible, however, if a very large number of detail cards has been punched. In such a situation the punching operations will not be resumed with the master card which started the punching of the large number of cards. Instead a special master card will be inserted in front of the next highest master card and this special master card will be punched with the serial number following the last detail card punched at the point of interruption of the operation of the machine. If desired, this special master card may be of a contrasting color to facilitate its removal when the cards are assembled. This special master card will immediately follow the master card which belongs with the broken group and must be removed eventually.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. In a machine of the class described, means to feed a succession of records each having designations representing a definite starting serial number and a definite number of separate records to be serially number punched, beginning with said starting serial number; a quantity counter controlled by the quantity designations through said sensing means, a serial number counter controlled by the serial number designations through said sensing means, a record perforating mechanism controlled by the sensing means to punch a first detail record with the initial serial number under control of one of the master records, means for placing the record perforating mechanism under control of the serial number counter to serial number punch a succession of detail records beginning with the next highest serial number above said one master record, means to advance said counters a unit for each record punched under control of the serial number counter, means rendered effective by the quantity counter for suppressing punching of detail records with the next higher number when the quantity designated on the master card has been reached, means controlled by the quantity counter to cause the resetting of both counters when the required quantity of records has been serial number punched, and means controlled by the quantity counter to cause a new master card and the first detail card therefor to be fed when the designated quantity of detail cards have been punched.

2. In a machine of the class described, means to feed a succession of records each having designations representing a definite starting serial number and a definite number of separate records to be serially number punched, beginning with said starting serial number; a quantity counter controlled by the quantity designations, a serial number counter controlled by the serial number designations, a record printing mechanism controlled by the serial number counter to print a detail record with the serial number under control of one of the master records, means for placing the record printing mechanism under control of the serial number counter to serial number print a succession of records beginning with the next highest serial number above said one master record, means to advance said counters a unit for each record printed under control of the serial number counter, means controlled by the quantity counter for suppressing printing of detail records when the quantity designated on the master card has been reached, and means controlled by the quantity counter to cause a new master card to be fed when the designated quantity of detail cards have been printed.

3. In a machine of the class described, means to sense a record containing quantity and serial number designations, a quantity counter, means controlled by the sensing means for entering the quantity in the quantity counter, a serial number counter, means controlled by the sensing means for entering the serial number in the serial number counter, means to perforate a succession of separate records under control of the serial number counter, means to advance both the serial number counter and the quantity counter a unit for each separate record punched, whereby the successive separate records are punched with different consecutive serial numbers, and means controlled by the quantity counter for terminating the punching of serial numbers when the number of separate records counted equals the quantity designated.

4. In a machine of the class described, means to feed a succession of records each having designations representing a starting serial number and the number of separate records to be serially number punched beginning with said starting serial number, means to sense said designations one record at a time, a quantity counter, a serial number counter, means controlled by the sensing means for entering the quantity in the quantity counter when one of said first records is sensed, means controlled by the sensing means for entering the serial number in the serial number counter, means to serial number perforate a series of separate records, means to initially place said perforating mechanism under control of the sensing means to punch the starting serial number in the first of the series of separate records, read-out means for the serial number counter, means to connect the read-out means to the perforating means to perforate the succeeding separate records of said series with succeeding serial numbers, means to enter a unit in each of said counters for each of said separate records of said series, means controlled by the quantity counter for disconnecting the read-out means from the perforating means when the last record of said separate series is serial number perforated, means rendered effective by the quantity counter to cause resetting of the serial number counter, and means made operative by the quantity counter to render the feeding means effective to feed another of the first named records to the sensing means.

5. In a machine of the class described, means to feed a succession of records each having designations representing a starting serial number and the number of separate records to be serially number printed beginning with said starting serial number, means to sense said designations one record at a time, a quantity counter, a serial number counter, means controlled by the sensing means for entering the quantity in the quantity counter when one of said first records is sensed, means controlled by the sensing means for entering the serial number in the serial number counter, means to serial number print a series of separate records, means to intially place said printing mechanism under control of the sensing means to print the starting serial number in the first of the series of separate records, read-out means for the serial number counter, means to connect the read-out means to the printing means to print the succeeding separate records of said series with succeeding serial numbers, means to enter a unit in each of said counters for each of said separate records of said series, means controlled by the quantity counter for disconnecting the read-out means from the printing means when the last record of said separate series is serial number printed, means rendered effective by the quantity counter to cause resetting of the serial number counter, and means made operative by the quantity counter to render the feeding means effective to feed another of the first named records to the sensing means.

6. In a machine of the class described, means to feed a succession of records each having designations representing a starting serial number and the number of separate records to be serially number punched beginning with said starting serial number, means to sense said designations one record at a time, a quantity counter, a serial number counter, means controlled by the sensing means for subtractively entering the quantity in the quantity counter when one of said first records is sensed, means controlled by the sensing means for additively entering the serial number in the serial number counter, means to serial number perforate a series of separate records, means to initially place said perforating mechanism under control of the sensing means to punch the starting serial number in the first of the series of separate records, read-out means for the serial number counter, means to connect the read-out means to the perforating means to perforate the succeeding separate records of said series with succeeding serial numbers, means to enter a unit additively in each of said counters for each of said separate records of said series, means controlled by the quantity counter for detecting the fact that the last card is to be perforated and operative to disconnect the read-out means from the perforating means after the last record of said separate series is serial number perforated, means rendered effective by the quantity counter to cause resetting of the serial number counter, and means made operative by the quantity counter to render the feeding means effective to feed another of the first named records to the sensing means after the last separate record of said series has been serial number perforated.

7. In a machine of the class described, means to feed a succession of records each having designations representing a starting serial number and the number of separate records to be serially number printed beginning with said starting serial number, means to sense said designations one record at a time, a quantity counter, a serial number counter, means controlled by the sensing means for subtractively entering the quantity in the quantity counter when one of said first records is sensed, means controlled by the sensing means for additively entering the serial number in the serial number counter, means to serial number print a series of separate records, means to initially place said printing mechanism under control of the sensing means to print the starting serial number in the first of the series of separate records, read-out means for the serial number counter, means to connect the read-out means to the printing means to print the succeeding separate records of said series with succeeding serial numbers, means to enter a unit additively in each of said counters for each of said separate records of said series, means controlled by the quantity counter for detecting that printing of the last separate record of said series is about to be printed and operative to disconnect the read-out means from the printing means when the last record of said separate series is serial number printed, means rendered effective by the quantity counter to cause resetting of the serial number counter, and means made operative by the quantity counter to render the feeding means effective to feed another of the first named records to the sensing means after the last record of said series is printed.

8. In a machine of the class described, means to feed a succession of records each having designations representing a starting serial number and the number of separate records to be serially number punched beginning with said starting serial number, means to sense said designations one record at a time, a quantity counter, a serial number counter, means controlled by the sensing means for subtractively entering the quantity in the quantity counter when one of said first records is sensed, means controlled by the sensing means for additively entering the serial number in the serial number counter, means to serial number perforate a series of separate records, means to initially place said perforating mechanism under control of the sensing means to punch the starting serial number in the first of the series of separate records, read-out means for the serial number counter, means to connect the read-out means to the perforating means to perforate the succeeding separate records of said series with succeeding serial numbers, means to enter a unit subtractively in the quantity counter for each of said separate records of said series to progressively reduce said counter to zero, means to enter a unit additively in the serial number counter for each record perforated, means controlled by the quantity counter for disconnecting the read-out means from the perforating means after the last record of said separate series is serial number perforated, means rendered effective by the quantity counter to cause resetting of the serial number counter, and means controlled by the quantity counter for rendering the feeding means effective to feed another of the first named records to the sensing means upon the completion of perforating the last record of said series.

9. In a machine of the class described, means to feed a succession of records each having designations representing a starting serial number and the number of separate records to be serially number punched beginning with said starting serial number, means to sense said designations one record at a time, a quantity counter, a serial number counter, means controlled by the sensing means for entering the quantity in the quantity counter when one of said first records is sensed, means controlled by the sensing means for entering the serial number in the serial number counter, means to serial number print a series of separate records, means to initially place said printing mechanism under control of the sensing means to print the starting serial number in the first of the series of separate records, read-out means for the serial number counter, means to connect the read-out means to the printing means to print the succeeding separate records of said series with succeeding serial numbers, means to enter a unit subtractively in the quantity counter for each of said separate records of said series to progressively reduce the quantity counter to zero, means to enter a unit in the serial number counter for each separate record printed, means controlled by the quantity counter for disconnecting the read-out means from the perforating means when the last record of said separate series is about to be serial number printed, means rendered effective by the quantity counter to cause resetting of the serial number counter, and means controlled by the quantity counter to render the feeding means effective to feed another of the first named records to the sensing means when the quantity counter reaches zero.

10. In a machine of the class described, means to feed a succession of records each having designations representing a definite starting serial number and a definite number of separate records to be serially number punched, beginning with said starting serial number; a quantity counter controlled by the quantity designations, a serial number counter controlled by the serial number designations, a record perforating mechanism controlled by the serial number counter to punch a detail record with the serial number under control of the different serial number designations in one of the master records, means for placing the record perforating mechanism under control of the serial number counter to serial number punch a succession of records beginning with the next highest serial number above the definite serial number in said one master record, means to advance said counters a unit for each record punched under control of the serial number counter, means controlled by the quantity counter for suppressing punching of detail records when the quantity designated on the master card has been reached, means controlled by the quantity counter to cause a new master card to be fed when the designated quantity of detail cards have been punched; and means for detecting the fact that a new master card is designated with the unit quantity, including means to suppress entry of the serial number in the serial number counter.

11. In a machine of the class described, means to feed a succession of records each having designations representing a definite starting serial number and a definite number of separate records to be serially number punched, beginning with said starting serial number; a quantity counter controlled by the quantity designations, a serial number counter controlled by the serial number designations, a record printing mechanism controlled by the serial number counter to print a detail record with the serial number under control of one of the master records, means for placing the record printing mechanism under control of the serial number counter to serial number print a succession of records beginning with the next highest serial number above said one master record, means to advance said counters a unit for each record printed under control of the serial number counter, means controlled by the quantity counter for suppressing printing of detail records when the quantity designated on the master card has been reached, means controlled by the quantity counter to cause a new master card to be fed when the designated quantity of detail cards have been printed; and means for detecting the fact that a new master card is designated with unit quantity, including means to suppress entry of the serial number in the serial number counter.

12. In a machine of the class described, means to feed a succession of records each having designations representing a definite starting serial number and a definite number of separate records to be serially number punched, beginning with said starting serial number; a quantity counter, means controlled by the sensing means for entering the quantity in the quantity counter, a serial number counter, means controlled by the sensing means for entering the serial number in the serial number counter, means to perforate a succession of separate records under control of the serial number counter, means to advance both the serial number counter and the quantity counter a unit for each separate record punched, whereby the successive separate records are punched with different consecutive serial numbers, means controlled by the quantity counter for terminating the punching of serial numbers when the number of separate records counted equals the quantity designated, and means to prevent entries in the serial number counter when a record is designated with unit quantity.

13. In a machine of the class described, means to feed a succession of master records each having designations representing an arbitrary starting serial number and the number of separate detail records to be serially number punched beginning with said starting serial number, means to sense said designations one record at a time, a quantity counter, a serial number counter, means controlled by the sensing means for entering the quantity in the quantity counter when one of said master records is sensed, means controlled by the sensing means for entering the starting serial number in the serial number counter, means to serial number perforate a series of detail records, means to initially place said perforating mechanism under control of the sensing means to punch the starting serial number in the first of the series of detail records, read-out means for the serial number counter, means to connect the read-out means to the perforating means to perforate the succeeding detail records of said series with succeeding serial numbers, means to enter a unit in each of said counters for each of said detail records of said series, means controlled by the quantity counter for disconnecting the read-out means from the perforating means when the last detail record of said series is serial number perforated, means rendered effective by the quantity counter to cause resetting of the serial number counter, means made operative by the quantity counter to render the feeding means effective to feed another of the master records to the sensing means, and means to suppress entries in the serial number counter when the master records are designated with a predetermined quantity.

14. In a machine of the class described, means to feed a succession of master records each having designations representing an arbitrary starting serial number and the number of separate detail records to be serially number printed beginning with said starting serial number, means to sense said designations one record at a time, a quantity counter, a serial number counter, means controlled by the sensing means for entering the quantity in the quantity counter when one of said master records is sensed, means controlled by the sensing means for entering the starting serial number in the serial number counter, means to serial number print a series of separate detail records, means to initially place said printing mechanism under control of the sensing means to print the starting serial number in the first of the series of detail records, read-out means for the serial number counter, means to connect the read-out means to the printing means to print the succeeding detail records of said series with succeeding serial numbers, means to enter a unit in each of said counters for each of said separate records of said series, means controlled by the quantity counter for disconnecting the read-out means from the printing means when the last record of said separate series is serial number printed, means rendered effective by the quantity counter to cause resetting of the serial number counter, means made operative by the quantity counter to render the feeding means effective to feed another of the master records to the sensing means, and means for suppressing the entry of the starting serial numbers in the serial number counter when the master records are designated with a predetermined quantity.

15. In a machine of the class described, means to feed a succession of master records each having designations representing an arbitrary starting serial number and the number of separate detail records to be serially number punched beginning with said starting serial number, means to sense said designations one record at a time, a quantity counter, a serial number counter, means controlled by the sensing means for subtractively entering the quantity in the quantity counter when one of said master records is sensed, means controlled by the sensing means for additively entering the serial number in the serial number counter, means to serial number perforate a series of separate records, means to initially place said perforating mechanism under control of the sensing means to punch the starting serial number in the first of the series of separate records, read-out means for the serial number counter, means to connect the read-out means to the perforating means to perforate the succeeding separate records of said series with succeeding serial numbers, means to enter a unit additively in each of said counters for each of said separate records of said series, means controlled by the quantity counter for detecting the fact that the last card is to be perforated and operative to disconnect the read-out means from the perforating means after the last record of said separate series is serial number perforated, means rendered effective by the quantity counter to cause resetting of the serial number counter, means made operative by the quantity counter to render the feeding means effective to feed another of the master records to the sensing means after the last separate record of said series has been serial number perforated, and means to suppress entries in the serial number counter when the master records are designated with a predetermined quantity.

16. In a machine of the class described, means to feed a succession of master records each having designations representing an arbitrary starting serial number and the number of separate detail records to be serially number printed beginning with said starting serial number, means to sense said designations one record at a time, a quantity counter, a serial number counter, means controlled by the sensing means for subtractively entering the quantity in the quantity counter when one of said master records is sensed, means controlled by the sensing means for additively entering the serial number in the serial number counter, means to serial number print a series of separate records, means to initially place said printing mechanism under control of the sensing means to print the starting serial number in the first of the series of separate records, read-out means for the serial number counter, means to connect the read-out means to the printing means to print the succeeding separate records of said series with succeeding serial numbers, means to enter a unit additively in each of said counters for each of said separate records of said series, means controlled by the quantity counter for detecting that printing of the last separate record of said series is about to be printed and operative to disconnect the read-out means from the printing means when the last record of said separate series is serial number printed, means rendered effective by the quantity counter to cause resetting of the serial number counter, means made operative by the quantity counter to render the feeding means effective to feed another of the master records to the sensing means after the last record of said series is printed, and means to prevent entries in said serial number counter when only a single detail record is to be printed for each master record.

17. In a machine of the class described, means to feed a succession of records each having designations representing an arbitrary starting serial number and the number of separate detail records to be serially number punched beginning with said starting serial number, means to sense said designations one record at a time, a quantity counter, a serial number counter, means controlled by the sensing means for subtractively entering the quantity in the quantity counter when one of said master records is sensed, means controlled by the sensing means for additively entering the serial number in the serial number counter, means to serial number perforate a series of separate detail records, means to initially place said perforating mechanism under control of the sensing means to punch the starting serial number in the first of the series of separate records, read-out means for the serial number counter, means to connect the read-out means to the perforating means to perforate the succeeding separate records of said series with succeeding serial numbers, means to enter a unit subtractively in the quantity counter for each of said separate records of said series to progressively reduce said counter to zero, means to enter a unit additively in the serial number counter for each detail record perforated, means controlled by the quantity counter for disconnecting the read-out means from the perforating means after the last record of said separate series is serial number perforated, means rendered effective by the quantity counter to cause resetting of the serial number counter, means controlled by the quantity counter for rendering the feeding means effective to feed another of the master records to the sensing means upon the completion of perforating the last record of said series, and means for suppressing entries in the serial number counter when master records are designated with a predetermined quantity.

18. In a machine of the class described, means to feed a succession of records each having designations representing an arbitrary starting serial number and the number of separate detail records to be serially number punched beginning with said starting serial number, means to sense said designations one record at a time, a quantity counter, a serial number counter, means controlled by the sensing means for entering the quantity in the quantity counter when one of said master records is sensed, means controlled by the sensing means for entering the serial number in the serial number counter, means to serial number print a series of separate detail records, means to initially place said printing mechanism under control of the sensing means to print the starting serial number in the first of the series of separate records, read-out means for the serial number counter, means to connect the read-out means to the printing means to print the succeeding separate records of said series with succeeding serial numbers, means to enter a unit subtractively in the quantity counter for each of said separate records of said series to progressively reduce the quantity counter to zero, means to enter a unit in the serial number counter for each detail record printed, means controlled by the quantity counter for disconnecting the read-out means from the perforating means when the last record of said separate series is about to be serial number printed, means rendered effective by the quantity counter to cause resetting of the serial number counter, means controlled by the quantity counter to render the feeding means effective to feed another of the master records to the sensing means when the quantity counter reaches zero, and means to suppress entries in the serial number counter when the master records are designated with a predetermined quantity.

19. In a machine of the class described, means to feed a succession of records each having designations representing a definite starting serial number and a definite number of separate records to be serially number punched, beginning with said starting serial number; a quantity counter controlled by the quantity designations, a serial number counter controlled by the serial number designations, a record perforating mechanism for punching a detail record with a serial number under control of one of the master records, means for placing the record perforating mechanism under control of the serial number counter to punch succeeding detail records with a succession of serial numbers which differ by a predetermined value, means to enter in said counters a predetermined value for each record punched under control of the serial number counter, means controlled by the quantity counter for suppressing serial number punching of detail records when the quantity designated on the master card has been reached, and means controlled by the quantity counter to cause the counters to be reset and a new master card to be fed when the designated quantity of detail cards have been punched.

20. In a machine of the class described, means to feed a succession of records each having designations representing a definite starting serial number and a definite number of separate records to be serially number punched, beginning with said starting serial number; a quantity counter controlled by the quantity designations, a serial number counter controlled by the serial number designations, a record printing mechanism for printing a detail record with the serial number under control of one of the master records, means for placing the record printing mechanism under control of the serial number counter to serial number print succeeding detail records with a succession of serial numbers which differ by a predetermined value, means to enter the predetermined value in said counters for each record printed under control of the serial number counter, means controlled by the quantity counter for suppressing serial number printing of detail records when the quantity designated on the master card has been reached, and means controlled by the quantity counter to cause a new master card to be fed and the counters reset when the designated quantity of detail cards has been printed.

21. In a machine of the class described, means to sense a record containing quantity and number designations, a quantity counter, means controlled by the sensing means for entering the quantity in the quantity counter, a second counter, means controlled by the sensing means for entering the designated number in the second counter, means to perforate a succession of separate records under control of the second counter, means to enter a unit in both the second counter and the quantity counter for each separate record punched, whereby the successive separate records are punched with differing successive numbers, and means controlled by the quantity counter for terminating the punching of said numbers when the number of separate records counted equals the quantity designated.

22. In a machine of the class described, means to sense a record containing quantity and number designations, a quantity counter, means controlled by the sensing means for entering the quantity in the quantity counter, a second counter, means controlled by the sensing means for entering the designated number in the second counter, means to print a succession of separate records under control of the second counter, means to enter in the second counter and the quantity counter a unit for each separate record printed, whereby the successive records are printed with differing successive numbers, and means controlled by the quantity counter for terminating the printing of said numbers when the number of separate records counted equals the quantity designated.

23. In a machine of the class described, means to feed a succession of records each having designations representing a definite starting serial number and a definite number of separate records to be serially number punched, beginning with said starting serial number; a quantity counter controlled by the quantity designations, a numbering counter controlled by the number designations, a record perforating mechanism controlled by the numbering counter to punch a detail record with an identifying number under control of one of the master records, means for placing the record perforating mechanism under control of the numbering counter to number punch a succession of records beginning with the next adjacent number to said one master record, means to advance said counters a unit for each record punched under control of the numbering counter, means controlled by the quantity counter for suppressing punching of detail records when the quantity designated on the master cards has been reached, and means controlled by the quantity counter to cause a new master card to be fed and the counters reset when the designated quantity of detail cards have been number punched.

24. In a machine of the class described, means to feed a succession of records each having designations representing a definite starting serial number and a definite number of separate records to be serially number punched, beginning with said starting serial number; a quantity counter controlled by the quantity designations, a numbering counter controlled by the serial number designations, a record printing mechanism controlled by the number counter to print a detail record with an identifying number under control of one of the master records, means for placing the record printing mechanism under control of the numbering counter to serial number print a succession of records beginning with the next adjacent number to said one master record, means to advance said counters a unit for each record printed under control of the numbering counter, means controlled by the quantity counter for suppressing printing of detail records when the quantity designated on the master card has been reached, and means controlled by the quantity counter to cause a new master card to be fed and the counters reset when the designated quantity of detail cards have been number printed.

25. In a machine of the class described, means to feed a succession of records each having designations representing an arbitrary starting number and the number of separate records to be number punched beginning with said starting number, means to sense said designations one record at a time, a quantity counter, a numbering counter, means controlled by the sensing means for entering the quantity in the quantity counter when one of said first records is sensed, means controlled by the sensing means for entering the arbitrary starting number in the numbering counter, means to number perforate a series of separate records, means to initially place said perforating mechanism under control of the sensing means to punch the starting number in the first of the series of separate records, read-out means for the numbering counter, means to connect the read-out means to the perforating means to perforate the succeeding separate records of said series with succeeding numbers, means to enter a value in each of said counters for each of said separate records of said series, mean controlled by the quantity counter for disconnecting the read-out means from the perforating means when the last record of said separate series is number perforated, means rendered effective by the quantity counter to cause resetting of the numbering counter, and means made operative by the quantity counter to render the feeding means effective to feed another of the first named records to the sensing means.

26. In a machine of the class described, means to feed a succession of records each having designations representing an arbitrary starting number and the number of separate records to be number printed beginning with said starting number, means to sense said designations one record at a time, a quantity counter, a numbering counter, means controlled by the sensing means for entering the quantity in the quantity counter when one of said first records is sensed, means controlled by the sensing means for entering the arbitrary starting number in the numbering counter, means to serial number print a series of separate records, means to initially place said printing mechanism under control of the sensing means to print the starting serial number in the first of the series of separate records, read-out means for the numbering counter, means to connect the read-out means to the printing means to print the succeeding separate records of said series with succeeding numbers, means to enter a value in each of said counters for each of said separate records of said series, means controlled by the quantity counter for disconnecting the read-out means from the printing means when the last record of said separate series is number printed, means rendered effective by the quantity counter to cause resetting of the numbering counter, and means made operative by the quantity counter to render the feeding means effective to feed another of the first named records to the sensing means.

27. In a machine of the class described, means to feed a succession of records each having designations representing an arbitrary starting number and the number of separate records to be number punched beginning with said starting number, means to sense said designations one record at a time, a quantity counter, a numbering counter, means controlled by the sensing means for subtractively entering the quantity in the quantity counter when one of said first records is sensed, means controlled by the sensing means for additively entering the serial number in the number counter, means to number perforate a series of separate records, means to initially place said perforating mechanism under control of the sensing means to punch the starting number in the first of the series of separate records, read-out means for the numbering counter, means to connect the read-out means to the perforating means to perforate the succeeding separate records of said series with succeeding numbers, means to enter a unit additively in each of said counters for each of said separate records of said series, means controlled by the quantity counter for detecting the fact that the last card is to be perforated and operative to disconnect the read-out means from the perforating means after the last record of said separate series is number perforated, means rendered effective by the quantity counter to cause resetting of the number counter, means made operative by the quantity counter to render the feeding means effective to feed another of the first named records to the sensing means after the last separate record of said series has been number perforated; and means for suppressing entries in the numbering counter when only one separate record is to be punched, including means for presensing each of the first named records to ascertain that such record is unity designated before such record is sensed by the first named sensing means..

28. In a machine of the class described, means to feed a succession of records each having designations representing an arbitrary starting serial number and the number of separate records to be number printed beginning with said starting number, means to sense said designations one record at a time, a quantity counter, a numbering counter, means controlled by the sensing means for subtractively entering the quantity in the quantity counter when one of said first records is sensed, means controlled by the sensing means for additively entering the number in the numbering counter, means to number print a series of separate records, means to initially place said printing mechanism under control of the sensing means to print the starting number in the first of the series of separate records, read-out means for the serial number counter, means to connect the read-out means to the printing means to print the succeeding separate records of said series with succeeding numbers, means to enter a unit additively in each of said counters for each of said separate records of said series, means controlled by the quantity counter for detecting that printing of the last separate record of said series is about to be printed and operative to disconnect the read-out means from the printing means when the last record of said separate series is number printed, means rendered effective by the quantity counter to cause resetting of the numbering counter, means made operative by the quantity counter to render the feeding means effective to feed another of the first named records to the sensing means after the last record of said series is printed; and means for suppressing entries in the numbering counter when the first named records are designated with unit quantity, including means to sense the quantity designations prior to the sensing of such designations by the first named sensing means to thereby detect the unit quantity designated records.

29. In a machine of the class described, means to feed a succession of records each having designations representing an arbitrary starting number and the number of separate records to be number punched beginning with said starting number, means to sense said designations one record at a time, a quantity counter, a numbering counter, means controlled by the sensing means for entering the quantity in the quantity counter when one of said first records is sensed, means controlled by the sensing means for entering the serial number in the numbering counter, means to number perforate a series of separate records, means to initially place said perforating mechanism under control of the sensing means to punch the starting number in the first of the series of separate records, read-out means for the numbering counter, means to connect the read-out means to the perforating means to perforate the succeeding separate records of said series with succeeding numbers, means to enter a fixed value in the quantity counter for each of said separate records of said series to progressively reduce said counter to zero, means to enter a value in the numbering counter for each record perforated, means controlled by the quantity counter for disconnecting the read-out means from the perforating means after the last record of said separate series is number perforated, means rendered effective by the quantity counter to cause resetting of the numbering counter, and means controlled by the quantity counter for rendering the feeding means effective to feed another of the first named records to the sensing means upon the completion of perforating the last record of said series.

30. In a machine of the class described, means to feed a succession of records each having designations representing an arbitrary starting serial number and the number of separate records to be number printed beginning with said starting number, means to sense said designations one record at a time, a quantity counter, a numbering counter, means controlled by the sensing means for entering the quantity in the quantity counter when one of said first records is sensed, means controlled by the sensing means for entering the starting number in the numbering counter, means to number print a series of separate records, means to initially place said printing mechanism under control of the sensing means to print the starting number in the first of the series of separate records, read-out means for the numbering counter, means to connect the read-out means to the printing means to print the succeeding separate records of said series with succeeding numbers, means to enter a unit in the quantity counter for each of said separate records of said series to progressively reduce the quantity counter to zero, means to enter predetermined values in the numbering counter for each separate record printed to progressively change the number printed, means controlled by the quantity counter for disconnecting the read-out means from the printing means when the last record of said separate series is about to be number printed, means rendered effective by the quantity counter to cause resetting of the numbering counter, and means controlled by the quantity counter to render the feeding means effective to feed another of the first named records to the sensing means when the quantity counter reaches zero.

31. In a machine of the class described, means to feed, one at a time, a series of control records, each bearing designations representing quantity and an arbitrary starting number; means for recording numbers on a series of separate records, a quantity counter, a numbering counter; means controlled by said designations for entering the quantity and starting number in the quantity and numbering counters respectively; means to initially place the recording means under control of the number designations to record the starting number in the first of said series of separate records and thereafter place the recording means under control of the numbering counter to cause subsequent records of said series to be automatically numbered, means to enter a unit in the quantity counter for each record numbered, means to enter a predetermined value in the numbering counter for each separate record numbered whereby the separate records will be differently numbered, and means controlled by the quantity counter for suppressing control of the recording means by the numbering counter when the quantity of separate records designated in the control record have been numbered.

32. In a machine of the class described, means to feed, one at a time, a series of control records bearing designations representing quantity and an arbitrary starting number, means for recording numbers on a series of separate records, a quantity counter, a numbering counter, means controlled by said designations for entering the quantity and starting number in the quantity and numbering counters respectively, means to initially place the recording means under control of the number designations on one of said control records to record the starting number in the first of said series of separate records and thereafter place the recording means under control of the numbering counter to cause subsequent records of said series to be automatically numbered, means to enter a unit in the quantity counter for each record numbered, means to enter a predetermined value in the numbering counter for each separate record numbered whereby the separate records will be differently numbered, and means controlled by the quantity counter for suppressing control of the recording means by the numbering counter when the quantity of separate records designated in the control record have been numbered and place the numbering means under control of the next succeeding control record.

33. In a machine of the class described, means to feed, one at a time, a series of control records bearing designations representing quantity and an arbitrary starting number, means for sensing said designations, means for recording numbers on a series of separate records, a quantity counter, a numbering counter, means controlled by said designation sensing means for entering the quantity and starting number in the quantity and numbering counters respectively, means to initially place the recording means under control of the designation sensing means to record the starting number in the first of said series of separate records and thereafter place the recording means under control of the numbering counter to cause subsequent records of said series to be automatically numbered, means to enter a unit in the quantity counter for each record numbered, means to enter a predetermined value in the numbering counter for each separate record numbered whereby the separate records will be differently numbered, and means controlled by the quantity counter for suppressing control of the recording means by the numbering counter and placing the recording means under control of the sensing means when the quantity of separate records designated in the control record have been numbered.

34. In a machine of the class described, means to feed a series of control records bearing designations representing quantities and arbitrary numbers, means for recording numbers on a series of separate records, a quantity counter, a numbering counter, means controlled by said designations for entering the quantities and starting numbers in the quantity and numbering counters respectively, means to initially place the recording means under control of the number designations to record a starting number in the first of a series of separate records and thereafter place the recording means under control of the numbering counter to cause subsequent records of the same series to be automatically numbered, means to enter units in the quantity counter for each of the records numbered, means to enter predetermined values in the numbering counter for each separate record numbered whereby successive separate records will be differently numbered, and means controlled by the quantity counter for new quantities and new starting numbers to be entered in the counters when the quantity of records entered in the quantity counter have been numbered.

35. A machine for serially numbering accounting and statistical record cards comprising means for feeding records which are blank in an identifying number field and control records bearing both arbitrary number designations and designations representing the quantity of blank records to be serially numbered beginning with said arbitrary number, a quantity counter, a numbering counter, means controlled by said designations for entering the quantity and arbitrary number in the corresponding counters, numbering mechanism for recording numbers in the number fields of said blank records under control of the numbering counter; means to enter values in the numbering counter, one value for each record numbered, whereby the successive blank records will be differently numbered; and means controlled by the quantity counter for causing a new quantity and a new number to be entered in said counters when the quantity of records first entered in the quantity counter have been numbered.

36. In a machine of the class described, means to feed, one at a time, a series of control records bearing designations representing quantities and arbitrary starting numbers, means for recording numbers on a series of separate records, a quantity counter, a numbering counter, means controlled by said designations for entering the quantity and starting number in the quantity and numbering counters respectively, means to initially place the recording means under control of the number designations to record the starting number in the first of said series of separate records and thereafter place the recording means under control of the numbering counter to cause subsequent records of said series to be automatically numbered, means to enter a unit in the quantity counter for each record numbered, means to enter a predetermined value in the numbering counter for each separate record numbered whereby the separate records will be differently numbered, means controlled by the quantity counter for terminating control of the recording means by the quantity counter when the quantity of separate records designated in the control record have been numbered, and means effective, when a predetermined quantity has been entered in said quantity counter for suppressing entries in the numbering counter.

37. In a machine of the class described, means to feed, one at a time, a series of control records bearing designations representing quantities and arbitrary starting numbers, means for recording numbers on a series of separate records, a quantity counter, a numbering counter, means controlled by said designations for entering the quantities and starting numbers in the quantity and numbering counters respectively, means to initially place the recording means under control of the number designations to record a starting number in the first of said series of separate records and thereafter place the recording means under control of the numbering counter to cause subsequent records of said series to be automatically numbered, means to enter a unit in the quantity counter for each record numbered, means to enter a predetermined value in the numbering counter for each separate record numbered whereby the separate records will be differently numbered, and means for preventing entries in the numbering counter when a predetermined value has been entered in the quantity counter.

GEORGE F. DALY.

REFERENCES CITED

The following references are of record in the file of this patent:

UNITED STATES PATENTS

| Number | Name | Date |
| --- | --- | --- |
| 2,120,233 | Daly and Dickinson | June 14, 1938 |
| 2,168,763 | Daly and Dickinson | Aug. 8, 1939 |
| 2,377,791 | Lake | June 5, 1945 |